(12) United States Patent
Torrez et al.

(10) Patent No.: US 10,963,961 B1
(45) Date of Patent: Mar. 30, 2021

(54) SYSTEM AND METHOD FOR GENERATING A FINANCE ATTRIBUTE FROM TRADELINE DATA

(71) Applicant: Experian Information Solutions, Inc., Costa Mesa, CA (US)

(72) Inventors: Luz M. Torrez, Fountain Valley, CA (US); Adam Thomas Kornegay, Knoxville, TN (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 73 days.

(21) Appl. No.: 16/158,158

(22) Filed: Oct. 11, 2018

Related U.S. Application Data

(63) Continuation of application No. 15/389,160, filed on Dec. 22, 2016, now Pat. No. 10,121,194, which is a continuation of application No. 14/091,232, filed on Nov. 26, 2013, now Pat. No. 9,563,916, which is a continuation of application No. 13/620,095, filed on Sep. 14, 2012, now Pat. No. 8,626,646, which is a continuation of application No. 13/253,776, filed on Oct. 5, 2011, now Pat. No. 8,315,943, which is a
(Continued)

(51) Int. Cl.
  *G06Q 40/02* (2012.01)
  *G06Q 10/06* (2012.01)
  *G06Q 10/04* (2012.01)
  *G06F 16/25* (2019.01)

(52) U.S. Cl.
  CPC ......... *G06Q 40/025* (2013.01); *G06F 16/254* (2019.01); *G06Q 10/04* (2013.01); *G06Q 10/06* (2013.01)

(58) Field of Classification Search
  CPC .................................................. G06Q 40/025
  See application file for complete search history.

(56) References Cited

U.S. PATENT DOCUMENTS

| | | |
|---|---|---|
| 3,316,395 A | 4/1967 | Lavin et al. |
| 4,305,059 A | 12/1981 | Benton |
| 4,346,442 A | 8/1982 | Musmanno |

(Continued)

FOREIGN PATENT DOCUMENTS

| | | |
|---|---|---|
| AU | 2019250275 | 5/2020 |
| CA | 3 059 314 | 3/2020 |

(Continued)

OTHER PUBLICATIONS

U.S. Appl. No. 11/973,300, U.S. Pat. No. 8,036,979, System and Method for Generating a Finance Attribute From Tradeline Data, filed Oct. 5, 2007.

(Continued)

*Primary Examiner* — Scott C Anderson
(74) *Attorney, Agent, or Firm* — Knobbe, Martens, Olson & Bear, LLP

(57) ABSTRACT

Embodiments of a system and method are described for generating a finance attribute. In one embodiment, the systems and methods retrieve raw tradeline data from a plurality of credit bureaus, retrieve industry code data related to each of the plurality of credit bureaus, determine one or more tradeline leveling characteristics that meet at least one pre-determined threshold, and generate a finance attribute using the selected leveling characteristics.

15 Claims, 19 Drawing Sheets

Related U.S. Application Data continuation of application No. 11/973,300, filed on Oct. 5, 2007, now Pat. No. 8,036,979.

(60) Provisional application No. 60/849,542, filed on Oct. 5, 2006.

(56) References Cited

U.S. PATENT DOCUMENTS

| | | |
|---|---|---|
| 4,371,739 A | 2/1983 | Lewis et al. |
| 4,398,055 A | 8/1983 | Ijaz et al. |
| 4,491,725 A | 1/1985 | Pritchard |
| 4,578,530 A | 3/1986 | Zeidler |
| 4,617,195 A | 10/1986 | Mental |
| 4,672,149 A | 6/1987 | Yoshikawa et al. |
| 4,736,294 A | 4/1988 | Gill |
| 4,754,544 A | 7/1988 | Hanak |
| 4,774,664 A | 9/1988 | Campbell et al. |
| 4,775,935 A | 10/1988 | Yourick |
| 4,812,628 A | 3/1989 | Boston et al. |
| 4,827,508 A | 5/1989 | Shear |
| 4,868,570 A | 9/1989 | Davis |
| 4,872,113 A | 10/1989 | Dinerstein |
| 4,876,592 A | 10/1989 | Von Kohorn |
| 4,895,518 A | 1/1990 | Arnold |
| 4,935,870 A | 6/1990 | Burk, Jr. et al. |
| 4,947,028 A | 8/1990 | Gorog |
| 5,025,138 A | 6/1991 | Cuervo |
| 5,025,373 A | 6/1991 | Keyser, Jr. et al. |
| 5,034,807 A | 7/1991 | Von Kohorn |
| 5,056,019 A | 10/1991 | Schultz et al. |
| 5,060,153 A | 10/1991 | Nakagawa |
| 5,148,365 A | 9/1992 | Dembo |
| 5,201,010 A | 4/1993 | Deaton et al. |
| 5,220,501 A | 6/1993 | Lawlor et al. |
| 5,239,462 A | 8/1993 | Jones et al. |
| 5,247,575 A | 9/1993 | Sprague et al. |
| 5,259,766 A | 11/1993 | Sack |
| 5,262,941 A | 11/1993 | Saladin |
| 5,274,547 A | 12/1993 | Zoffel et al. |
| 5,297,031 A | 3/1994 | Gutterman et al. |
| 5,301,105 A | 4/1994 | Cummings, Jr. |
| 5,325,509 A | 6/1994 | Lautzenheiser |
| 5,336,870 A | 8/1994 | Hughes et al. |
| 5,341,429 A | 8/1994 | Stringer et al. |
| 5,454,030 A | 9/1995 | de Oliveira et al. |
| 5,468,988 A | 11/1995 | Glatfelter et al. |
| 5,500,513 A | 3/1996 | Langhans et al. |
| 5,504,675 A | 4/1996 | Cragun et al. |
| 5,521,813 A | 5/1996 | Fox et al. |
| 5,528,701 A | 6/1996 | Aref |
| 5,555,409 A | 9/1996 | Leenstra, Sr. et al. |
| 5,557,514 A | 9/1996 | Seare et al. |
| 5,563,783 A | 10/1996 | Stolfo et al. |
| 5,583,760 A | 12/1996 | Klesse |
| 5,583,763 A | 12/1996 | Atcheson et al. |
| 5,590,038 A | 12/1996 | Pitroda |
| 5,592,560 A | 1/1997 | Deaton et al. |
| 5,611,052 A | 3/1997 | Dykstra et al. |
| 5,615,408 A | 3/1997 | Johnson |
| 5,621,201 A | 4/1997 | Langhans et al. |
| 5,629,982 A | 5/1997 | Micali |
| 5,630,127 A | 5/1997 | Moore et al. |
| 5,640,551 A | 6/1997 | Chu et al. |
| 5,640,577 A | 6/1997 | Scharmer |
| 5,644,778 A | 7/1997 | Burks et al. |
| 5,649,114 A | 7/1997 | Deaton et al. |
| 5,655,129 A | 8/1997 | Ito |
| 5,659,731 A | 8/1997 | Gustafson |
| 5,666,528 A | 9/1997 | Thai |
| 5,679,176 A | 10/1997 | Tsuzuki et al. |
| 5,689,651 A | 11/1997 | Lozman |
| 5,692,107 A | 11/1997 | Simoudis et al. |
| 5,696,907 A | 12/1997 | Tom |
| 5,699,527 A | 12/1997 | Davidson |
| 5,704,029 A | 12/1997 | Wright, Jr. |
| 5,704,044 A | 12/1997 | Tarter et al. |
| 5,732,400 A | 3/1998 | Mandler |
| 5,737,732 A | 4/1998 | Gibson et al. |
| 5,739,512 A | 4/1998 | Tognazzini |
| 5,745,654 A | 4/1998 | Titan |
| 5,748,098 A | 5/1998 | Grace |
| 5,754,938 A | 5/1998 | Herz et al. |
| 5,764,923 A | 6/1998 | Tallman et al. |
| 5,768,423 A | 6/1998 | Aref et al. |
| 5,771,562 A | 6/1998 | Harvey et al. |
| 5,774,692 A | 6/1998 | Boyer et al. |
| 5,774,868 A | 6/1998 | Cragun et al. |
| 5,774,883 A | 6/1998 | Andersen |
| 5,778,405 A | 7/1998 | Ogawa |
| 5,793,972 A | 8/1998 | Shane |
| 5,797,136 A | 8/1998 | Boyer et al. |
| 5,802,142 A | 9/1998 | Browne |
| 5,812,840 A | 9/1998 | Shwartz |
| 5,819,226 A | 10/1998 | Gopinathan et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,828,833 A | 10/1998 | Belville et al. |
| 5,832,447 A | 11/1998 | Rieker et al. |
| 5,835,915 A | 11/1998 | Carr et al. |
| 5,844,218 A | 12/1998 | Kawan et al. |
| 5,848,396 A | 12/1998 | Gerace |
| 5,864,830 A | 1/1999 | Armetta et al. |
| 5,870,721 A | 2/1999 | Norris |
| 5,875,108 A | 2/1999 | Hoffberg et al. |
| 5,875,236 A | 2/1999 | Jankowitz |
| 5,878,403 A | 3/1999 | DeFrancesco |
| 5,881,131 A | 3/1999 | Farris et al. |
| 5,884,287 A | 3/1999 | Edesess |
| 5,884,289 A | 3/1999 | Anderson et al. |
| 5,893,090 A | 4/1999 | Friedman et al. |
| 5,903,830 A | 5/1999 | Joao et al. |
| 5,903,881 A | 5/1999 | Schrader et al. |
| 5,905,985 A | 5/1999 | Malloy et al. |
| 5,907,828 A | 5/1999 | Meyer et al. |
| 5,912,339 A | 6/1999 | Ovshinsky et al. |
| 5,915,243 A | 6/1999 | Smolen |
| 5,924,082 A | 7/1999 | Silverman et al. |
| 5,926,800 A | 7/1999 | Baronowski et al. |
| 5,930,759 A | 7/1999 | Moore et al. |
| 5,930,764 A | 7/1999 | Melchione et al. |
| 5,930,774 A | 7/1999 | Chennault |
| 5,930,776 A | 7/1999 | Dykstra et al. |
| 5,933,809 A | 8/1999 | Hunt et al. |
| 5,933,813 A | 8/1999 | Teicher et al. |
| 5,940,812 A | 8/1999 | Tengel et al. |
| 5,950,172 A | 9/1999 | Klingman |
| 5,950,179 A | 9/1999 | Buchanan et al. |
| 5,953,707 A | 9/1999 | Huang et al. |
| 5,956,693 A | 9/1999 | Geerlings |
| 5,963,932 A | 10/1999 | Jakobsson et al. |
| 5,966,695 A | 10/1999 | Melchione et al. |
| 5,966,699 A | 10/1999 | Zandi |
| 5,970,478 A | 10/1999 | Walker et al. |
| 5,974,396 A | 10/1999 | Anderson et al. |
| 5,978,780 A | 11/1999 | Watson |
| 5,995,947 A | 11/1999 | Fraser et al. |
| 5,999,596 A | 12/1999 | Walker et al. |
| 6,009,415 A | 12/1999 | Shurling et al. |
| 6,014,632 A | 1/2000 | Gamble et al. |
| 6,014,688 A | 1/2000 | Venkatraman et al. |
| 6,018,723 A | 1/2000 | Siegel et al. |
| 6,021,362 A | 2/2000 | Maggard et al. |
| 6,021,943 A | 2/2000 | Chastain |
| 6,026,368 A | 2/2000 | Brown et al. |
| 6,029,139 A | 2/2000 | Cunningham et al. |
| 6,029,149 A | 2/2000 | Dykstra et al. |
| 6,029,154 A | 2/2000 | Pettitt |
| 6,038,551 A | 3/2000 | Barlow et al. |
| 6,044,351 A | 3/2000 | Jones |
| 6,044,352 A | 3/2000 | Deavers |
| 6,044,357 A | 3/2000 | Garg |
| 6,058,375 A | 5/2000 | Park |

(56) References Cited

U.S. PATENT DOCUMENTS

| | | |
|---|---|---|
| 6,061,658 A | 5/2000 | Chou et al. |
| 6,061,691 A | 5/2000 | Fox |
| 6,064,973 A | 5/2000 | Smith et al. |
| 6,064,987 A | 5/2000 | Walker |
| 6,064,990 A | 5/2000 | Goldsmith |
| 6,067,522 A | 5/2000 | Warady et al. |
| 6,070,141 A | 5/2000 | Houvener |
| 6,070,142 A | 5/2000 | McDonough et al. |
| 6,072,894 A | 6/2000 | Payne |
| 6,073,104 A | 6/2000 | Field |
| 6,073,140 A | 6/2000 | Morgan et al. |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,108,641 A | 8/2000 | Kenna et al. |
| 6,115,690 A | 9/2000 | Wong |
| 6,115,693 A | 9/2000 | McDonough et al. |
| 6,119,103 A | 9/2000 | Basch et al. |
| 6,121,901 A | 9/2000 | Welch et al. |
| 6,123,599 A | 10/2000 | Walker |
| 6,128,602 A | 10/2000 | Northington et al. |
| 6,128,603 A | 10/2000 | Dent |
| 6,128,624 A | 10/2000 | Papierniak et al. |
| 6,129,273 A | 10/2000 | Shah |
| 6,134,548 A | 10/2000 | Gottsman et al. |
| 6,144,948 A | 11/2000 | Walker et al. |
| 6,144,957 A | 11/2000 | Cohen et al. |
| 6,151,601 A | 11/2000 | Papierniak et al. |
| 6,154,729 A | 11/2000 | Cannon et al. |
| 6,163,770 A | 12/2000 | Gamble et al. |
| 6,171,112 B1 | 1/2001 | Clark et al. |
| 6,178,442 B1 | 1/2001 | Yamazaki |
| 6,182,060 B1 | 1/2001 | Hedgcock et al. |
| 6,185,543 B1 | 2/2001 | Galperin et al. |
| 6,198,217 B1 | 3/2001 | Suzuki et al. |
| 6,202,053 B1 | 3/2001 | Christiansen et al. |
| 6,208,973 B1 | 3/2001 | Boyer et al. |
| 6,208,979 B1 | 3/2001 | Sinclair |
| 6,223,171 B1 | 4/2001 | Chaudhuri et al. |
| 6,226,408 B1 | 5/2001 | Sirosh |
| 6,233,566 B1 | 5/2001 | Levine et al. |
| 6,236,977 B1 | 5/2001 | Verba et al. |
| 6,239,352 B1 | 5/2001 | Luch |
| 6,249,770 B1 | 6/2001 | Erwin et al. |
| 6,254,000 B1 | 7/2001 | Degen et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,266,649 B1 | 7/2001 | Linden et al. |
| 6,269,325 B1 | 7/2001 | Lee et al. |
| 6,278,055 B1 | 8/2001 | Forrest et al. |
| 6,285,983 B1 | 9/2001 | Jenkins |
| 6,285,987 B1 | 9/2001 | Roth et al. |
| 6,289,252 B1 | 9/2001 | Wilson et al. |
| 6,304,860 B1 | 10/2001 | Martin et al. |
| 6,304,869 B1 | 10/2001 | Moore et al. |
| 6,307,958 B1 | 10/2001 | Deaton et al. |
| 6,311,169 B2 | 10/2001 | Duhon |
| 6,321,205 B1 | 11/2001 | Eder |
| 6,324,524 B1 | 11/2001 | Lent et al. |
| 6,327,578 B1 | 12/2001 | Linehan |
| 6,330,546 B1 | 12/2001 | Gopinathan et al. |
| 6,330,575 B1 | 12/2001 | Moore et al. |
| 6,334,110 B1 | 12/2001 | Walter et al. |
| 6,339,769 B1 | 1/2002 | Cochrane et al. |
| 6,345,300 B1 | 2/2002 | Bakshi et al. |
| 6,366,903 B1 | 4/2002 | Agrawal et al. |
| 6,374,229 B1 | 4/2002 | Lowrey et al. |
| 6,374,230 B1 | 4/2002 | Walker et al. |
| 6,385,594 B1 | 5/2002 | Lebda et al. |
| 6,386,444 B1 | 5/2002 | Sullivan |
| 6,393,406 B1 | 5/2002 | Eder |
| 6,397,197 B1 | 5/2002 | Gindlesperger |
| 6,405,173 B1 | 6/2002 | Honarvar |
| 6,405,181 B2 | 6/2002 | Lent et al. |
| 6,412,012 B1 | 6/2002 | Bieganski et al. |
| 6,418,436 B1 | 7/2002 | Degen et al. |
| 6,422,462 B1 | 7/2002 | Cohen |
| 6,424,956 B1 | 7/2002 | Werbos |
| 6,430,539 B1 | 8/2002 | Lazarus et al. |
| 6,442,577 B1 | 8/2002 | Britton et al. |
| 6,453,297 B1 | 9/2002 | Burks et al. |
| 6,456,979 B1 | 9/2002 | Flagg |
| 6,456,983 B1 | 9/2002 | Keyes et al. |
| 6,457,012 B1 | 9/2002 | Jatkowski |
| 6,460,036 B1 | 10/2002 | Herz |
| 6,496,819 B1 | 12/2002 | Bello et al. |
| 6,505,176 B2 | 1/2003 | DeFrancesco, Jr. et al. |
| 6,513,018 B1 | 1/2003 | Culhane |
| 6,523,022 B1 | 2/2003 | Hobbs |
| 6,523,041 B1 | 2/2003 | Morgan et al. |
| 6,532,450 B1 | 3/2003 | Brown et al. |
| 6,542,894 B1 | 4/2003 | Lee et al. |
| 6,543,683 B2 | 4/2003 | Hoffman |
| 6,549,919 B2 | 4/2003 | Lambert et al. |
| 6,567,791 B2 | 5/2003 | Lent et al. |
| 6,574,623 B1 | 6/2003 | Laung et al. |
| 6,587,841 B1 | 7/2003 | DeFrancesco |
| 6,597,775 B2 | 7/2003 | Lawyer et al. |
| 6,598,030 B1 | 7/2003 | Siegel et al. |
| 6,601,234 B1 | 7/2003 | Bowman-Amuah |
| 6,611,816 B2 | 8/2003 | Lebda et al. |
| 6,615,193 B1 | 9/2003 | Kingdon et al. |
| 6,615,247 B1 | 9/2003 | Murphy |
| 6,622,266 B1 | 9/2003 | Goddard et al. |
| 6,623,529 B1 | 9/2003 | Lakritz |
| 6,631,496 B1 | 10/2003 | Li et al. |
| 6,640,215 B1 | 10/2003 | Galperin et al. |
| 6,651,220 B1 | 11/2003 | Penteroudakis et al. |
| 6,654,727 B2 | 11/2003 | Tilton |
| 6,658,393 B1 | 12/2003 | Basch et al. |
| 6,665,715 B1 | 12/2003 | Houri |
| 6,684,093 B2 | 1/2004 | Kuth |
| 6,687,713 B2 | 2/2004 | Mattson et al. |
| 6,708,166 B1 | 3/2004 | Dysart et al. |
| 6,714,918 B2 | 3/2004 | Hillmer et al. |
| 6,735,572 B2 | 5/2004 | Landesmann |
| 6,745,938 B2 | 6/2004 | Sullivan |
| 6,748,426 B1 | 6/2004 | Shaffer et al. |
| 6,757,740 B1 | 6/2004 | Parekh et al. |
| 6,766,327 B2 | 7/2004 | Morgan, Jr. et al. |
| 6,782,390 B2 | 8/2004 | Lee et al. |
| 6,801,909 B2 | 10/2004 | Delgado et al. |
| 6,804,346 B1 | 10/2004 | Mewhinney |
| 6,804,701 B2 | 10/2004 | Muret et al. |
| 6,823,319 B1 | 11/2004 | Lynch et al. |
| 6,826,535 B2 | 11/2004 | Wood et al. |
| 6,836,764 B1 | 12/2004 | Hucal |
| 6,839,682 B1 | 1/2005 | Blume et al. |
| 6,839,690 B1 | 1/2005 | Foth et al. |
| 6,847,942 B1 | 1/2005 | Land et al. |
| 6,850,606 B2 | 2/2005 | Lawyer et al. |
| 6,859,785 B2 | 2/2005 | Case |
| 6,865,566 B2 | 3/2005 | Serrano-Morales et al. |
| 6,873,972 B1 | 3/2005 | Marcial et al. |
| 6,873,979 B2 | 3/2005 | Fishman et al. |
| 6,901,406 B2 | 5/2005 | Nabe et al. |
| 6,910,624 B1 | 6/2005 | Natsuno |
| 6,915,269 B1 | 7/2005 | Shapiro et al. |
| 6,925,441 B1 | 8/2005 | Jones, III et al. |
| 6,959,281 B1 | 10/2005 | Freeling et al. |
| 6,965,889 B2 | 11/2005 | Serrano-Morales et al. |
| 6,968,328 B1 | 11/2005 | Kintzer et al. |
| 6,970,830 B1 | 11/2005 | Samra et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,991,159 B2 | 1/2006 | Zenou |
| 6,993,493 B1 | 1/2006 | Galperin et al. |
| 6,993,514 B2 | 1/2006 | Majoor |
| 6,999,941 B1 | 2/2006 | Agarwal |
| 7,000,199 B2 | 2/2006 | Steele et al. |
| 7,003,491 B2 | 2/2006 | Starkman |

(56) References Cited

U.S. PATENT DOCUMENTS

| | | |
|---|---|---|
| 7,003,504 B1 | 2/2006 | Angus et al. |
| 7,003,792 B1 | 2/2006 | Yuen |
| 7,028,052 B2 | 4/2006 | Chapman et al. |
| 7,031,945 B1 | 4/2006 | Donner |
| 7,039,176 B2 | 5/2006 | Borodow et al. |
| 7,039,607 B2 | 5/2006 | Watarai et al. |
| 7,047,251 B2 | 5/2006 | Reed et al. |
| 7,050,982 B2 | 5/2006 | Sheinson et al. |
| 7,050,986 B1 | 5/2006 | Vance et al. |
| 7,050,989 B1 | 5/2006 | Hurt et al. |
| 7,054,828 B2 | 5/2006 | Heching et al. |
| 7,059,531 B2 | 6/2006 | Beenau et al. |
| 7,069,240 B2 | 6/2006 | Spero et al. |
| 7,072,842 B2 | 7/2006 | Provost et al. |
| 7,072,963 B2 | 7/2006 | Anderson et al. |
| 7,076,462 B1 | 7/2006 | Nelson et al. |
| 7,076,475 B2 | 7/2006 | Honarvar et al. |
| 7,082,435 B1 | 7/2006 | Guzman et al. |
| 7,092,898 B1 | 8/2006 | Mattick et al. |
| 7,117,172 B1 | 10/2006 | Black |
| 7,120,599 B2 | 10/2006 | Keyes |
| 7,121,471 B2 | 10/2006 | Beenau et al. |
| 7,130,853 B2 | 10/2006 | Roller et al. |
| 7,133,840 B1 | 11/2006 | Kenna et al. |
| 7,133,935 B2 | 11/2006 | Hedy |
| 7,136,448 B1 | 11/2006 | Venkataperumal et al. |
| 7,139,734 B2 | 11/2006 | Nathans et al. |
| 7,143,063 B2 | 11/2006 | Lent |
| 7,152,053 B2 | 12/2006 | Serrano-Morales et al. |
| 7,154,375 B2 | 12/2006 | Beenau et al. |
| 7,165,036 B2 | 1/2007 | Kruk et al. |
| 7,165,037 B2 | 1/2007 | Lazarus et al. |
| 7,171,371 B2 | 1/2007 | Goldstein |
| 7,174,302 B2 | 2/2007 | Patricelli et al. |
| 7,181,427 B1 | 2/2007 | DeFrancesco |
| 7,184,974 B2 | 2/2007 | Shishido |
| 7,185,016 B1 | 2/2007 | Rasmussen |
| 7,191,144 B2 | 3/2007 | White |
| 7,191,150 B1 | 3/2007 | Shao et al. |
| 7,191,451 B2 | 3/2007 | Nakagawa |
| 7,197,468 B1 | 3/2007 | Patricelli et al. |
| 7,200,602 B2 | 4/2007 | Jonas |
| 7,212,995 B2 | 5/2007 | Schulkins |
| 7,234,156 B2 | 6/2007 | French et al. |
| 7,236,950 B2 | 6/2007 | Savage et al. |
| 7,240,059 B2 | 7/2007 | Bayliss et al. |
| 7,246,068 B2 | 7/2007 | Thomas, Jr. |
| 7,249,048 B1 | 7/2007 | O'Flaherty |
| 7,249,076 B1 | 7/2007 | Pendleton et al. |
| 7,249,114 B2 | 7/2007 | Burchetta et al. |
| 7,263,506 B2 | 8/2007 | Lee et al. |
| 7,275,083 B1 | 9/2007 | Seibel et al. |
| 7,277,869 B2 | 10/2007 | Starkman |
| 7,277,875 B2 | 10/2007 | Serrano-Morales et al. |
| 7,277,900 B1 | 10/2007 | Ganesh et al. |
| 7,283,974 B2 | 10/2007 | Katz et al. |
| 7,295,988 B1 | 11/2007 | Reeves |
| 7,296,734 B2 | 11/2007 | Pliha |
| 7,298,872 B2 | 11/2007 | Glisson |
| 7,303,120 B2 | 12/2007 | Beenau et al. |
| 7,305,359 B2 | 12/2007 | Bonnell |
| 7,308,416 B2 | 12/2007 | Malek et al. |
| 7,310,617 B1 | 12/2007 | Cunningham |
| 7,313,538 B2 | 12/2007 | Wilmes et al. |
| 7,313,618 B2 | 12/2007 | Braemer et al. |
| 7,314,166 B2 | 1/2008 | Anderson et al. |
| 7,314,167 B1 | 1/2008 | Kiliccote |
| 7,318,224 B2 | 1/2008 | Honarvar et al. |
| 7,324,962 B1 | 1/2008 | Valliani et al. |
| 7,328,169 B2 | 2/2008 | Temares et al. |
| 7,328,276 B2 | 2/2008 | Alisuag |
| 7,333,937 B2 | 2/2008 | Baldwin, Jr. et al. |
| 7,337,133 B1 | 2/2008 | Bezos et al. |
| 7,340,424 B2 | 3/2008 | Gang et al. |
| 7,340,434 B2 | 3/2008 | Schnall |
| 7,343,149 B2 | 3/2008 | Benco |
| 7,346,551 B2 | 3/2008 | Pe Jimenez et al. |
| 7,346,573 B1 | 3/2008 | Cobrinik et al. |
| 7,346,576 B2 | 3/2008 | Lent et al. |
| 7,356,503 B1 | 4/2008 | Johnson et al. |
| 7,360,251 B2 | 4/2008 | Spalink et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,373,324 B1 | 5/2008 | Engin et al. |
| 7,376,603 B1 | 5/2008 | Mayr et al. |
| 7,376,618 B1 | 5/2008 | Anderson et al. |
| 7,376,714 B1 | 5/2008 | Gerken |
| 7,379,880 B1 | 5/2008 | Pathria et al. |
| 7,379,913 B2 | 5/2008 | Steele et al. |
| 7,380,707 B1 | 6/2008 | Fredman |
| 7,383,215 B1 | 6/2008 | Navarro et al. |
| 7,383,227 B2 | 6/2008 | Weinflash et al. |
| 7,386,528 B2 | 6/2008 | Maloche et al. |
| 7,386,786 B2 | 6/2008 | Davis et al. |
| 7,392,203 B2 | 6/2008 | Edison et al. |
| 7,392,216 B1 | 6/2008 | Palmgren et al. |
| 7,392,221 B2 | 6/2008 | Nabe et al. |
| 7,395,273 B2 | 7/2008 | Khan et al. |
| 7,403,942 B1 | 7/2008 | Bayliss |
| 7,409,362 B2 | 8/2008 | Calabria |
| 7,418,431 B1 | 8/2008 | Nies et al. |
| 7,421,322 B1 | 9/2008 | Silversmith et al. |
| 7,424,439 B1 | 9/2008 | Fayyad et al. |
| 7,428,509 B2 | 9/2008 | Klebanoff |
| 7,428,519 B2 | 9/2008 | Minsky et al. |
| 7,428,526 B2 | 9/2008 | Miller et al. |
| 7,433,855 B2 | 10/2008 | Gavan et al. |
| 7,444,302 B2 | 10/2008 | Hu et al. |
| 7,451,095 B1 | 11/2008 | Bradley et al. |
| 7,458,508 B1 | 12/2008 | Shao et al. |
| 7,467,127 B1 | 12/2008 | Baccash et al. |
| 7,467,401 B2 | 12/2008 | Cicchitto |
| 7,472,088 B2 | 12/2008 | Taylor et al. |
| 7,479,949 B2 | 1/2009 | Jobs et al. |
| 7,499,868 B2 | 3/2009 | Galperin et al. |
| 7,505,938 B2 | 3/2009 | Lang et al. |
| 7,505,939 B2 | 3/2009 | Lent et al. |
| 7,509,117 B2 | 3/2009 | Yum |
| 7,512,221 B2 | 3/2009 | Toms |
| 7,516,149 B2 | 4/2009 | Motwani et al. |
| 7,527,967 B2 | 5/2009 | Chao et al. |
| 7,529,696 B2 | 5/2009 | Joao |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,266 B2 | 6/2009 | Beirne et al. |
| 7,548,886 B2 | 6/2009 | Kirkland et al. |
| 7,552,086 B1 | 6/2009 | Rajasekar et al. |
| 7,552,089 B2 | 6/2009 | Bruer et al. |
| 7,575,157 B2 | 6/2009 | Barnhardt et al. |
| 7,556,192 B2 | 7/2009 | Wokaty, Jr. |
| 7,562,184 B2 | 7/2009 | Henmi et al. |
| 7,571,139 B1 | 8/2009 | Giordano et al. |
| 7,580,856 B1 | 8/2009 | Pliha |
| 7,580,884 B2 | 8/2009 | Cook |
| 7,581,112 B2 | 8/2009 | Brown et al. |
| 7,584,126 B1 | 9/2009 | White |
| 7,584,146 B1 | 9/2009 | Duhon |
| 7,590,589 B2 | 9/2009 | Hoffberg |
| 7,593,889 B2 | 9/2009 | Raines et al. |
| 7,593,893 B1 | 9/2009 | Ladd et al. |
| 7,596,512 B1 | 9/2009 | Raines et al. |
| 7,596,716 B2 | 9/2009 | Frost et al. |
| 7,606,778 B2 | 10/2009 | Dewar |
| 7,610,216 B1 | 10/2009 | May et al. |
| 7,610,229 B1 | 10/2009 | Kornegay |
| 7,610,243 B2 | 10/2009 | Haggerty et al. |
| 7,610,257 B1 | 10/2009 | Abrahams |
| 7,610,261 B2 | 10/2009 | Maloche et al. |
| 7,613,671 B2 | 11/2009 | Serrano-Morales et al. |
| 7,620,592 B2 | 11/2009 | O'Mara et al. |

(56) References Cited

U.S. PATENT DOCUMENTS

| | | |
|---|---|---|
| 7,620,596 B2 | 11/2009 | Knudson et al. |
| 7,623,844 B2 | 11/2009 | Herrmann et al. |
| 7,624,068 B1 | 11/2009 | Heasley et al. |
| 7,630,932 B2 | 12/2009 | Danaher et al. |
| 7,630,933 B2 | 12/2009 | Peterson et al. |
| 7,653,592 B1 | 1/2010 | Flaxman et al. |
| 7,653,593 B2 | 1/2010 | Zarikian et al. |
| 7,657,471 B1 | 2/2010 | Sankaran et al. |
| 7,657,540 B1 | 2/2010 | Bayliss |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,676,413 B2 | 3/2010 | Chung et al. |
| 7,676,751 B2 | 3/2010 | Allen et al. |
| 7,676,756 B2 | 3/2010 | Vedula et al. |
| 7,686,214 B1 | 3/2010 | Shao et al. |
| 7,689,494 B2 | 3/2010 | Torre et al. |
| 7,689,504 B2 | 3/2010 | Warren et al. |
| 7,689,505 B2 | 3/2010 | Kasower |
| 7,689,506 B2 | 3/2010 | Fei et al. |
| 7,690,032 B1 | 3/2010 | Peirce |
| 7,693,787 B2 | 4/2010 | Provinse |
| 7,698,163 B2 | 4/2010 | Reed et al. |
| 7,698,214 B1 | 4/2010 | Lindgren |
| 7,702,550 B2 | 4/2010 | Perg et al. |
| 7,702,576 B2 | 4/2010 | Fahner et al. |
| 7,707,059 B2 | 4/2010 | Reed et al. |
| 7,707,102 B2 | 4/2010 | Rothstein |
| 7,708,190 B2 | 5/2010 | Brandt et al. |
| 7,711,635 B2 | 5/2010 | Steele et al. |
| 7,711,636 B2 | 5/2010 | Robida et al. |
| 7,720,846 B1 | 5/2010 | Bayliss |
| 7,725,300 B2 | 5/2010 | Pinto et al. |
| 7,734,522 B2 | 6/2010 | Johnson et al. |
| 7,734,523 B1 | 6/2010 | Cui et al. |
| 7,734,539 B2 | 6/2010 | Ghosh et al. |
| 7,739,223 B2 | 6/2010 | Vaschillo et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,761,379 B2 | 7/2010 | Zoldi et al. |
| 7,761,384 B2 | 7/2010 | Madhogarhia |
| 7,765,148 B2 | 7/2010 | German et al. |
| 7,774,257 B2 | 8/2010 | Maggioncalda et al. |
| 7,774,272 B2 | 8/2010 | Fahner et al. |
| 7,778,885 B1 | 8/2010 | Semprevivo et al. |
| 7,783,515 B1 | 8/2010 | Kumar et al. |
| 7,783,562 B1 | 8/2010 | Ellis |
| 7,788,147 B2 | 8/2010 | Haggerty et al. |
| 7,788,152 B2 | 8/2010 | Haggerty et al. |
| 7,792,732 B2 | 9/2010 | Haggerty et al. |
| 7,792,864 B1 | 9/2010 | Rice et al. |
| 7,793,835 B1 | 9/2010 | Coggeshall et al. |
| 7,797,252 B2 | 9/2010 | Rosskamm et al. |
| 7,801,811 B1 | 9/2010 | Merrell et al. |
| 7,801,812 B2 | 9/2010 | Conlin et al. |
| 7,801,828 B2 | 9/2010 | Candella et al. |
| 7,802,104 B2 | 9/2010 | Dickinson |
| 7,805,345 B2 | 9/2010 | Abrahams et al. |
| 7,805,362 B1 | 9/2010 | Merrell et al. |
| 7,813,981 B2 | 10/2010 | Fahner et al. |
| 7,814,004 B2 | 10/2010 | Haggerty et al. |
| 7,818,231 B2 | 10/2010 | Rajan |
| 7,822,665 B2 | 10/2010 | Haggerty et al. |
| 7,827,115 B2 | 11/2010 | Weller et al. |
| 7,831,526 B1 | 11/2010 | Crawford et al. |
| 7,835,932 B2 | 11/2010 | Minsky et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,844,534 B2 | 11/2010 | Haggerty et al. |
| 7,848,972 B1 | 12/2010 | Sharma |
| 7,848,978 B2 | 12/2010 | Imrey et al. |
| 7,848,987 B2 | 12/2010 | Haig |
| 7,849,004 B2 | 12/2010 | Choudhuri et al. |
| 7,853,518 B2 | 12/2010 | Cagan |
| 7,853,541 B1 | 12/2010 | Kapadia et al. |
| 7,853,998 B2 | 12/2010 | Blaisdell et al. |
| 7,856,386 B2 | 12/2010 | Hazlehurst et al. |
| 7,856,397 B2 | 12/2010 | Whipple et al. |
| 7,856,494 B2 | 12/2010 | Kulkarni |
| 7,860,782 B2 * | 12/2010 | Cash ............... G06Q 30/00 705/14.41 |
| 7,860,786 B2 | 12/2010 | Blackburn et al. |
| 7,870,078 B2 | 1/2011 | Clark et al. |
| 7,877,304 B1 | 1/2011 | Coulter |
| 7,877,320 B1 | 1/2011 | Downey |
| 7,877,322 B2 | 1/2011 | Nathans et al. |
| 7,890,420 B2 | 2/2011 | Haggerty et al. |
| 7,899,750 B1 | 3/2011 | Klieman et al. |
| 7,904,306 B2 | 3/2011 | Johnson et al. |
| 7,904,366 B2 | 3/2011 | Pogust |
| 7,908,242 B1 | 3/2011 | Achanta |
| 7,912,770 B2 | 3/2011 | Haggerty et al. |
| 7,912,842 B1 | 3/2011 | Bayliss et al. |
| 7,912,865 B2 | 3/2011 | Akerman et al. |
| 7,925,549 B2 | 4/2011 | Looney et al. |
| 7,925,578 B1 | 4/2011 | Hong et al. |
| 7,925,582 B1 | 4/2011 | Kornegay et al. |
| 7,930,196 B2 | 4/2011 | Fung et al. |
| 7,930,242 B2 | 4/2011 | Morris et al. |
| 7,930,285 B2 | 4/2011 | Abraham et al. |
| 7,937,335 B2 | 5/2011 | Crawford et al. |
| 7,941,363 B2 | 5/2011 | Tanaka et al. |
| 7,941,365 B1 | 5/2011 | Bradley et al. |
| 7,945,510 B1 | 5/2011 | Bradley et al. |
| 7,949,597 B2 | 5/2011 | Zadoorian et al. |
| 7,953,695 B2 | 5/2011 | Roller et al. |
| 7,954,698 B1 | 6/2011 | Pliha |
| 7,958,126 B2 | 6/2011 | Schachter |
| 7,962,404 B1 | 6/2011 | Metzger, II et al. |
| 7,966,255 B2 | 6/2011 | Wong et al. |
| 7,970,676 B2 | 6/2011 | Feinstein |
| 7,970,679 B2 | 6/2011 | Kasower |
| 7,970,698 B2 | 6/2011 | Gupta et al. |
| 7,974,860 B1 | 7/2011 | Travis |
| 7,974,919 B2 | 7/2011 | Conlin et al. |
| 7,983,976 B2 | 7/2011 | Nafeh et al. |
| 7,991,666 B2 | 8/2011 | Haggerty et al. |
| 7,991,677 B2 | 8/2011 | Haggerty et al. |
| 7,991,689 B1 | 8/2011 | Brunzell et al. |
| 7,996,521 B2 | 8/2011 | Chamberlain et al. |
| 8,001,042 B1 | 8/2011 | Brunzell et al. |
| 8,005,712 B2 | 8/2011 | von Davier et al. |
| 8,005,759 B2 | 8/2011 | Hirtenstein et al. |
| 8,006,261 B1 | 8/2011 | Haberman et al. |
| 8,015,045 B2 | 9/2011 | Galperin et al. |
| 8,019,828 B2 | 9/2011 | Cash et al. |
| 8,019,843 B2 | 9/2011 | Cash et al. |
| 8,024,245 B2 | 9/2011 | Haggerty et al. |
| 8,024,263 B2 | 9/2011 | Zarikian et al. |
| 8,024,264 B2 | 9/2011 | Chaudhuri et al. |
| 8,024,778 B2 | 9/2011 | Cash et al. |
| 8,025,220 B2 | 9/2011 | Zoldi et al. |
| 8,027,894 B2 | 9/2011 | Feinstein et al. |
| 8,036,979 B1 | 10/2011 | Torrez et al. |
| 8,046,271 B2 | 10/2011 | Jimenez et al. |
| 8,055,579 B2 | 11/2011 | Davies et al. |
| 8,060,424 B2 | 11/2011 | Kasower |
| 8,065,233 B2 | 11/2011 | Lee et al. |
| 8,065,234 B2 | 11/2011 | Liao et al. |
| 8,073,752 B2 | 12/2011 | Haggerty et al. |
| 8,073,768 B2 | 12/2011 | Haggerty et al. |
| 8,078,453 B2 | 12/2011 | Shaw |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,082,202 B2 | 12/2011 | Weiss |
| 8,086,509 B2 | 12/2011 | Haggerty et al. |
| 8,086,523 B1 | 12/2011 | Palmer |
| 8,086,524 B1 | 12/2011 | Craig et al. |
| 8,086,525 B2 | 12/2011 | Atwood et al. |
| 8,090,734 B2 | 1/2012 | Maloche et al. |
| 8,095,443 B2 | 1/2012 | DeBie |

(56) References Cited

U.S. PATENT DOCUMENTS

| | | |
|---|---|---|
| 8,099,356 B2 | 1/2012 | Feinstein et al. |
| 8,099,376 B2 | 1/2012 | Serrano-Morales et al. |
| 8,103,530 B2 | 1/2012 | Quiring et al. |
| 8,104,671 B2 | 1/2012 | Besecker et al. |
| 8,104,679 B2 | 1/2012 | Brown |
| 8,108,301 B2 | 1/2012 | Gupta et al. |
| 8,121,918 B2 | 2/2012 | Haggerty et al. |
| 8,126,805 B2 | 2/2012 | Sulkowski et al. |
| 8,127,982 B1 | 3/2012 | Casey et al. |
| 8,131,614 B2 | 3/2012 | Haggerty et al. |
| 8,131,639 B2 | 3/2012 | Haggerty et al. |
| 8,135,642 B1 | 3/2012 | Krause |
| 8,145,754 B2 | 3/2012 | Chamberlain et al. |
| 8,150,744 B2 | 4/2012 | Zoldi et al. |
| 8,160,960 B1 | 4/2012 | Fei et al. |
| 8,161,104 B2 | 4/2012 | Tomkow |
| 8,170,938 B2 | 5/2012 | Haggerty et al. |
| 8,175,945 B2 | 5/2012 | Haggerty et al. |
| 8,180,654 B2 | 5/2012 | Berkman et al. |
| 8,185,408 B2 | 5/2012 | Baldwin, Jr. et al. |
| 8,190,511 B2 | 5/2012 | Erickson |
| RE43,474 E | 6/2012 | Majoor |
| 8,195,549 B2 | 6/2012 | Kasower |
| 8,200,595 B1 | 6/2012 | De Zilwa et al. |
| 8,200,609 B2 | 6/2012 | Crawford et al. |
| 8,200,693 B2 | 6/2012 | Steele et al. |
| 8,204,774 B2 | 6/2012 | Chwast et al. |
| 8,209,250 B2 | 6/2012 | Bradway et al. |
| 8,214,238 B1 | 7/2012 | Fairfield et al. |
| 8,214,262 B1 | 7/2012 | Semprevivo et al. |
| 8,219,464 B2 | 7/2012 | Inghelbrecht et al. |
| 8,234,209 B2 | 7/2012 | Zadoorian et al. |
| 8,234,498 B2 | 7/2012 | Britti et al. |
| 8,237,716 B2 | 8/2012 | Kolipaka et al. |
| 8,255,423 B2 | 8/2012 | Ralph et al. |
| 8,266,090 B2 | 9/2012 | Crawford et al. |
| 8,271,378 B2 | 9/2012 | Chaudhuri et al. |
| 8,271,935 B2 | 9/2012 | Lewis |
| 8,280,805 B1 | 10/2012 | Abrahams et al. |
| 8,280,836 B2 | 10/2012 | Kumar |
| 8,285,577 B1 | 10/2012 | Galperin et al. |
| 8,285,656 B1 | 10/2012 | Chang et al. |
| 8,290,840 B2 | 10/2012 | Kasower |
| 8,296,205 B2 | 10/2012 | Zoldi |
| 8,296,229 B1 | 10/2012 | Yellin et al. |
| 8,301,574 B2 | 10/2012 | Kilger et al. |
| 8,312,389 B2 | 11/2012 | Crawford et al. |
| 8,315,942 B2 | 11/2012 | Haggerty et al. |
| 8,315,943 B2 | 11/2012 | Torrez et al. |
| 8,326,671 B2 | 12/2012 | Haggerty et al. |
| 8,326,672 B2 | 12/2012 | Haggerty et al. |
| 8,326,760 B2 | 12/2012 | Ma et al. |
| 8,352,343 B2 | 1/2013 | Haggerty et al. |
| 8,364,518 B1 | 1/2013 | Blake et al. |
| 8,364,588 B2 | 1/2013 | Celka et al. |
| 8,386,377 B1 | 2/2013 | Xiong et al. |
| 8,392,334 B2 | 3/2013 | Hirtenstein et al. |
| 8,401,889 B2 | 3/2013 | Chwast et al. |
| 8,401,946 B2 | 3/2013 | Zoldi et al. |
| 8,401,950 B2 | 3/2013 | Lyons et al. |
| 8,417,587 B2 | 4/2013 | Jimenez et al. |
| 8,418,254 B2 | 4/2013 | Britti et al. |
| 8,423,488 B2 | 4/2013 | Surpi |
| 8,452,611 B1 | 5/2013 | Johnson et al. |
| 8,458,074 B2 | 6/2013 | Showalter |
| 8,463,595 B1 | 6/2013 | Rehling et al. |
| 8,468,198 B2 | 6/2013 | Tomkow |
| 8,478,673 B2 | 7/2013 | Haggerty et al. |
| 8,489,502 B2 | 7/2013 | Morris et al. |
| 8,504,470 B1 | 8/2013 | Chirehdast |
| 8,510,184 B2 | 8/2013 | Imrey et al. |
| 8,510,189 B2 | 8/2013 | Imrey et al. |
| 8,515,828 B1 | 8/2013 | Wolf et al. |
| 8,515,844 B2 | 8/2013 | Kasower |
| 8,515,862 B2 | 8/2013 | Zhang et al. |
| 8,527,596 B2 | 9/2013 | Long et al. |
| 8,533,322 B2 | 9/2013 | Chamberlain et al. |
| 8,560,434 B2 | 10/2013 | Morris et al. |
| 8,566,167 B2 | 10/2013 | Munjal |
| 8,595,101 B1 | 11/2013 | Daukas et al. |
| 8,595,219 B1 | 11/2013 | Thompson |
| 8,600,854 B2 | 12/2013 | Mayr et al. |
| 8,600,870 B2 | 12/2013 | Milana |
| 8,606,626 B1 | 12/2013 | DeSoto et al. |
| 8,606,666 B1 | 12/2013 | Courbage et al. |
| 8,606,694 B2 | 12/2013 | Campbell et al. |
| 8,626,560 B1 | 1/2014 | Anderson |
| 8,626,646 B2 | 1/2014 | Torrez et al. |
| 8,630,929 B2 | 1/2014 | Haggerty et al. |
| 8,639,920 B2 | 1/2014 | Stack et al. |
| 8,660,943 B1 | 2/2014 | Chirehdast |
| 8,682,762 B2 | 3/2014 | Fahner |
| 8,694,390 B2 | 4/2014 | Imrey et al. |
| 8,694,420 B1 | 4/2014 | Oliai |
| 8,700,597 B2 | 4/2014 | Gupta et al. |
| 8,706,545 B2 | 4/2014 | Narayanaswamy et al. |
| 8,706,596 B2 | 4/2014 | Cohen et al. |
| 8,706,615 B2 | 4/2014 | Merkle |
| 8,730,241 B2 | 5/2014 | Chhaparwal et al. |
| 8,732,004 B1 | 5/2014 | Ramos et al. |
| 8,738,515 B2 | 5/2014 | Chaudhuri et al. |
| 8,751,378 B2 | 6/2014 | Dornhelm et al. |
| 8,751,461 B2 | 6/2014 | Abraham et al. |
| 8,768,826 B2 | 7/2014 | Imrey et al. |
| 8,775,291 B1 | 7/2014 | Mellman et al. |
| 8,775,299 B2 | 7/2014 | Achanta et al. |
| 8,781,953 B2 | 7/2014 | Kasower |
| 8,781,975 B2 | 7/2014 | Bennett et al. |
| 8,825,544 B2 | 9/2014 | Imrey et al. |
| 8,930,216 B1 | 1/2015 | Johnson et al. |
| 8,930,251 B2 | 1/2015 | DeBie |
| 8,930,262 B1 | 1/2015 | Searson et al. |
| 8,930,263 B1 | 1/2015 | Mahacek et al. |
| 8,966,649 B2 | 2/2015 | Stack et al. |
| 8,984,022 B1 | 3/2015 | Crawford et al. |
| 9,043,930 B2 | 5/2015 | Britti et al. |
| 9,058,340 B1 | 6/2015 | Chamberlain et al. |
| 9,058,627 B1 | 6/2015 | Wasser et al. |
| 9,063,226 B2 | 6/2015 | Zheng et al. |
| 9,087,335 B2 | 7/2015 | Rane et al. |
| 9,123,056 B2 | 9/2015 | Singh et al. |
| 9,292,581 B2 | 3/2016 | Thompson |
| 9,292,860 B2 | 3/2016 | Singh et al. |
| 9,378,500 B2 | 6/2016 | Jimenez et al. |
| 9,483,236 B2 | 11/2016 | Yershov et al. |
| 9,483,727 B2 | 11/2016 | Zhao et al. |
| 9,489,497 B2 | 11/2016 | MaGill et al. |
| 9,508,092 B1 | 11/2016 | De Soto et al. |
| 9,509,711 B1 | 11/2016 | Keanini |
| 9,563,916 B1 | 2/2017 | Torrez et al. |
| 9,619,579 B1 | 4/2017 | Courbage et al. |
| 9,632,847 B2 | 4/2017 | Raghavan et al. |
| 9,652,802 B1 | 5/2017 | Kasower |
| 9,660,869 B2 | 5/2017 | Ripley et al. |
| 9,690,575 B2 | 6/2017 | Prismon et al. |
| 9,710,663 B2 | 7/2017 | Britti et al. |
| 9,721,267 B2 | 8/2017 | Fahner et al. |
| 9,779,187 B1 | 10/2017 | Gao et al. |
| 9,870,589 B1 | 1/2018 | Arnold et al. |
| 9,916,596 B1 | 3/2018 | DeSoto et al. |
| 9,916,621 B1 | 3/2018 | Wasser et al. |
| 9,990,270 B2 | 6/2018 | Ballal |
| 10,078,868 B1 | 9/2018 | Courbage et al. |
| 10,083,263 B2 | 9/2018 | Gao et al. |
| 10,121,194 B1 | 11/2018 | Torrez et al. |
| 10,133,562 B2 | 11/2018 | Yershov et al. |
| 10,133,980 B2 | 11/2018 | Turner et al. |
| 10,162,630 B2 | 12/2018 | Bouley et al. |
| 10,178,111 B1 | 1/2019 | Wilson et al. |
| 10,242,019 B1 | 3/2019 | Shan et al. |
| 10,262,362 B1 | 4/2019 | Hu et al. |
| 10,311,466 B1 | 6/2019 | DeSoto et al. |
| 10,366,342 B2 | 7/2019 | Zhao et al. |
| 10,380,508 B2 | 8/2019 | Prismon et al. |

(56) References Cited

U.S. PATENT DOCUMENTS

| | | |
|---|---|---|
| 10,402,901 B2 | 9/2019 | Courbage et al. |
| 10,445,152 B1 | 10/2019 | Zhang et al. |
| 10,474,566 B2 | 11/2019 | Indurthivenkata et al. |
| 10,515,412 B2 | 12/2019 | Rocklitz |
| 10,521,735 B2 | 12/2019 | Ballal |
| 10,535,009 B2 | 1/2020 | Turner et al. |
| 10,558,913 B1 | 2/2020 | Turner et al. |
| 10,565,178 B1 | 2/2020 | Rajagopal |
| 10,620,944 B2 | 4/2020 | Prismon et al. |
| 10,643,154 B2 | 5/2020 | Litherland et al. |
| 10,650,449 B2 | 5/2020 | Courbage et al. |
| 10,671,812 B2 | 6/2020 | Bondugula et al. |
| 10,692,105 B1 | 6/2020 | DeSoto et al. |
| 10,713,140 B2 | 7/2020 | Gupta et al. |
| 10,713,596 B2 | 7/2020 | Cozine et al. |
| 10,726,440 B1 | 7/2020 | Bradford |
| 10,789,422 B2 | 9/2020 | Banaszak et al. |
| 2001/0013011 A1 | 8/2001 | Day et al. |
| 2001/0014868 A1 | 8/2001 | Herz et al. |
| 2001/0016833 A1 | 8/2001 | Everling et al. |
| 2001/0027413 A1 | 10/2001 | Bhutta |
| 2001/0029462 A1 | 10/2001 | Tealdi et al. |
| 2001/0029470 A1 | 10/2001 | Schultz et al. |
| 2001/0034618 A1 | 10/2001 | Kessler et al. |
| 2001/0037289 A1 | 11/2001 | Mayr et al. |
| 2001/0037332 A1 | 11/2001 | Miller et al. |
| 2001/0039523 A1 | 11/2001 | Iwamoto |
| 2001/0049620 A1 | 12/2001 | Blasko |
| 2001/0049672 A1 | 12/2001 | Moore et al. |
| 2002/0010594 A1 | 1/2002 | Levine |
| 2002/0019804 A1 | 2/2002 | Sutton |
| 2002/0023051 A1 | 2/2002 | Kunzle et al. |
| 2002/0023143 A1 | 2/2002 | Stephenson et al. |
| 2002/0026394 A1 | 2/2002 | Savage et al. |
| 2002/0026411 A1 | 2/2002 | Nathans et al. |
| 2002/0029162 A1 | 3/2002 | Mascarenhas |
| 2002/0035511 A1 | 3/2002 | Haji et al. |
| 2002/0046096 A1 | 4/2002 | Srinivasan et al. |
| 2002/0049626 A1 | 4/2002 | Mathias et al. |
| 2002/0049701 A1 | 4/2002 | Nabe et al. |
| 2002/0049738 A1 | 4/2002 | Epstein |
| 2002/0052836 A1 | 5/2002 | Galperin et al. |
| 2002/0052841 A1 | 5/2002 | Guthrie et al. |
| 2002/0055869 A1 | 5/2002 | Hegg |
| 2002/0069122 A1 | 6/2002 | Yun et al. |
| 2002/0072927 A1 | 6/2002 | Phelan et al. |
| 2002/0072975 A1 | 6/2002 | Steele et al. |
| 2002/0077964 A1 | 6/2002 | Brody et al. |
| 2002/0082892 A1 | 6/2002 | Raffel et al. |
| 2002/0087460 A1 | 7/2002 | Hornung |
| 2002/0091706 A1 | 7/2002 | Anderson et al. |
| 2002/0095360 A1 | 7/2002 | Joao |
| 2002/0099628 A1 | 7/2002 | Takaoka et al. |
| 2002/0099635 A1 | 7/2002 | Guiragosian |
| 2002/0099641 A1 | 7/2002 | Mills et al. |
| 2002/0099649 A1 | 7/2002 | Lee et al. |
| 2002/0099824 A1 | 7/2002 | Bender et al. |
| 2002/0099936 A1 | 7/2002 | Kou et al. |
| 2002/0103680 A1 | 8/2002 | Newman |
| 2002/0107849 A1 | 8/2002 | Hickey et al. |
| 2002/0111845 A1 | 8/2002 | Chong |
| 2002/0119824 A1 | 8/2002 | Allen |
| 2002/0120504 A1 | 8/2002 | Gould et al. |
| 2002/0123928 A1 | 9/2002 | Eldering et al. |
| 2002/0128960 A1 | 9/2002 | Lambiotte et al. |
| 2002/0128962 A1 | 9/2002 | Kasower |
| 2002/0129368 A1 | 9/2002 | Schlack et al. |
| 2002/0133444 A1 | 9/2002 | Sankaran et al. |
| 2002/0133503 A1 | 9/2002 | Amar et al. |
| 2002/0138297 A1 | 9/2002 | Lee |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0138417 A1 | 9/2002 | Lawrence |
| 2002/0143661 A1 | 10/2002 | Tumulty et al. |
| 2002/0147617 A1 | 10/2002 | Schoenbaum et al. |
| 2002/0147623 A1 | 10/2002 | Rifaat |
| 2002/0147669 A1 | 10/2002 | Taylor et al. |
| 2002/0147695 A1 | 10/2002 | Khedkar et al. |
| 2002/0156676 A1 | 10/2002 | Ahrens et al. |
| 2002/0161496 A1 | 10/2002 | Yamaki |
| 2002/0161664 A1 | 10/2002 | Shaya et al. |
| 2002/0161711 A1 | 10/2002 | Sartor et al. |
| 2002/0165757 A1 | 11/2002 | Lisser |
| 2002/0165839 A1 | 11/2002 | Taylor et al. |
| 2002/0169747 A1 | 11/2002 | Chapman et al. |
| 2002/0173984 A1 | 11/2002 | Robertson et al. |
| 2002/0173994 A1 | 11/2002 | Ferguson, III |
| 2002/0184054 A1 | 12/2002 | Cox et al. |
| 2002/0184255 A1 | 12/2002 | Edd et al. |
| 2002/0188478 A1 | 12/2002 | Breeland et al. |
| 2002/0188544 A1 | 12/2002 | Wizon et al. |
| 2002/0194099 A1 | 12/2002 | Weiss |
| 2002/0194103 A1 | 12/2002 | Nabe |
| 2002/0194140 A1 | 12/2002 | Makuck |
| 2002/0198824 A1 | 12/2002 | Cook |
| 2003/0000568 A1 | 1/2003 | Gonsiorawski |
| 2003/0002639 A1 | 1/2003 | Huie |
| 2003/0004787 A1 | 1/2003 | Tripp et al. |
| 2003/0004855 A1 | 1/2003 | Dutta et al. |
| 2003/0004865 A1 | 1/2003 | Kinoshita |
| 2003/0009368 A1 | 1/2003 | Kitts |
| 2003/0009393 A1 | 1/2003 | Norris et al. |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0018578 A1 | 1/2003 | Schultz |
| 2003/0018769 A1 | 1/2003 | Foulger et al. |
| 2003/0023489 A1 | 1/2003 | McGuire et al. |
| 2003/0028402 A1 | 2/2003 | Ulrich et al. |
| 2003/0033242 A1 | 2/2003 | Lynch et al. |
| 2003/0033261 A1 | 2/2003 | Knegendorf |
| 2003/0036926 A1 | 2/2003 | Starkey et al. |
| 2003/0036996 A1 | 2/2003 | Lazerson |
| 2003/0037054 A1 | 2/2003 | Dutta et al. |
| 2003/0041019 A1 | 2/2003 | Vagim, III et al. |
| 2003/0041031 A1 | 2/2003 | Hedy |
| 2003/0046112 A1 | 3/2003 | Dutta et al. |
| 2003/0046222 A1 | 3/2003 | Bard et al. |
| 2003/0046223 A1 | 3/2003 | Crawford et al. |
| 2003/0050795 A1 | 3/2003 | Baldwin, Jr. et al. |
| 2003/0050796 A1 | 3/2003 | Baldwin, Jr. et al. |
| 2003/0060284 A1 | 3/2003 | Hamalainen et al. |
| 2003/0061132 A1 | 3/2003 | Yu et al. |
| 2003/0061163 A1 | 3/2003 | Durfield |
| 2003/0065563 A1 | 4/2003 | Elliott et al. |
| 2003/0069839 A1 | 4/2003 | Whittington et al. |
| 2003/0078877 A1 | 4/2003 | Beirne et al. |
| 2003/0093289 A1 | 5/2003 | Thornley et al. |
| 2003/0093311 A1 | 5/2003 | Knowlson |
| 2003/0093366 A1 | 5/2003 | Halper et al. |
| 2003/0097320 A1 | 5/2003 | Gordon |
| 2003/0097329 A1 | 5/2003 | Nabe et al. |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0105696 A1 | 6/2003 | Kalotay et al. |
| 2003/0105728 A1 | 6/2003 | Yano et al. |
| 2003/0110111 A1 | 6/2003 | Nalebuff et al. |
| 2003/0110293 A1 | 6/2003 | Friedman et al. |
| 2003/0113727 A1 | 6/2003 | Girn et al. |
| 2003/0115080 A1 | 6/2003 | Kasravi et al. |
| 2003/0115133 A1 | 6/2003 | Bian |
| 2003/0120591 A1 | 6/2003 | Birkhead et al. |
| 2003/0135451 A1 | 7/2003 | O'Brien et al. |
| 2003/0139986 A1 | 7/2003 | Roberts |
| 2003/0144950 A1 | 7/2003 | O'Brien et al. |
| 2003/0149610 A1 | 8/2003 | Rowan et al. |
| 2003/0149659 A1 | 8/2003 | Danaher et al. |
| 2003/0158751 A1 | 8/2003 | Suresh et al. |
| 2003/0158776 A1 | 8/2003 | Landesmann |
| 2003/0164497 A1 | 9/2003 | Carcia et al. |
| 2003/0167218 A1 | 9/2003 | Field et al. |
| 2003/0167226 A1 | 9/2003 | Britton et al. |

(56) References Cited

U.S. PATENT DOCUMENTS

| | | |
|---|---|---|
| 2003/0171942 A1 | 9/2003 | Gaito |
| 2003/0182214 A1 | 9/2003 | Taylor |
| 2003/0187768 A1 | 10/2003 | Ryan et al. |
| 2003/0195830 A1 | 10/2003 | Merkoulovitch et al. |
| 2003/0195859 A1 | 10/2003 | Lawrence |
| 2003/0200151 A1 | 10/2003 | Ellenson et al. |
| 2003/0205845 A1 | 11/2003 | Pichler et al. |
| 2003/0208362 A1 | 11/2003 | Enthoven et al. |
| 2003/0208412 A1 | 11/2003 | Hillestad et al. |
| 2003/0208428 A1 | 11/2003 | Raynes et al. |
| 2003/0212618 A1 | 11/2003 | Keyes et al. |
| 2003/0212654 A1 | 11/2003 | Harper et al. |
| 2003/0216965 A1 | 11/2003 | Libman |
| 2003/0217003 A1 | 11/2003 | Weinflash et al. |
| 2003/0219709 A1 | 11/2003 | Olenick et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0229507 A1 | 12/2003 | Perge |
| 2003/0229580 A1 | 12/2003 | Gass et al. |
| 2003/0229892 A1 | 12/2003 | Sardera |
| 2003/0233259 A1 | 12/2003 | Mistretta et al. |
| 2003/0233278 A1 | 12/2003 | Marshall |
| 2003/0233323 A1 | 12/2003 | Bilski et al. |
| 2003/0233370 A1 | 12/2003 | Barabas et al. |
| 2003/0233655 A1 | 12/2003 | Gutta et al. |
| 2003/0236738 A1 | 12/2003 | Lange et al. |
| 2004/0002916 A1 | 1/2004 | Timmerman et al. |
| 2004/0006536 A1 | 1/2004 | Kawashima et al. |
| 2004/0010443 A1 | 1/2004 | May et al. |
| 2004/0019518 A1 | 1/2004 | Abraham et al. |
| 2004/0023637 A1 | 2/2004 | Johnson et al. |
| 2004/0024692 A1 | 2/2004 | Turbeville et al. |
| 2004/0029311 A1 | 2/2004 | Snyder et al. |
| 2004/0030649 A1 | 2/2004 | Nelson et al. |
| 2004/0030667 A1 | 2/2004 | Xu et al. |
| 2004/0033375 A1 | 2/2004 | Mori |
| 2004/0034570 A1 | 2/2004 | Davis et al. |
| 2004/0039681 A1 | 2/2004 | Cullen et al. |
| 2004/0039686 A1 | 2/2004 | Klebanoff |
| 2004/0039688 A1 | 2/2004 | Sulkowski et al. |
| 2004/0044615 A1 | 3/2004 | Xue et al. |
| 2004/0044617 A1 | 3/2004 | Lu |
| 2004/0046497 A1 | 3/2004 | Shaepkens et al. |
| 2004/0049452 A1 | 3/2004 | Blagg |
| 2004/0049473 A1 | 3/2004 | Gower et al. |
| 2004/0054619 A1 | 3/2004 | Watson et al. |
| 2004/0059626 A1 | 3/2004 | Smallwood |
| 2004/0059653 A1 | 3/2004 | Verkuylen et al. |
| 2004/0062213 A1 | 4/2004 | Koss |
| 2004/0064402 A1 | 4/2004 | Dreyer et al. |
| 2004/0073456 A1 | 4/2004 | Gottlieb et al. |
| 2004/0078248 A1 | 4/2004 | Altschuler |
| 2004/0078324 A1 | 4/2004 | Lonnberg et al. |
| 2004/0083215 A1 | 4/2004 | de Jong |
| 2004/0088221 A1 | 5/2004 | Katz et al. |
| 2004/0093278 A1 | 5/2004 | Burchetta et al. |
| 2004/0098625 A1 | 5/2004 | Lagadec et al. |
| 2004/0102197 A1 | 5/2004 | Dietz |
| 2004/0103147 A1 | 5/2004 | Flesher et al. |
| 2004/0107123 A1 | 6/2004 | Haffner et al. |
| 2004/0107125 A1 | 6/2004 | Guheen et al. |
| 2004/0111292 A1 | 6/2004 | Hutchins |
| 2004/0111305 A1 | 6/2004 | Gavan et al. |
| 2004/0111358 A1 | 6/2004 | Lange et al. |
| 2004/0111363 A1 | 6/2004 | Trench et al. |
| 2004/0117235 A1 | 6/2004 | Shacham |
| 2004/0117358 A1 | 6/2004 | Von Kaenel et al. |
| 2004/0122730 A1 | 6/2004 | Tucciarone et al. |
| 2004/0122735 A1 | 6/2004 | Meshkin |
| 2004/0128150 A1 | 7/2004 | Lundegren |
| 2004/0128227 A1 | 7/2004 | Whipple et al. |
| 2004/0128229 A1 | 7/2004 | Raines et al. |
| 2004/0128230 A1 | 7/2004 | Oppenheimer et al. |
| 2004/0128232 A1 | 7/2004 | Descloux |
| 2004/0128236 A1 | 7/2004 | Brown et al. |
| 2004/0139035 A1 | 7/2004 | Wang |
| 2004/0143526 A1 | 7/2004 | Monasterio et al. |
| 2004/0143546 A1 | 7/2004 | Wood et al. |
| 2004/0153330 A1 | 8/2004 | Miller et al. |
| 2004/0153448 A1 | 8/2004 | Cheng et al. |
| 2004/0158520 A1 | 8/2004 | Noh |
| 2004/0158523 A1 | 8/2004 | Dort |
| 2004/0163101 A1 | 8/2004 | Swix |
| 2004/0167793 A1 | 8/2004 | Masuoka et al. |
| 2004/0176995 A1 | 9/2004 | Fusz |
| 2004/0177030 A1 | 9/2004 | Shoham |
| 2004/0177046 A1 | 9/2004 | Ogram |
| 2004/0186807 A1 | 9/2004 | Nathans et al. |
| 2004/0193535 A1 | 9/2004 | Barazesh |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0199789 A1 | 10/2004 | Shaw et al. |
| 2004/0205157 A1 | 10/2004 | Bibelnieks et al. |
| 2004/0212299 A1 | 10/2004 | Ishikawa et al. |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0220896 A1 | 11/2004 | Finlay et al. |
| 2004/0225545 A1 | 11/2004 | Turner et al. |
| 2004/0225586 A1 | 11/2004 | Woods et al. |
| 2004/0225594 A1 | 11/2004 | Nolan, III et al. |
| 2004/0225596 A1 | 11/2004 | Kemper et al. |
| 2004/0225597 A1 | 11/2004 | Oppenheimer et al. |
| 2004/0230448 A1 | 11/2004 | Schaich |
| 2004/0230459 A1 | 11/2004 | Dordick et al. |
| 2004/0230527 A1 | 11/2004 | Hansen et al. |
| 2004/0230534 A1 | 11/2004 | McGough |
| 2004/0230820 A1 | 11/2004 | Hui Hsu et al. |
| 2004/0243450 A1 | 12/2004 | Bernard, Jr. et al. |
| 2004/0243506 A1 | 12/2004 | Das |
| 2004/0243518 A1 | 12/2004 | Clifton et al. |
| 2004/0243588 A1 | 12/2004 | Tanner et al. |
| 2004/0261116 A1 | 12/2004 | Mckeown et al. |
| 2004/0267660 A1 | 12/2004 | Greenwood et al. |
| 2005/0004805 A1 | 1/2005 | Srinivasan |
| 2005/0004855 A1 | 1/2005 | Jenson et al. |
| 2005/0015330 A1 | 1/2005 | Beery et al. |
| 2005/0021397 A1 | 1/2005 | Cui et al. |
| 2005/0021476 A1 | 1/2005 | Candella et al. |
| 2005/0027632 A1 | 2/2005 | Zeitoun et al. |
| 2005/0027633 A1 | 2/2005 | Fortuna et al. |
| 2005/0027983 A1 | 2/2005 | Klawon |
| 2005/0033734 A1 | 2/2005 | Chess et al. |
| 2005/0038726 A1 | 2/2005 | Salomon et al. |
| 2005/0050027 A1 | 3/2005 | Yeh et al. |
| 2005/0058262 A1 | 3/2005 | Timmins et al. |
| 2005/0065874 A1 | 3/2005 | Lefner et al. |
| 2005/0080821 A1 | 4/2005 | Breil et al. |
| 2005/0086071 A1 | 4/2005 | Fox, Jr. et al. |
| 2005/0086072 A1 | 4/2005 | Fox, Jr. et al. |
| 2005/0086261 A1 | 4/2005 | Mammone |
| 2005/0086579 A1 | 4/2005 | Leitner et al. |
| 2005/0091164 A1 | 4/2005 | Varble |
| 2005/0097039 A1 | 5/2005 | Kulcsar et al. |
| 2005/0102206 A1 | 5/2005 | Savasoglu et al. |
| 2005/0102225 A1 | 5/2005 | Oppenheimer et al. |
| 2005/0102226 A1 | 5/2005 | Oppenheimer et al. |
| 2005/0113991 A1 | 5/2005 | Rogers et al. |
| 2005/0125350 A1 | 6/2005 | Tidwell et al. |
| 2005/0130704 A1 | 6/2005 | McParland et al. |
| 2005/0137912 A1 | 6/2005 | Rao et al. |
| 2005/0137963 A1 | 6/2005 | Ricketts et al. |
| 2005/0144067 A1 | 6/2005 | Farahat et al. |
| 2005/0144452 A1 | 6/2005 | Lynch et al. |
| 2005/0144641 A1 | 6/2005 | Lewis |
| 2005/0154664 A1 | 7/2005 | Guy et al. |
| 2005/0154665 A1 | 7/2005 | Kerr |
| 2005/0154769 A1* | 7/2005 | Eckart .................. G06Q 40/04 |
| 2005/0159996 A1 | 7/2005 | Lazaraus et al. |
| 2005/0177489 A1 | 8/2005 | Neff et al. |

(56) References Cited

U.S. PATENT DOCUMENTS

| | | |
|---|---|---|
| 2005/0187860 A1 | 8/2005 | Peterson et al. |
| 2005/0189414 A1 | 9/2005 | Fano et al. |
| 2005/0192008 A1 | 9/2005 | Desai et al. |
| 2005/0197953 A1 | 9/2005 | Broadbent et al. |
| 2005/0197954 A1 | 9/2005 | Maitland et al. |
| 2005/0201272 A1 | 9/2005 | Wang et al. |
| 2005/0209880 A1 | 9/2005 | Drelicharz et al. |
| 2005/0209892 A1 | 9/2005 | Miller |
| 2005/0209922 A1 | 9/2005 | Hofmeister |
| 2005/0222900 A1 | 10/2005 | Fuloria et al. |
| 2005/0228692 A1 | 10/2005 | Hodgon |
| 2005/0228748 A1 | 10/2005 | Togher et al. |
| 2005/0246256 A1 | 11/2005 | Gastineau et al. |
| 2005/0251474 A1 | 11/2005 | Shinn et al. |
| 2005/0251820 A1 | 11/2005 | Stefanik et al. |
| 2005/0256780 A1 | 11/2005 | Eldred |
| 2005/0256809 A1 | 11/2005 | Sadri |
| 2005/0257250 A1 | 11/2005 | Mitchell et al. |
| 2005/0262014 A1 | 11/2005 | Fickes |
| 2005/0262158 A1 | 11/2005 | Sauermann |
| 2005/0267774 A1 | 12/2005 | Merritt et al. |
| 2005/0273442 A1 | 12/2005 | Bennett et al. |
| 2005/0273849 A1 | 12/2005 | Araujo et al. |
| 2005/0278246 A1 | 12/2005 | Friedman et al. |
| 2005/0278542 A1 | 12/2005 | Pierson et al. |
| 2005/0279824 A1 | 12/2005 | Anderson et al. |
| 2005/0279827 A1 | 12/2005 | Mascavage et al. |
| 2005/0288954 A1 | 12/2005 | McCarthy et al. |
| 2005/0288998 A1 | 12/2005 | Verma et al. |
| 2005/0289003 A1 | 12/2005 | Thompson et al. |
| 2006/0004626 A1 | 1/2006 | Holmen et al. |
| 2006/0004731 A1 | 1/2006 | Seibel et al. |
| 2006/0004753 A1 | 1/2006 | Coifman et al. |
| 2006/0010055 A1 | 1/2006 | Morita et al. |
| 2006/0014129 A1 | 1/2006 | Coleman et al. |
| 2006/0015425 A1 | 1/2006 | Brooks |
| 2006/0020611 A1 | 1/2006 | Gilbert et al. |
| 2006/0031158 A1 | 2/2006 | Orman |
| 2006/0031747 A1 | 2/2006 | Wada et al. |
| 2006/0032909 A1 | 2/2006 | Seegar |
| 2006/0041443 A1 | 2/2006 | Horvath |
| 2006/0041464 A1 | 2/2006 | Powers et al. |
| 2006/0041840 A1 | 2/2006 | Blair |
| 2006/0059073 A1 | 3/2006 | Walzak |
| 2006/0059110 A1 | 3/2006 | Madhok et al. |
| 2006/0074986 A1 | 4/2006 | Mallalieu et al. |
| 2006/0080126 A1 | 4/2006 | Greer et al. |
| 2006/0080139 A1 | 4/2006 | Mainzer |
| 2006/0080230 A1 | 4/2006 | Freiberg |
| 2006/0080233 A1 | 4/2006 | Mendelovich et al. |
| 2006/0080251 A1 | 4/2006 | Fried et al. |
| 2006/0080263 A1 | 4/2006 | Willis et al. |
| 2006/0085331 A1 | 4/2006 | Imrey et al. |
| 2006/0085334 A1 | 4/2006 | Murphy |
| 2006/0089842 A1 | 4/2006 | Medawar |
| 2006/0095363 A1 | 5/2006 | May |
| 2006/0095923 A1 | 5/2006 | Novack et al. |
| 2006/0100954 A1 | 5/2006 | Schoen |
| 2006/0122921 A1 | 6/2006 | Comerford et al. |
| 2006/0129428 A1 | 6/2006 | Wennberg |
| 2006/0129481 A1 | 6/2006 | Bhatt et al. |
| 2006/0131390 A1 | 6/2006 | Kim |
| 2006/0136330 A1 | 6/2006 | DeRoy et al. |
| 2006/0149674 A1 | 7/2006 | Cook et al. |
| 2006/0155624 A1 | 7/2006 | Schwartz |
| 2006/0155639 A1 | 7/2006 | Lynch et al. |
| 2006/0161435 A1 | 7/2006 | Atef et al. |
| 2006/0173726 A1 | 8/2006 | Hall et al. |
| 2006/0173772 A1 | 8/2006 | Hayes et al. |
| 2006/0173776 A1 | 8/2006 | Shalley et al. |
| 2006/0177226 A1 | 8/2006 | Ellis, III |
| 2006/0178189 A1 | 8/2006 | Walker et al. |
| 2006/0178957 A1 | 8/2006 | LeClaire |
| 2006/0178971 A1 | 8/2006 | Owen et al. |
| 2006/0178983 A1 | 8/2006 | Nice et al. |
| 2006/0184440 A1 | 8/2006 | Britti et al. |
| 2006/0195390 A1 | 8/2006 | Rusk et al. |
| 2006/0202012 A1 | 9/2006 | Grano et al. |
| 2006/0204051 A1 | 9/2006 | Holland, IV |
| 2006/0206416 A1 | 9/2006 | Farias |
| 2006/0212350 A1 | 9/2006 | Ellis et al. |
| 2006/0218069 A1 | 9/2006 | Aberman et al. |
| 2006/0218079 A1 | 9/2006 | Goldblatt et al. |
| 2006/0229943 A1 | 10/2006 | Mathias et al. |
| 2006/0229961 A1 | 10/2006 | Lyftogt et al. |
| 2006/0229996 A1 | 10/2006 | Keithley et al. |
| 2006/0235743 A1 | 10/2006 | Long et al. |
| 2006/0239512 A1 | 10/2006 | Petrillo |
| 2006/0241923 A1 | 10/2006 | Xu et al. |
| 2006/0242039 A1 | 10/2006 | Haggerty et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242049 A1 | 10/2006 | Haggerty et al. |
| 2006/0242050 A1 | 10/2006 | Haggerty et al. |
| 2006/0242051 A1 | 10/2006 | Haggerty et al. |
| 2006/0247947 A1 | 11/2006 | Suringa |
| 2006/0253328 A1 | 11/2006 | Kohli et al. |
| 2006/0253358 A1 | 11/2006 | Delgrosso et al. |
| 2006/0259364 A1 | 11/2006 | Strock et al. |
| 2006/0262929 A1 | 11/2006 | Vatanen et al. |
| 2006/0265243 A1 | 11/2006 | Racho et al. |
| 2006/0265323 A1 | 11/2006 | Winter et al. |
| 2006/0267999 A1 | 11/2006 | Cash et al. |
| 2006/0271456 A1 | 11/2006 | Romain et al. |
| 2006/0271457 A1 | 11/2006 | Romain et al. |
| 2006/0271552 A1 | 11/2006 | McChesney et al. |
| 2006/0276171 A1 | 12/2006 | Pousti |
| 2006/0277102 A1 | 12/2006 | Agliozzo |
| 2006/0277141 A1 | 12/2006 | Palmer |
| 2006/0282328 A1 | 12/2006 | Gerace et al. |
| 2006/0282359 A1 | 12/2006 | Nobili et al. |
| 2006/0293921 A1 | 12/2006 | McCarthy et al. |
| 2006/0293932 A1 | 12/2006 | Cash et al. |
| 2006/0293979 A1 | 12/2006 | Cash et al. |
| 2006/0294199 A1 | 12/2006 | Bertholf |
| 2007/0005508 A1 | 1/2007 | Chiang |
| 2007/0011026 A1 | 1/2007 | Higgins et al. |
| 2007/0011039 A1 | 1/2007 | Oddo |
| 2007/0011083 A1 | 1/2007 | Bird et al. |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0016520 A1 | 1/2007 | Gang et al. |
| 2007/0016522 A1 | 1/2007 | Wang |
| 2007/0022141 A1 | 1/2007 | Singleton et al. |
| 2007/0022297 A1 | 1/2007 | Britti et al. |
| 2007/0027778 A1 | 2/2007 | Schellhammer et al. |
| 2007/0027791 A1 | 2/2007 | Young et al. |
| 2007/0030282 A1 | 2/2007 | Cash et al. |
| 2007/0033227 A1 | 2/2007 | Gaito et al. |
| 2007/0038483 A1 | 2/2007 | Wood |
| 2007/0038497 A1 | 2/2007 | Britti et al. |
| 2007/0043654 A1 | 2/2007 | Libman |
| 2007/0055598 A1 | 3/2007 | Arnott et al. |
| 2007/0055599 A1 | 3/2007 | Arnott |
| 2007/0055618 A1 | 3/2007 | Pogust |
| 2007/0055621 A1 | 3/2007 | Tischler et al. |
| 2007/0061195 A1 | 3/2007 | Liu et al. |
| 2007/0061243 A1 | 3/2007 | Ramer et al. |
| 2007/0067206 A1 | 3/2007 | Haggerty et al. |
| 2007/0067207 A1 | 3/2007 | Haggerty et al. |
| 2007/0067208 A1 | 3/2007 | Haggerty et al. |
| 2007/0067209 A1 | 3/2007 | Haggerty et al. |
| 2007/0067235 A1 | 3/2007 | Nathans et al. |
| 2007/0067285 A1 | 3/2007 | Blume et al. |
| 2007/0067297 A1 | 3/2007 | Kublickis |
| 2007/0067437 A1 | 3/2007 | Sindambiwe |
| 2007/0072190 A1 | 3/2007 | Aggarwal |
| 2007/0078741 A1 | 4/2007 | Haggerty et al. |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0094137 A1 | 4/2007 | Phillips et al. |

(56) References Cited

U.S. PATENT DOCUMENTS

| | | |
|---|---|---|
| 2007/0100719 A1 | 5/2007 | Chwast et al. |
| 2007/0106582 A1 | 5/2007 | Baker et al. |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0118410 A1 | 5/2007 | Nadai |
| 2007/0121843 A1 | 5/2007 | Atazky et al. |
| 2007/0124235 A1 | 5/2007 | Chakraborty et al. |
| 2007/0130026 A1* | 6/2007 | O'Pray ............... G06Q 30/02 705/14.69 |
| 2007/0192165 A1 | 6/2007 | Haggerty et al. |
| 2007/0156515 A1 | 7/2007 | Hasselback et al. |
| 2007/0156589 A1 | 7/2007 | Zimler et al. |
| 2007/0156718 A1 | 7/2007 | Hossfeld et al. |
| 2007/0168246 A1 | 7/2007 | Haggerty et al. |
| 2007/0168267 A1 | 7/2007 | Zimmerman et al. |
| 2007/0174122 A1 | 7/2007 | Howard et al. |
| 2007/0179860 A1 | 8/2007 | Romero |
| 2007/0192248 A1 | 8/2007 | West |
| 2007/0198336 A1 | 8/2007 | Thompson |
| 2007/0198407 A1 | 8/2007 | Winter |
| 2007/0205266 A1 | 9/2007 | Carr et al. |
| 2007/0208653 A1 | 9/2007 | Murphy |
| 2007/0208729 A1 | 9/2007 | Martino |
| 2007/0214005 A1 | 9/2007 | Kennedy |
| 2007/0214076 A1 | 9/2007 | Robida et al. |
| 2007/0220611 A1 | 9/2007 | Socolow et al. |
| 2007/0226093 A1 | 9/2007 | Chan et al. |
| 2007/0226114 A1 | 9/2007 | Haggerty et al. |
| 2007/0226130 A1 | 9/2007 | Haggerty et al. |
| 2007/0244732 A1 | 10/2007 | Chatterji et al. |
| 2007/0244807 A1 | 10/2007 | Andringa et al. |
| 2007/0250327 A1 | 10/2007 | Hedy |
| 2007/0255654 A1 | 11/2007 | Whipple et al. |
| 2007/0255655 A1 | 11/2007 | Kemper et al. |
| 2007/0258626 A1 | 11/2007 | Reiner |
| 2007/0271178 A1 | 11/2007 | Davis et al. |
| 2007/0279187 A1 | 12/2007 | Hekmatpour et al. |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0288271 A1 | 12/2007 | Klinkhammer |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0294126 A1 | 12/2007 | Maggio |
| 2007/0294163 A1 | 12/2007 | Harmon et al. |
| 2007/0299699 A1 | 12/2007 | Policelli et al. |
| 2007/0299759 A1 | 12/2007 | Kelly |
| 2007/0299771 A1 | 12/2007 | Brody |
| 2008/0004957 A1 | 1/2008 | Hildreth et al. |
| 2008/0005313 A1 | 1/2008 | Flake et al. |
| 2008/0010687 A1 | 1/2008 | Gonen et al. |
| 2008/0015887 A1 | 1/2008 | Drabek et al. |
| 2008/0015938 A1 | 1/2008 | Haddad et al. |
| 2008/0015954 A1 | 1/2008 | Huber et al. |
| 2008/0015979 A1 | 1/2008 | Bentley |
| 2008/0016099 A1 | 1/2008 | Ikeda |
| 2008/0021802 A1 | 1/2008 | Pendleton |
| 2008/0021804 A1 | 1/2008 | Deckoff |
| 2008/0027859 A1 | 1/2008 | Nathans et al. |
| 2008/0028067 A1 | 1/2008 | Berkhin et al. |
| 2008/0033852 A1 | 2/2008 | Megdal et al. |
| 2008/0040475 A1 | 2/2008 | Bosworth et al. |
| 2008/0046351 A1 | 2/2008 | Wiener et al. |
| 2008/0046383 A1 | 2/2008 | Hirtenstein et al. |
| 2008/0052182 A1 | 2/2008 | Marshall |
| 2008/0059224 A1 | 3/2008 | Schechter |
| 2008/0059317 A1 | 3/2008 | Chandran et al. |
| 2008/0059364 A1 | 3/2008 | Tidwell et al. |
| 2008/0059449 A1 | 3/2008 | Webster et al. |
| 2008/0065569 A1 | 3/2008 | Dutt et al. |
| 2008/0065774 A1 | 3/2008 | Keeler |
| 2008/0066188 A1 | 3/2008 | Kwak |
| 2008/0071882 A1 | 3/2008 | Hering et al. |
| 2008/0077526 A1 | 3/2008 | Arumugam |
| 2008/0086368 A1 | 4/2008 | Bauman et al. |
| 2008/0086400 A1 | 4/2008 | Ardelean et al. |
| 2008/0091463 A1 | 4/2008 | Shakamuri |
| 2008/0094230 A1 | 4/2008 | Mock et al. |
| 2008/0097768 A1 | 4/2008 | Godshalk |
| 2008/0097928 A1 | 4/2008 | Paulson |
| 2008/0103800 A1 | 5/2008 | Domenikos et al. |
| 2008/0103972 A1 | 5/2008 | Lane |
| 2008/0109315 A1 | 5/2008 | Huang et al. |
| 2008/0109740 A1 | 5/2008 | Prinsen et al. |
| 2008/0110973 A1 | 5/2008 | Nathans et al. |
| 2008/0120133 A1 | 5/2008 | Krishnaswami et al. |
| 2008/0120155 A1 | 5/2008 | Pliha |
| 2008/0120569 A1 | 5/2008 | Mann et al. |
| 2008/0126233 A1 | 5/2008 | Hogan |
| 2008/0133278 A1 | 6/2008 | Stanfield |
| 2008/0133322 A1 | 6/2008 | Kalia et al. |
| 2008/0133325 A1 | 6/2008 | De et al. |
| 2008/0133531 A1 | 6/2008 | Baskerville et al. |
| 2008/0134042 A1 | 6/2008 | Jankovich |
| 2008/0140476 A1 | 6/2008 | Anand et al. |
| 2008/0140507 A1 | 6/2008 | Hamlisch et al. |
| 2008/0140549 A1 | 6/2008 | Eder |
| 2008/0140576 A1 | 6/2008 | Lewis et al. |
| 2008/0140694 A1 | 6/2008 | Mangia |
| 2008/0147454 A1 | 6/2008 | Walker et al. |
| 2008/0154766 A1 | 6/2008 | Lewis et al. |
| 2008/0167883 A1 | 7/2008 | Thavildar Khazaneh |
| 2008/0167936 A1 | 7/2008 | Kapoor |
| 2008/0167956 A1 | 7/2008 | Keithley |
| 2008/0172324 A1 | 7/2008 | Johnson |
| 2008/0175360 A1 | 7/2008 | Schwarz et al. |
| 2008/0177655 A1 | 7/2008 | Zalik |
| 2008/0177836 A1 | 7/2008 | Bennett |
| 2008/0183564 A1 | 7/2008 | Tien et al. |
| 2008/0189202 A1 | 8/2008 | Zadoorian et al. |
| 2008/0195425 A1 | 8/2008 | Haggerty et al. |
| 2008/0195445 A1 | 8/2008 | Haggerty et al. |
| 2008/0195600 A1 | 8/2008 | Deakter |
| 2008/0201257 A1 | 8/2008 | Lewis et al. |
| 2008/0208548 A1 | 8/2008 | Metzger et al. |
| 2008/0208610 A1 | 8/2008 | Thomas et al. |
| 2008/0208631 A1 | 8/2008 | Morita et al. |
| 2008/0208788 A1 | 8/2008 | Merugu et al. |
| 2008/0215470 A1 | 9/2008 | Sengupta et al. |
| 2008/0221934 A1 | 9/2008 | Megdal et al. |
| 2008/0221947 A1 | 9/2008 | Megdal et al. |
| 2008/0221970 A1 | 9/2008 | Megdal et al. |
| 2008/0221971 A1 | 9/2008 | Megdal et al. |
| 2008/0221972 A1 | 9/2008 | Megdal et al. |
| 2008/0221973 A1 | 9/2008 | Megdal et al. |
| 2008/0221990 A1 | 9/2008 | Megdal et al. |
| 2008/0222016 A1 | 9/2008 | Megdal et al. |
| 2008/0222027 A1 | 9/2008 | Megdal et al. |
| 2008/0228538 A1 | 9/2008 | Megdal et al. |
| 2008/0228539 A1 | 9/2008 | Megdal et al. |
| 2008/0228540 A1 | 9/2008 | Megdal et al. |
| 2008/0228541 A1 | 9/2008 | Megdal et al. |
| 2008/0228556 A1 | 9/2008 | Megdal et al. |
| 2008/0228606 A1 | 9/2008 | Megdal et al. |
| 2008/0228635 A1 | 9/2008 | Megdal et al. |
| 2008/0243680 A1 | 10/2008 | Megdal et al. |
| 2008/0244008 A1 | 10/2008 | Wilkinson et al. |
| 2008/0255897 A1 | 10/2008 | Megdal et al. |
| 2008/0255922 A1 | 10/2008 | Feldman et al. |
| 2008/0255992 A1 | 10/2008 | Lin |
| 2008/0270294 A1 | 10/2008 | Lent et al. |
| 2008/0270295 A1 | 10/2008 | Lent et al. |
| 2008/0281737 A1 | 11/2008 | Fajardo |
| 2008/0288283 A1 | 11/2008 | Baldwin, Jr. et al. |
| 2008/0288382 A1 | 11/2008 | Smith et al. |
| 2008/0294540 A1 | 11/2008 | Celka et al. |
| 2008/0294546 A1 | 11/2008 | Flannery |
| 2008/0301016 A1 | 12/2008 | Durvasula et al. |
| 2008/0301188 A1 | 12/2008 | O'Hara |
| 2008/0312969 A1 | 12/2008 | Raines et al. |
| 2008/0319895 A1 | 12/2008 | Lazerson |
| 2009/0006165 A1 | 1/2009 | Stinson |

(56) References Cited

U.S. PATENT DOCUMENTS

| | | |
|---|---|---|
| 2009/0006475 A1 | 1/2009 | Udezue et al. |
| 2009/0012889 A1 | 1/2009 | Finch |
| 2009/0018996 A1 | 1/2009 | Hunt et al. |
| 2009/0024505 A1 | 1/2009 | Patel et al. |
| 2009/0030776 A1 | 1/2009 | Walker et al. |
| 2009/0037247 A1 | 2/2009 | Quinn |
| 2009/0037323 A1 | 2/2009 | Feinstein et al. |
| 2009/0043637 A1 | 2/2009 | Eder |
| 2009/0044279 A1 | 2/2009 | Crawford et al. |
| 2009/0048877 A1 | 2/2009 | Binns et al. |
| 2009/0048957 A1 | 2/2009 | Celano |
| 2009/0076883 A1 | 3/2009 | Kilger et al. |
| 2009/0089190 A1 | 4/2009 | Girulat |
| 2009/0089205 A1 | 4/2009 | Bayne |
| 2009/0099960 A1 | 4/2009 | Robida et al. |
| 2009/0106150 A1 | 4/2009 | Pelegero et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0125369 A1 | 5/2009 | Kloostra et al. |
| 2009/0132347 A1 | 5/2009 | Anderson et al. |
| 2009/0132559 A1 | 5/2009 | Chamberlain et al. |
| 2009/0144102 A1 | 6/2009 | Lopez |
| 2009/0144160 A1 | 6/2009 | Haggerty et al. |
| 2009/0144201 A1 | 6/2009 | Gierkink et al. |
| 2009/0164380 A1 | 6/2009 | Brown |
| 2009/0172815 A1 | 7/2009 | Gu et al. |
| 2009/0177480 A1 | 7/2009 | Chen et al. |
| 2009/0182653 A1 | 7/2009 | Zimiles |
| 2009/0182872 A1 | 7/2009 | Hong |
| 2009/0198557 A1 | 8/2009 | Wang et al. |
| 2009/0198602 A1 | 8/2009 | Wang et al. |
| 2009/0198612 A1 | 8/2009 | Meimes et al. |
| 2009/0199264 A1 | 8/2009 | Lang |
| 2009/0210886 A1 | 8/2009 | Bhojwani et al. |
| 2009/0216591 A1 | 8/2009 | Buerger et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0240609 A1 | 9/2009 | Cho et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0249440 A1 | 10/2009 | Platt et al. |
| 2009/0254476 A1 | 10/2009 | Sharma et al. |
| 2009/0254971 A1 | 10/2009 | Herz et al. |
| 2009/0271248 A1 | 10/2009 | Sherman et al. |
| 2009/0271265 A1 | 10/2009 | Lay et al. |
| 2009/0276233 A1 | 11/2009 | Brimhall et al. |
| 2009/0276244 A1 | 11/2009 | Baldwin, Jr. et al. |
| 2009/0276368 A1 | 11/2009 | Martin et al. |
| 2009/0300066 A1 | 12/2009 | Guo et al. |
| 2009/0313163 A1 | 12/2009 | Wang et al. |
| 2009/0319648 A1 | 12/2009 | Dutta et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0017300 A1 | 1/2010 | Bramlage et al. |
| 2010/0030649 A1 | 2/2010 | Ubelhor |
| 2010/0043055 A1 | 2/2010 | Baumgart |
| 2010/0082384 A1 | 4/2010 | Bohrer et al. |
| 2010/0094704 A1 | 4/2010 | Subramanian et al. |
| 2010/0094758 A1 | 4/2010 | Chamberlain et al. |
| 2010/0094768 A1 | 4/2010 | Miltonberger |
| 2010/0094774 A1 | 4/2010 | Jackowitz et al. |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0114747 A1 | 5/2010 | Kasower |
| 2010/0121767 A1 | 5/2010 | Coulter et al. |
| 2010/0130172 A1 | 5/2010 | Vendrow et al. |
| 2010/0142698 A1 | 6/2010 | Spottiswoode et al. |
| 2010/0145836 A1 | 6/2010 | Baker et al. |
| 2010/0145847 A1 | 6/2010 | Zarikian et al. |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0198629 A1 | 8/2010 | Wesileder et al. |
| 2010/0205662 A1 | 8/2010 | Ibrahim et al. |
| 2010/0211445 A1 | 8/2010 | Bodington |
| 2010/0217837 A1 | 8/2010 | Ansari et al. |
| 2010/0223168 A1 | 9/2010 | Haggerty et al. |
| 2010/0228657 A1 | 9/2010 | Kagarlis |
| 2010/0228658 A1 | 9/2010 | Ketelsen et al. |
| 2010/0229245 A1 | 9/2010 | Singhal |
| 2010/0248681 A1 | 9/2010 | Phills |
| 2010/0250364 A1 | 9/2010 | Song et al. |
| 2010/0250434 A1 | 9/2010 | Megdal et al. |
| 2010/0250469 A1 | 9/2010 | Megdal et al. |
| 2010/0253686 A1 | 10/2010 | Alsbury et al. |
| 2010/0268557 A1 | 10/2010 | Faith et al. |
| 2010/0274739 A1 | 10/2010 | Haggerty et al. |
| 2010/0293114 A1 | 11/2010 | Khan et al. |
| 2010/0312717 A1 | 12/2010 | Haggerty et al. |
| 2010/0312769 A1 | 12/2010 | Bailey et al. |
| 2010/0332292 A1 | 12/2010 | Anderson |
| 2010/0332381 A1 | 12/2010 | Celka et al. |
| 2011/0004498 A1 | 1/2011 | Readshaw |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0035333 A1 | 2/2011 | Haggerty et al. |
| 2011/0047071 A1 | 2/2011 | Choudhuri et al. |
| 2011/0060905 A1 | 3/2011 | Stack et al. |
| 2011/0066495 A1 | 3/2011 | Ayloo et al. |
| 2011/0071950 A1 | 3/2011 | Ivanovic |
| 2011/0076663 A1 | 3/2011 | Krallman et al. |
| 2011/0078073 A1 | 3/2011 | Annappindi et al. |
| 2011/0093383 A1 | 4/2011 | Haggerty et al. |
| 2011/0112950 A1 | 5/2011 | Haggerty et al. |
| 2011/0112958 A1 | 5/2011 | Haggerty et al. |
| 2011/0125595 A1 | 5/2011 | Neal et al. |
| 2011/0126275 A1 | 5/2011 | Anderson et al. |
| 2011/0131131 A1 | 6/2011 | Griffin et al. |
| 2011/0137789 A1 | 6/2011 | Kortina et al. |
| 2011/0145122 A1 | 6/2011 | Haggerty et al. |
| 2011/0161323 A1 | 6/2011 | Hagiwara |
| 2011/0164746 A1 | 7/2011 | Nice et al. |
| 2011/0166986 A1 | 7/2011 | Coulter |
| 2011/0173116 A1 | 7/2011 | Yan et al. |
| 2011/0178841 A1 | 7/2011 | Rane et al. |
| 2011/0178922 A1 | 7/2011 | Irnrey et al. |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0211445 A1 | 9/2011 | Chen |
| 2011/0213641 A1 | 9/2011 | Metzger, II et al. |
| 2011/0218826 A1 | 9/2011 | Birtel et al. |
| 2011/0219421 A1 | 9/2011 | Ullman et al. |
| 2011/0238566 A1 | 9/2011 | Santos |
| 2011/0251946 A1 | 10/2011 | Haggerty et al. |
| 2011/0258050 A1 | 10/2011 | Chan et al. |
| 2011/0258142 A1 | 10/2011 | Haggerty et al. |
| 2011/0264581 A1 | 10/2011 | Clyne |
| 2011/0270779 A1 | 11/2011 | Showalter |
| 2011/0276396 A1 | 11/2011 | Rathod |
| 2011/0282779 A1 | 11/2011 | Megdal et al. |
| 2011/0295768 A1 | 12/2011 | Haggerty et al. |
| 2011/0307397 A1 | 12/2011 | Benmbarek |

(56) References Cited

U.S. PATENT DOCUMENTS

| | | |
|---|---|---|
| 2012/0005070 A1 | 1/2012 | McFall et al. |
| 2012/0011056 A1 | 1/2012 | Ward et al. |
| 2012/0011158 A1 | 1/2012 | Avner et al. |
| 2012/0016948 A1 | 1/2012 | Sinha |
| 2012/0029956 A1 | 2/2012 | Ghosh et al. |
| 2012/0035980 A1 | 2/2012 | Haggerty et al. |
| 2012/0046979 A1 | 2/2012 | Haggerty et al. |
| 2012/0047219 A1 | 2/2012 | Feng et al. |
| 2012/0054592 A1 | 3/2012 | Jaffe et al. |
| 2012/0066065 A1 | 3/2012 | Switzer |
| 2012/0066106 A1 | 3/2012 | Papadimitriou |
| 2012/0066125 A1 | 3/2012 | Ma et al. |
| 2012/0084230 A1 | 4/2012 | Megdal et al. |
| 2012/0089605 A1 | 4/2012 | Bangalore et al. |
| 2012/0095927 A1 | 4/2012 | Hirtenstein et al. |
| 2012/0101938 A1 | 4/2012 | Kasower |
| 2012/0101939 A1 | 4/2012 | Kasower |
| 2012/0106801 A1 | 5/2012 | Jackson |
| 2012/0110677 A1 | 5/2012 | Abendroth et al. |
| 2012/0116807 A1 | 5/2012 | Hane et al. |
| 2012/0123968 A1 | 5/2012 | Megdal et al. |
| 2012/0124498 A1 | 5/2012 | Santoro et al. |
| 2012/0136763 A1 | 5/2012 | Megdal et al. |
| 2012/0136768 A1 | 5/2012 | DeBie |
| 2012/0143637 A1 | 6/2012 | Paradis et al. |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0179536 A1 | 7/2012 | Kalb et al. |
| 2012/0185296 A1 | 7/2012 | Haggerty et al. |
| 2012/0185338 A1 | 7/2012 | Chwast et al. |
| 2012/0191479 A1 | 7/2012 | Gupta et al. |
| 2012/0215682 A1 | 8/2012 | Lent et al. |
| 2012/0216125 A1 | 8/2012 | Pierce |
| 2012/0239497 A1 | 9/2012 | Nuzzi |
| 2012/0239515 A1 | 9/2012 | Batra et al. |
| 2012/0239553 A1 | 9/2012 | Gonen et al. |
| 2012/0265661 A1 | 10/2012 | Megdal et al. |
| 2012/0278767 A1 | 11/2012 | Stibel et al. |
| 2012/0290660 A1 | 11/2012 | Rao et al. |
| 2012/0317016 A1 | 12/2012 | Hughes |
| 2012/0323954 A1 | 12/2012 | Bonalle et al. |
| 2012/0324388 A1 | 12/2012 | Rao et al. |
| 2013/0006825 A1 | 1/2013 | Robida et al. |
| 2013/0080467 A1 | 3/2013 | Carson et al. |
| 2013/0085804 A1 | 4/2013 | Leff et al. |
| 2013/0085902 A1 | 4/2013 | Chew |
| 2013/0103571 A1 | 4/2013 | Chung et al. |
| 2013/0110565 A1 | 5/2013 | Means et al. |
| 2013/0132151 A1 | 5/2013 | Stibel et al. |
| 2013/0159168 A1 | 6/2013 | Evans |
| 2013/0173359 A1 | 7/2013 | Megdal et al. |
| 2013/0173450 A1 | 7/2013 | Celka et al. |
| 2013/0173481 A1 | 7/2013 | Hirtenstein et al. |
| 2013/0218638 A1 | 8/2013 | Kilger et al. |
| 2013/0238413 A1 | 9/2013 | Carlson et al. |
| 2013/0268324 A1 | 10/2013 | Megdal et al. |
| 2013/0275331 A1 | 10/2013 | Megdal et al. |
| 2013/0293363 A1 | 11/2013 | Plymouth |
| 2013/0332341 A1 | 12/2013 | Papadimitriou |
| 2014/0006523 A1 | 1/2014 | Hofman et al. |
| 2014/0012633 A1 | 1/2014 | Megdal et al. |
| 2014/0019331 A1 | 1/2014 | Megdal et al. |
| 2014/0032265 A1 | 1/2014 | Paprocki et al. |
| 2014/0032384 A1 | 1/2014 | Megdal et al. |
| 2014/0096249 A1 | 4/2014 | Dupont et al. |
| 2014/0156501 A1 | 6/2014 | Howe |
| 2014/0164112 A1 | 6/2014 | Kala |
| 2014/0164398 A1 | 6/2014 | Smith et al. |
| 2014/0244353 A1 | 8/2014 | Winters |
| 2014/0278774 A1 | 9/2014 | Cai et al. |
| 2014/0316969 A1 | 10/2014 | Imrey |
| 2014/0365357 A1 | 12/2014 | Bohrer et al. |
| 2015/0026039 A1 | 1/2015 | Annappindi |
| 2015/0051948 A1 | 2/2015 | Aizono et al. |
| 2015/0066772 A1 | 3/2015 | Griffin et al. |
| 2015/0286747 A1 | 10/2015 | Anastasakos et al. |
| 2015/0332414 A1 | 11/2015 | Unser |
| 2015/0363328 A1 | 12/2015 | Candelaria |
| 2016/0086190 A1 | 3/2016 | Bohrer et al. |
| 2016/0171542 A1 | 6/2016 | Fanous et al. |
| 2016/0210224 A1 | 7/2016 | Cohen et al. |
| 2016/0246581 A1 | 8/2016 | Jiminez et al. |
| 2017/0200222 A1 | 7/2017 | Barber et al. |
| 2017/0278182 A1 | 9/2017 | Kasower |
| 2018/0025273 A1 | 1/2018 | Jordan et al. |
| 2018/0189871 A1 | 7/2018 | Lennert |
| 2019/0042947 A1 | 2/2019 | Turner et al. |
| 2019/0318255 A1 | 10/2019 | Ripley et al. |
| 2019/0340526 A1 | 11/2019 | Turner et al. |
| 2019/0347092 A1 | 11/2019 | Bouley et al. |
| 2019/0354613 A1 | 11/2019 | Zoldi et al. |
| 2019/0354853 A1 | 11/2019 | Zoldi et al. |
| 2020/0026642 A1 | 1/2020 | Indurthivenkata et al. |
| 2020/0034419 A1 | 1/2020 | Bondugula et al. |
| 2020/0042887 A1 | 2/2020 | Marcé et al. |
| 2020/0082302 A1 | 3/2020 | Zoldi et al. |
| 2020/0090080 A1 | 3/2020 | Ballal |
| 2020/0097591 A1 | 3/2020 | Basant et al. |
| 2020/0097881 A1 | 3/2020 | Krone et al. |
| 2020/0098041 A1 | 3/2020 | Lawrence et al. |
| 2020/0104734 A1 | 4/2020 | Turner et al. |
| 2020/0134387 A1 | 4/2020 | Liu et al. |
| 2020/0134439 A1 | 4/2020 | Turner et al. |
| 2020/0134474 A1 | 4/2020 | Marcé et al. |
| 2020/0134500 A1 | 4/2020 | Marcé et al. |
| 2020/0159989 A1 | 5/2020 | Banaszak et al. |
| 2020/0202425 A1 | 6/2020 | Taylor-Shoff et al. |
| 2020/0218629 A1 | 7/2020 | Chen et al. |
| 2020/0242216 A1 | 7/2020 | Zoldi et al. |
| 2020/0250185 A1 | 8/2020 | Anderson et al. |
| 2020/0293557 A1 | 9/2020 | Farrell et al. |
| 2020/0293912 A1 | 9/2020 | Williams et al. |

FOREIGN PATENT DOCUMENTS

| | | |
|---|---|---|
| DE | 91 08 341 | 10/1991 |
| EP | 0 350 907 | 1/1990 |
| EP | 0 419 889 | 4/1991 |
| EP | 0 458 698 | 11/1991 |
| EP | 0 468 440 | 1/1992 |
| EP | 0 554 083 | 8/1993 |
| EP | 0 566 736 | 8/1993 |
| EP | 0 559 358 | 9/1993 |
| EP | 0 869 652 | 10/1998 |
| EP | 0 913 789 | 5/1999 |
| EP | 0 919 942 | 6/1999 |
| EP | 0 977 128 | 2/2000 |
| EP | 1 028 401 | 8/2000 |
| EP | 1 077 419 | 2/2001 |
| EP | 1 122 664 | 8/2001 |
| EP | 0 772 836 B1 | 12/2001 |
| EP | 2 088 743 | 8/2009 |
| EP | 3 572 985 | 11/2019 |
| EP | 3 573 009 | 11/2019 |
| GB | 2 392 748 | 3/2004 |
| GB | 2 579 139 | 6/2020 |
| JP | 10-222559 | 8/1998 |
| JP | 10-261009 | 9/1998 |
| JP | 10-293732 | 11/1998 |
| JP | 2000-331068 | 11/2000 |
| JP | 2001-282957 | 10/2001 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163449 | 6/2002 |
| JP | 2002-163498 | 6/2002 |
| JP | 2002-259753 | 9/2002 |
| JP | 2003-016261 | 1/2003 |
| JP | 2003-271851 | 9/2003 |
| JP | 2003-316881 | 11/2003 |
| JP | 2003-316950 | 11/2003 |
| KR | 10-2000-0036594 | 7/2000 |

(56) References Cited

FOREIGN PATENT DOCUMENTS

| | | |
|---|---|---|
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| TW | I256569 | 6/2006 |
| WO | WO 94/006103 | 3/1994 |
| WO | WO 94/012943 | 6/1994 |
| WO | WO 95/012857 | 5/1995 |
| WO | WO 95/034155 | 12/1995 |
| WO | WO 96/000945 | 1/1996 |
| WO | WO 97/023838 | 7/1997 |
| WO | WO 98/041931 | 9/1998 |
| WO | WO 98/041932 | 9/1998 |
| WO | WO 98/041933 | 9/1998 |
| WO | WO 98/049643 | 11/1998 |
| WO | WO 99/004350 | 1/1999 |
| WO | WO 99/008218 | 2/1999 |
| WO | WO 99/017225 | 4/1999 |
| WO | WO 99/017226 | 4/1999 |
| WO | WO 99/022328 | 5/1999 |
| WO | WO 99/038094 | 7/1999 |
| WO | WO 99/046710 | 9/1999 |
| WO | WO 00/004465 | 1/2000 |
| WO | WO 00/028441 | 5/2000 |
| WO | WO 00/055778 | 9/2000 |
| WO | WO 00/055789 | 9/2000 |
| WO | WO 00/055790 | 9/2000 |
| WO | WO 01/004821 | 1/2001 |
| WO | WO 01/010090 | 2/2001 |
| WO | WO 01/011522 | 2/2001 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/041355 | 6/2001 |
| WO | WO 01/057720 | 8/2001 |
| WO | WO 01/075754 | 10/2001 |
| WO | WO 01/080053 | 10/2001 |
| WO | WO 01/084281 | 11/2001 |
| WO | WO 02/001462 | 1/2002 |
| WO | WO 02/013047 | 2/2002 |
| WO | WO 02/027610 | 4/2002 |
| WO | WO 03/071388 | 8/2003 |
| WO | WO 03/101123 | 12/2003 |
| WO | WO 2004/046882 | 6/2004 |
| WO | WO 2004/051436 | 6/2004 |
| WO | WO 2004/061563 | 7/2004 |
| WO | WO 2004/114160 | 12/2004 |
| WO | WO 2005/059781 | 6/2005 |
| WO | WO 2005/124619 | 12/2005 |
| WO | WO 2007/004158 | 1/2007 |
| WO | WO 2007/014271 | 2/2007 |
| WO | WO 2007/106393 | 9/2007 |
| WO | WO 2007/106787 | 9/2007 |
| WO | WO 2007/149941 | 12/2007 |
| WO | WO 2008/021061 | 2/2008 |
| WO | WO 2008/022289 | 2/2008 |
| WO | WO 2008/054403 | 5/2008 |
| WO | WO 2008/076343 | 6/2008 |
| WO | WO 2008/127288 | 10/2008 |
| WO | WO 2008/147918 | 12/2008 |
| WO | WO 2008/148819 | 12/2008 |
| WO | WO 2009/076555 | 6/2009 |
| WO | WO 2009/099448 | 8/2009 |
| WO | WO 2009/117518 | 9/2009 |
| WO | WO 2009/132114 | 10/2009 |
| WO | WO 2010/045160 | 4/2010 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |
| WO | WO 2015/162681 | 10/2015 |
| WO | WO 2018/057701 | 3/2018 |
| WO | WO 2018/084867 | 5/2018 |
| WO | WO 2018/128866 | 7/2018 |
| WO | WO 2019/035809 | 2/2019 |
| WO | WO 2019/067497 | 4/2019 |
| WO | WO 2019/088972 | 5/2019 |
| WO | WO 2019/094910 | 5/2019 |
| WO | WO 2019/217876 | 11/2019 |
| WO | WO 2020/055904 | 3/2020 |
| WO | WO 2020/132026 | 6/2020 |
| WO | WO 2020/142417 | 7/2020 |

OTHER PUBLICATIONS

U.S. Appl. No. 13/253,776, U.S. Pat. No. 8,315,943, System and Method for Generating a Finance Attribute From Tradeline Data, filed Oct. 5, 2011.
U.S. Appl. No. 13/620,095, U.S. Pat. No. 8,626,646, System and Method for Generating a Finance Attribute From Tradeline Data, filed Sep. 14, 2012.
U.S. Appl. No. 14/091,232, U.S. Pat. No. 9,563,916, System and Method for Generating a Finance Attribute From Tradeline Data, filed Nov. 26, 2013.
U.S. Appl. No. 15/389,160, U.S. Pat. No. 10,121,194, System and Method for Generating a Finance Attribute From Tradeline Data, filed Dec. 22, 2016.
U.S. Appl. No. 12/705,489, filed Feb. 12, 2010, Bargoli et al.
U.S. Appl. No. 12/705,511, filed Feb. 12, 2010, Bargoli et al.
U.S. Appl. No. 60/146,074, filed Jul. 28, 1999, Tomkow.
U.S. Appl. No. 60/172,479, filed Dec. 17, 1999, Tomkow.
"A Google Health update," Google Official Blog, Sep. 15, 2010 in 4 pages, http://googleblog.blogspot.com/2010/09/google-health-update.html.
Equifax; "White Paper: Driving Safe Growth in a Fluid Economy", http://www.equifax.com/assets/USCIS/efx_safeGrowth_wp.pdf, Oct. 2012 in 14 pages.
Equifax; "True In-Market Propensity Scores™", http://www.equifax.com/assets/USCIS/efx-00174-11-13_efx_tips.pdf, Nov. 2013 in 1 page.
Ettorre, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, p. 19.
Experian Announces PLUS Score; Experian Press Release dated Oct. 16, 2003; Experian Global Press Office.
Reinartz et al., "On the Profitability of Long-Life Customers in a Noncontractual Setting: An Empirical Investigation and Implications for Marketing" Journal of Marketing, Oct. 2000, vol. 64, pp. 17-35.
"ACS Company Birch & Davis Wins Texas CHIP Contract," PR Newswire, Section: Financial News, May 17, 2000, Dallas, TX, pp. 3.
"Aggregate and Analyze Social Media Content: Gain Faster and Broader Insight to Market Sentiment," SAP Partner, Mantis Technology Group, Apr. 2011, pp. 4.
Agreement Between Dallas Computer Services, dba DCS Information Systems and the Texas Department of Human Services, to Provide Data Brokering Services, Contract #324Z-8-05203 signed Jun. 15, 1998 and including corresponding documents in 38 pages. [Search America—Exhibit 1010].
Akl, Selim G., "Digital Signatures: A Tutorial Survey," Computer, Feb. 1983, pp. 15-24.
"An Even Better Solution to Financing Elective Surgery . . . ", Unicorn Financial, pp. 7, http://web.archive.org/web/20000816161359/http://www.unicornfinancial.com/, as downloaded Oct. 15, 2008.
"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.
"Auto Market StatisticsSM:Drive Response with Aggregated Motor Vehicle Information", Experian, Apr. 2007, http://www.experian.com/assets/marketing-services/product-sheets/auto-market-statistics.pdf, pp. 2.

(56) References Cited

OTHER PUBLICATIONS

Adzilla, Press Release, "ZILLACASTING Technology Approved and Patent Pending," http://www.adzilla.com/newsroom/pdf/patent_051605.pdf, May 16, 2005, pp. 2.
AISG's National Underwriting Database, A-PLUS, is Now the Largest in the Industry, Business Wire, Aug. 7, 1997.
An Expert System for Determining Medicaid Eligibility, Journal of Medical Systems, vol. 12, Nov. 5, 1988, in 10 pages.
Announcing TrueProfiler, http://web.archive.org/web/20021201123646/http://www.truecredit.com/index.asp, dated Dec. 1, 2002, 2 pages.
Applied Geographic Solutions, "What is MOSAIC™", as captured Feb. 15, 2004 from http://web.archive.org/web/20040215224329/http://www.appliedgeographic.com/mosaic.html in 2 pages.
"AT&T Expected to Turn Up Heat in Card Wars", American Banker, May 27, 1993, vol. 158, No. 101, pp. 3.
BackupBox, http://mybackupbox.com printed Feb. 8, 2013 in 2 pages.
"Balance Transfers Offer Opportunities", Risk Credit Risk Management Report, Jan. 29, 1996, vol. 6, No. 2, pp. 2.
"Bank of America Direct Web-Based Network Adds Core Functionality to Meet Day-To-Day Treasury Needs", Business Wire, Oct. 25, 1999. pp. 2.
"Bank of America Launches Total Security Protection™; Features Address Cardholders' Financial Safety Concerns; Supported by $26 Million National Advertising Campaign; Free Educational Materials", PR Newswire, Oct. 9, 2002, pp. 2.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].
BBC Green Home, "My Action Plan", as printed from The Wayback Machine at http://web.archive.org/web/20080513014731/http://www.bbcgreen.com/actionplan, May 13, 2008, pp. 50.
Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.
BERR: Department for Business Enterprise & Regulatory Reform, "Regional Energy Consumption Statistics", Jun. 10, 2008, http://webarchive.nationalarchives.gov.uk/20080610182444/http://www.berr.gov.uk/energy/statistics/regional/index.html.
"Beverly Hills Man Convicted of Operating 'Bust-Out' Schemes that Caused More than $8 Million in Losses", Department of Justice, Jul. 25, 2006, 2 Pgs.
Bilotta, Caryn, "Understanding Credit Scores," Pittsburgh Post—Gazette, May 9, 2010.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].
Bitran et al., "Mailing Decisions in Catalog Sales Industry", Management Science (JSTOR), vol. 42, No. 9, pp. 1364-1381, Sep. 1996.
Boss, Shira J. "Elective Surgery Without the Plastic: Low-Interest Medical Financing Provides Alternative to Credit Cards," factiva, Crain's New York Business, 2 pgs., dated Jun. 22, 1998.
Broward County CAP Grant Application, as printed on Aug. 10, 2009, 41 pgs.
Brown et al., "ALCOD IDSS: Assisting the Australian Stock Market Surveillance Team's Review Process," Applied Artificial Intelligence Journal, Dec. 1, 1996, pp. 625-641.
Burr Ph.D., et al., "Utility Payments as Alternative Credit Data: A Reality Check", Asset Builders of America, Inc., Oct. 5, 2006, pp. 1-18, Washington, D.C.
Burr Ph.D., et al., "Payment Aggregation and Information Dissemination (Paid): Annotated Literature Search", Asset Builders of America, Inc., Sep. 2005.
"Bust-Out Schemes", Visual Analytics Inc. Technical Product Support, Newsletter vol. 4, Issue 1, Jan. 2005, pp. 7.
Butkus, Charles, "System Cuts Medicaid Processing to 11 Cents a Claim", ComputerWorld, May 21, 1975, pp. 51 and 53.
Caliendo, et al., "Some Practical Guidance for the Implementation of Propensity Score Matching", IZA:Discussion Paper Series, No. 1588, Germany, May 2005, pp. 32.
Calnan, Christopher, "Tenet, Fair Isaac invest $20M in startup," MHT, Mass High Tech: The Journal of New England Technology, dated Jul. 23, 2007, 2 pgs.
Cantor, R. and Packer, F., "The Credit Rating Industry," FRBNY Quarterly Review, Summer-Fall, 1994, pp. 1-24.
Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsl- etter/Newsletter12.htm (1 of 8) [Oct. 18, 2008 2:39:47 PM].
Card Marketing, Use the Latest CRM Tools and Techniques, www.CardForum.com, vol. 5 No. 10, Dec. 2001.
Chandler et al., "The Benefit to Consumers from Generic Scoring Models Based on Credit Reports", The MDS Group Atlanta, Georgia, Jul. 1, 1991, Abstract.
ChannelWave.com, PRM Central—About PRM, http://web.archive.org/web/20000510214859/http://www.channelwave.com as printed on Jun. 21, 2006, May 2000 Archive.
"Chase Gets Positive," Bank Technology News, May 6, 2000, vol. 14, No. 5, p. 33.
Chatterjee et al., "Expenditure Patterns and Aggregate Consumer Behavior, Some Experiments with Australian and New Zealand Data", The Economic Record, vol. 70, No. 210, Sep. 1994, pp. 278-291.
Chen, et al., "Modeling Credit Card 'Share of Wallet': Solving the Incomplete Information Problem", New York University: Kauffman Management Center, http://www.rhsmith.umd.edu/marketing/pdfs_docs/seminarsspr05/abst- ract%20-%20chen.pdf , Spring 2005, 48 pages.
Cheney, Karen, "Fix Your Nose, If You Wish, But Not With This New Loan," Money Magazine, vol. 27, No. 5, 1 pg., dated May 1, 1998.
"Cole Taylor Bank Chooses Integrated E-Banking/E-Payments/Reconciliation Solution From Fundtech", Business Wire, Oct. 21, 1999, pp. 2.
"Consumer Reports Finds American-Made Vehicles Close Reliability Gap with European-Made Vehicle—as Japanese Continue to Set New Benchmarks for the Industry", Consumer Reports: Consumers Union, Yonkers, NY, Apr. 2003, pp. 2.
Corepoint Health, "The Continuity of Care Document—Changing the Landscape of Healthcare Information Exchange," Jan. 2009, pp. 9.
CreditAnalyst, Digital Matrix Systems, as printed out Mar. 4, 2008, pp. 2.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
CreditXpert, http://www.creditxpert.com/Products/individuals.asp printed Oct. 12, 2012 in 1 page.
Compliance Data Systems, Inc. T-PASS Catalogue Profile, Sep. 8, 1994, available at http://www.compliancedata.com/catalogue.html.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
Cowie, Norman, "Warning Bells & 'The Bust-Out'", Business Credit, Jul. 1, 2000, pp. 5.
Credit Card Management, "Neural Nets Shoot for Jackpot," Dec. 1995, pp. 1-6.
Credit Risk Management Report, Potomac, Mar. 9, 1998, vol. 8, No. 4.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.

(56) References Cited

OTHER PUBLICATIONS

CreditXpert Inc., CreditXpert Essentials™, Advisor View-Experian on Jul. 7, 2003, http://www.creditxpert.com/cx_ess_app.pdf.
CreditXpert Inc., CreditXpert Essentials™, Advisor View-TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View-TransUnion on Oct. 10, 1999, pp. 6, http://www.creditxpert.com/cx_ess_app.pdf.
Curriculum Vitae of Kenneth A. Zeger dated Jan. 8, 2013 in 20 pages.
Dataman Group, "Summarized Credit Statistics," Aug. 22, 2001, http://web.archive.org/web/20010822113446/http://www.datamangroup.com/summarized_credit.asp.
David, Alexander, "Controlling Information Premia by Repackaging Asset-Backed Securities," The Journal of Risk and Insurance, Dec. 1997, 26 pages.
Davies, Donald W., "Applying the RSA Digital Signature to Electronic Mail," Computer, Feb. 1983, pp. 55-62.
Dé, Andy, "Will mHealth Apps and Devices Empower ePatients for Wellness and Disease Management? A Case Study," Jan. 10, 2011 in 6 pages, http://www.healthsciencestrategy.com/2011/04/will-mhealth-apps-and-devices-empower-epatients-for-wellness-and-disease-management-a-case-study-2/.
DeGruchy, et al., "Geodemographic Profiling Benefits Stop-Smoking Service;" The British Journal of Healthcare Computing & Information Management; Feb. 2007; 24, 7; pp. 29-31.
DentalFinancing.com, "Financial services for patients and dental professionals,", 7 pgs., as downloaded from http://web.archive.org/web/20010607151954/www.dentalfinancing.com/dentist/index.asp (1 of 2) [Oct. 15, 2008 3:55:16 PM].
Dillon et al., "Good Science", Marketing Research: A Magazine of Management & Applications TM, Winter 1997, vol. 9, No. 4; pp. 11.
Downing, Jr.; Richard, "Changes to the Credit Reporting Act," Mortgage Banking, Apr. 1, 1998, vol. 58, No. 7, pp. 82-85.
Dymi, Amilda, Need for Leads Spurs Some Upgrades, Origination News-Special Report, May 1, 2008, vol. vol. 17, Issue No. 8, Pages p. 24, Atlanta, Copyright 2008 SourceMedia, Inc.
EFunds Corporation, "Data & Decisioning: Debit Report" printed Apr. 1, 2007, http://www.efunds.com/web/industry-solutions/financial-services/frm-debit-report/htm in 1 page.
EFunds Introduces QualiFileSM, Deluxe Corporation, eFunds Press Release and Product Launch, Sep. 23, 1999, Milwaukee, WI.
Egol, Len; "What's New in Database Marketing Software," Direct, Aug. 1994, vol. 6, No. 8, pp. 39.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Elmasri et al., "Fundamentals of Database Systems, Third Edition (Excerpts)", Jun. 2000, pp. 253, 261, 268-70, 278-80, 585, 595.
Energy Saving TrustTM, "HEED Online User Manual (1.7)", Jul. 24, 2008, pp. 18, www.energysavingtrust.org.uk, Jul. 24, 2008.
"Enterprise Technology Management Architecture", Texas Department of Human Services, Version 1.0, Aug. 31, 1999, pp. 22.
Experian and AGS Select SRC to Deliver Complete Marketing Solutions; Partnership First to Marketplace with Census2000 Data. PR Newswire. New York: Mar. 21, 2001. p. 1.
"Experian Helps Verify the Identity of Patients and Provide Secure Enrollment to Healthcare Portals by Integrating with Major Electronic Medical Records Platform," http://press.experian.com/United-States/Press-Release/experian-helps-verify-the-identity-of-patients-and-provide-secure-enrollment-to-healthcare.aspx?&p=1, Dec. 19, 2013, pp. 2.
"Experian Launches Portfolio Monitor—Owner NoticesSM", News Release, Feb. 2003, Costa Mesa, CA.
Experian-Scorex Announces New Credit Simulation Tool, PR Newswire, Costa Mesa, CA, Jun. 13, 2005.
Experian; "Case study: SC Telco Federal Credit Union", http://annualcreditreport.experian.com/assets/consumer-information/case-studies/sc-telco-case-study.pdf, Jun. 2011 in 2 pages.
Experian; "In the Market ModelsSM", http://www.experian.com/assets/consumer-information/product-sheets/in-the-market-models.pdf, Sep. 2013 in 2 pages.
Experian Information Solutions, Inc., Credit Trends: Access Credit Trending Information Instantly, http://kewaneecreditbureau.com/Credit.Trends.pdf, Aug. 2000, pp. 4.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic United Kingdom, Brochure, Jun. 2009, pp. 24.
Experian: Mosaic UK—Unique Consumer Classification Based on In-Depth Demographic Data, as printed from http://www.experian.co.uk/business-strategies/mosaic-uk.html, Jul. 30, 2012, pp. 2.
Experian: Mosaic USA, Brochure, May 2009, pp. 14.
Experian: Mosaic USA—Consumer Lifestyle Segmentation [Data Card], Dec. 2009, pp. 2.
"Factual Data Corp. Completes First Interface with Automated Underwriting System for Subprime Lenders", PR Newswire, Loveland, CO, Jan. 17, 2000.
Fair Isaac Announces Integrated, End-to-End Collection and Recovery Solution, Business Wire, New York, Sep. 2, 2004, p. 1.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
Fanelli, Marc, "Building a Holistic Customer View", MultiChannel Merchant, Jun. 26, 2006, pp. 2.
Felsenthal, Edward, "Health Costs; Managed Care Helps Curb Costs, Study Says," The Wall Street Journal, dated Aug. 12, 1991.
Fickenscher, Lisa, "Merchant American Express Seeks to Mine its Data on Cardholder Spending Patterns," American Banker, vol. 162, Issue 56, Mar. 24, 1997, pp. 1-2.
"Fighting the New Face of Fraud", FinanceTech, http://www.financetech.com/showArticle.jhtml?articleID=167100405, Aug. 2, 2005.
"Financing Medical Procedures a Lucrative But Risky Business," Credit Risk Management Report, vol. 10, Issue 15, 2 pgs., dated Aug. 7, 2000.
"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
Frohlich, Robert M., Jr., "Credit Scoring in a Hospital Setting", University of North Florida Thesis, Paper 97, Apr. 1997, pp. 82.
Frontporch, "Ad Networks—Partner with Front Porch!," www.frontporch.com printed Apr. 2008 in 2 pages.
Frontporch, "New Free Revenue for Broadband ISPs!", http://www.frontporch.com/html/bt/FPBroadbandISPs.pdf printed May 28, 2008 in 2 pages.
"FTC Testifies: Identity Theft on the Rise", FTC News Release, Mar. 7, 2000, pp. 3.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
GAO-03-661, Best Practices: Improved Knowledge of DOD Service Contracts Could Reveal Significant Savings, GAO, Jun. 2003.
Gao et al., "Exploring Temporal Effects for Location Recommendation on Location-Based Social Networks", RecSys'13, Oct. 12-16, 2013, Hong Kong, China, pp. 93-100.

(56) References Cited

OTHER PUBLICATIONS

Gilje, Shelby, "Credit Agency Moving Into Health Care," NewsRoom, The Seattle Times, Section: SCENE, Mar. 22, 1995, pp. 3, http://web2.westlaw.com/result/documenttext.aspx?rs=WLW8.03&ss+CNT&rp=%2fWelc . . . .

Gilje, Shelby, "Keeping Tabs on Businesses That Keep Tabs on Us", NewsRoom, The Seattle Times, Section: SCENE, Apr. 19, 1995, pp. 4.

Glenn, Brandon, "Multi-provider patient portals get big boost with ONC ruling", Feb. 25, 2013, http://medicaleconomics.modernmedicine.com/medical-economics/news/user-defined-tags/meaningful-use/multi-provider-patient-portals-get-big-boost in 2 pages.

Gonul, et al., "Optimal Mailing of Catalogs: A New Methodology Using Estimable Structural Dynamic Programming Models", 14 pages, Management Science, vol. 44, No. 9, Sep. 1998.

Haughton et al., "Direct Marketing Modeling with CART and CHAID", Journal of Direct Marketing, Fall 1997, vol. 11, No. 4, pp. 42-52.

Healow.com, Various screenshots from page titled "Health and Online Wellness," https://healow.com/apps/jsp/webview/index.jsp printed Aug. 19, 2013 in 4 pages.

Healthspek.com, "How Good Are We?" http://healthspek.com/how-good-are-we/ printed Jan. 21, 2014 in 2 pages.

"Healthspek Users Can Now Import Their Doctors' Records into Their Personal Health Record," PRWeb, Nashville, TN, Jan. 14, 2014, pp. 1 http://www.prweb.com/releases/2014/01/prweb11485346.htm.

HealthVault, "Share Health Information," https://account.healthvault.com/sharerecord.aspx, printed Feb. 20, 2013 in 2 pages.

HealthVault, "What Can you do with HealthVault?" https://www.healthvault.com/us/en/overview, http://www.eweek.com/mobile/diversinet-launches-mobihealth-wallet-for-patient-data-sharing/, printed Feb. 20, 2013 in 2 pages.

"HelpWorks Family of Products Offers Solutions for Providers of Social Services", Software Announcement, Letter No. 297-476, Nov. 11, 1997, http://www.www-304.ibm.com/jct01003c/cgi-bin/common/ssi/ssialias?infotype=an&subtype=ca&htmlfid=897/ENUS297-476&appname=xldata&language=enus.

"HelpWorks: One-Stop Screening for the Benefits Your Clients Need", Peter Martin Associates, Inc. website, HelpWorks description, Jul. 11, 2000, http://web.archive.org/web/20000711013829/http://www.petermartin.com/Products/HelpWorks/hw_info02.html.

Hill, Kerry, "Identity Theft Your Social Security Number Provides Avenue for Thieves", NewsRoom, Wisconsin State Journal, Sep. 13, 1998, pp. 4.

Hojoki, http://hojoki.com printed Feb. 8, 2013 in 5 pages.

Horowitz, Brian T., "Diversinet Launches MobiHealth Wallet for Patient Data Sharing," eWeek, Dec. 4, 2012, http://www.eweek.com/mobile/diversinet-launches-mobihealth-wallet-for-patient-data-sharing/.

"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.

Ideon, Credit-Card Registry that Bellyflopped this Year, Is Drawing some Bottom-Fishers, The Wall Street Journal, Aug. 21, 1995, pp. C2.

IFTTT, "About IFTTT," http://ifttt.com/wtf printed Feb. 18, 2013 in 4 pages.

igiHealth.com, "Orbit® PHR: Personal Health Record (PHR)," http://www.igihealth.com/consumers/orbit_phr.html, printed Jan. 21, 2014 in 2 pages.

"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.

"Implementation Advance Planning Document", Implementation Advance Planning Document, TIERS, Texas Department of Human Services, Eric M. Bost, Commissioner, May 2000, pp. 128.

"Improving the Implementation of State Children's Health Insurance Programs for Adolescents Report of an Invitational Conference Sponsored by the American Academy of Pediatrics, Section on Adolescent Health," PEDIATRICS, Official Journal of the American Academy of Pediatrics, Section on Adolescent Health, Sep. 26-27, 1999, 9 pages.

Income and Eligibility Verification System (IEVS), Medi-Cal Eligibility Procedures Manual, Apr. 2000, pp. 164.

"Industry News, New Technology Identifies Mortgage Fraud: Basepoint Analytics Launches FraudMark", Inman News, American Land Title Association, Oct. 5, 2005, pp. 1.

InsightsOne.com, "Healthcare," http://insightsone.com/healthcare-predictive-analytics/ printed Mar. 6, 2014 in 5 pages.

Instant Access to Credit Reports Now Available Online with DMS' CreditBrowser-based system also Simplifies Credit Decisioning and Offers a Central Point of Control, Business Wire, Dallas, May 23, 2000, p. 0264.

"Intelligent Miner Applications Guide", IBM Corp., Apr. 2, 1999, Chapters 4-7, pp. 33-132.

Internal Revenue Service Data Book 2000, Issued Aug. 2001, Revised May 2003.

Jacob et al., A Case Study of Checking Account Inquiries and Closures in Chicago, The Center for Financial Services Innovation, Nov. 2006.

"Japan's JAAI System Appraises Used Cars Over Internet", Asia Pulse, Mar. 3, 2000.

Jones, Sandra, "Small Software Firm Aiming for Internet", ChicagoBusiness.com, Mar. 13, 2000.

Jones, Yvonne, "Consumers Understood the Basics but Could Benefit from Targeted Educational Efforts," GAO U.S. Government Accountability Office, Mar. 16, 2005, pp. 128, http://www.gao.gov/products/GAO-05-223.

Jost, Allen; Neural Networks, Credit World, Mar./Apr. 1993, vol. 81, No. 4, pp. 26-33.

Jowit, Juliette, "Ever wondered how big your own carbon footprint might be?", Nov. 4, 2007, pp. 4, http://www.guardian.co.uk/money/2007/nov/04/cash.carbonfootprints/print.

"JPMorgan Worldwide Securities Services to Acquire Paloma's Middle and Back Office Operations," Webpage printed from http://www.jpmorgan.com on Apr. 1, 2009.

Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.

Kent, Heather, "Huge declines in price as competition heats up in Vancouver's booming laser-surgery market," CMAJ, Oct. 5, 1999; 161 (7), pp. 857-858.

King et al., Local and Regional CO2 Emissions Estimates for 2004 for the UK, AEA Energy & Environment, Report for Department for Environment, Food and Rural Affairs, Nov. 2006, London, UK, pp. 73.

Lamons, Bob, "Be Smart: Offer Inquiry Qualification Services," Marketing News, ABI/Inform Global, Nov. 6, 1995, vol. 29, No. 23, pp. 13.

Lan, Joe, "The Top Portfolio Management Software," http://www.aaii.com/computerizedinvesting/article/the-top-portfolio-management-software, Includes Discussion thread, Fourth Quarter 2011, pp. 17.

Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/.

Lee, W.A.; "Experian, on Deal Hunt, Nets Identity Theft Insurer", American Banker: The Financial Services Daily, Jun. 4, 2003, New York, NY, 1 page.

Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.

LifeLock, http://web.archive.org/web/20110724011010/http://www.lifelock.com/? as archived Jul. 24, 2011 in 1 page.

LifeLock, "How LifeLock Works," http://www.lifelock.com/lifelock-for-people printed Mar. 14, 2008 in 1 page.

(56) References Cited

OTHER PUBLICATIONS

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
Longo, Tracey, "Managing Money: Your Family Finances", Kiplinger's Personal Finance Magazine, Jun. 1, 1995, vol. 49, No. 6, pp. 4.
Lund, Graham, "Credit Bureau Data: Maximizing the Benefits," Credit Management, May 2004, ProQuest Central, pp. 44-45.
Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
McManus et al.; "Street Wiser," American Demographics; ABI/Inform Global; Jul./Aug. 2003; 25, 6; pp. 32-35.
McNamara, Paul, "Start-up's pitch: The Envelope, please," Network World, Apr. 28, 1997, vol. 14, No. 17, p. 33.
MergePower, Inc., "Attribute Pro", http://web.archive.org/web/20060520135324/http://www.mergepower.com/attri- bute_pro.html, dated May 20, 2006 in 1 page.
MergePower, Inc., "Attribute Pro", http://web.archive.org/web/20080708204709/http:/www.mergepower.com/APInfo.aspx, dated Jul. 8, 2008 in 2 pages.
MergePower, Inc., "Attribute Pro®—Credit Bureau Attributes", http://web.archive.org/web/20120307000028/http:/www.mergepower.com/APInfo-aspx, dated Mar. 7, 2012 in 2 pages.
MergePower, Inc., "MergePower, Inc", http://web.archive.org/web/20060513003556/http:/www.mergepower.com/, dated May 13, 2006 in 1 page.
MergePower, Inc., "MergePower, Inc", http://web.archive.org/web/20070208144622/http:/www.mergepower.com/, dated Feb. 8, 2007 in 1 page.
MergePower, Inc., "MergePower, Inc", http://web.archive.org/web/20070914144019/http:/www.mergepower.com/, dated Sep. 14, 2007 in 1 page.
MergePower, Inc., "MergePower, Inc", http://web.archive.org/web/20110828073054/http:/www.mergepower.com/, dated Aug. 28, 2011 in 2 pages.
"MediCredit Announces Major Investment from Medstone; Financing Will Enable Dramatic Expansion of Online Services," Business Wire, pp. 2, dated May 12, 2000.
MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].
Merugu, et al.; "A New Multi-View Regression Method with an Application to Customer Wallet Estimation," The 12th International Conference on Knowledge Discovery and Data Mining, Aug. 20-23, 2006, Philadelphia, PA.
Miller, Joe, "NADA Used-Car Prices Go Online", Automotive News, Jun. 14, 1999, p. 36.
Mint.com, http://www.mint.com/how-it-works/ printed Feb. 5, 2013 in 2 pages.
"Mosaic" (geodemography), available from http://en.wikipedia.org/wiki/Mosaic_(geodemography), as last modified Jul. 13, 2012. pp. 4.
Mover, "One API for the Cloud," http://mover.io printed Feb. 6, 2013 in 3 pages.
Mowll, Charles, "Setting a Credit Policy for Patient Accounts", Healthcare Financial Management, Jan. 1989, pp. 3.
Mowll, Charles, "Knowing How and When to Grant Credit Healthcare Organizations", Healthcare Financial Management, Feb. 1989, pp. 4.
Muus, et al., "A Decision Theoretic Framework for Profit Maximization in Direct Marketing", Sep. 1996, pp. 20.

MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.
"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532,frame . . . In 6 pages.
"New Privista Product Provides Early Warning System to Combat Identity Theft", PR Newswire, Oct. 24, 2000, PR Newswire Association, Inc., New York.
Newsom v. Vanderbilt University et al., Opinion, 453 F.Supp. 401 (1978), Jun. 1, 1978, pp. 24.
NewsRoom, "CIGNA Report Withdrawn as Foe Sees Opening," Insurance Regulator, State Survey, Sep. 9, 1996, vol. 8, Issue 34, pp. 4.
Occasional CF Newsletter; http://www.halhelms.com/index.cfm?fuseaction=newsletters.oct1999; Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Otixo, "Your Dashboard for the Cloud," http://Otixo.com/product printed Feb. 6, 2013 in 3 pages.
Otter, et al., "Direct Mail Selection by Joint Modeling of the Probability and Quantity of Response", Jun. 1997, pp. 14.
Padgett et al., "A Comparison of Carbon Calculators", Environmental Impact Assessment Review 28, pp. 106-115, Jun. 7, 2007.
Pagano, et al., "Information Sharing in Credit Markets," Dec. 1993, The Journal of Finance, vol. 48, No. 5, pp. 1693-1718.
"Parse", Definition from PC Magazine Encyclopedia, http://www/pcmag.com/encyclopedia_term_0,2542,t=parse&i=48862,00.asp as downloaded Mar. 5, 2012.
Partnoy, Frank, Rethinking Regulation of Credit Rating Agencies: An Institutional Investor Perspective, Council of Institutional Investors, Apr. 2009, pp. 21.
"Patients May be Frauds", The Victoria Advocate, Victoria, Texas, 138th Year-No. 194, p. 10A, Nov. 17, 1983.
PC411, Inc. "Reverse Searching Now Available on PC411," http://web.archive.org/web/19961103061843/http://www.pc411.com/PR_Revrs.html Apr. 9, 1996 in 2 pages.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.
Perlich et al., "High Quantile Modeling for Customer Wallet Estimation with Other Applications," The 13th International Conference on Knowledge Discovery and Data Mining, Aug. 12-15, 2007, San Jose, CA.
Perry et al., "Integrating Waste and Renewable Energy to Reduce the Carbon Footprint of Locally Integrated Energy Sectors", Energy 33, Feb. 15, 2008, pp. 1489-1497.
"Peter Martin Releases HelpWorks Web Edition", Business Wire, Chicago, Sep. 28, 1999.
Phorm, "BT PLC TalkTalk and Virgin Media Inc. confirm exclusive agreements with Phorm", Press Release, http://www.phorm.com/about/launch_agreement.php, Feb. 14, 2008, pp. 2.
Phorm, "The Open Internet Exchange, 'Introducing the OIX'", http://www.phorm.com/oix/ printed May 29, 2008 in 1 page.
Pipes, http://pipes.yahoo.com/pipes printed Feb. 18, 2013 in 1 page.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.

(56) References Cited

OTHER PUBLICATIONS

Planwise, http://planwise.com printed Feb. 8, 2013 in 5 pages.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
"PostX to Present at Internet Showcase", PR Newswire, Apr. 28, 1997, pp. 2.
PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
Powerforms: Declarative Client-Side for Field Validation, ISSN 1386-145x, Dec. 2000.
"PremierGuide Announces Release 3.0 of Local Search Platform", Business Wire, Mar. 4, 2004, Palo Alto, CA, p. 5574.
Primadesk, http://primadesk.com printed Feb. 8, 2013 in 1 page.
PrivacyGuard, http://web.archive.org/web/20110728114049/http://www.privacyguard.com/ as archived Jul. 28, 2011 in 1 page.
Quantix Software, "Investment Account Manager," available at https://www.youtube.com/watch?v=1UwNTEER1Kk, as published Mar. 21, 2012.
"Response Automated Decision Systems", responsecorp.com, Inc., Press Release, Ft. Lauderdale, FL, Jun. 22, 2000, http://web.archive.org/web/20010420061717/http://www.responsecorp.com/news.html.
Rodgers, Zachary, "ISPs Collect User Data for Behavioral Ad Targeting", ClickZ, www.clickz.com/showPage.html?page=clickz, Jan. 3, 2008, pp. 3.
Rubin, Rita, "Cosmetic Surgery on Credit, Finance plans let patients reconstruct now, pay later," The Dallas Morning News, 2 pgs., dated Sep. 10, 1988.
SalesLogix.net, SalesLogix Sales Tour, Apr. 11, 2001, http:///www.saleslogix.com, pp. 19.
Saunders, A., "Data Goldmine," Management Today, London: Mar. 1, 2004, 6 pages.
Sawyers, Arlena, "NADA to Offer Residual Guide", Automotive News, May 22, 2000, p. 1.
Schmittlein et al., "Customer Base Analysis: An Industrial Purchase Process Application", Marketing Science, vol. 13, No. 1, Winter 1994, pp. 41-67.
"ScoreNet® Network", Fairlsaac, web.archive.org/web/20071009014242/http://www.fairisaac.com/NR/rdonlyres/AC4C2F79-4160-4E44-B0CB-5C899004879A/0/ScoreNetnetworkBR.pdf, May 2006, pp. 6.
Screenshot for Investment Account Manager v.2.8.3, published at http://www.aaii.com/objects/get/1642.gif by at least Aug. 30, 2011 in 1 page.
Sear, Alan M., Ph.D., "An Expert System for Determining Medicaid Eligibility", Journal of Medical Systems, Oct. 1988, vol. 12, Issue 5, pp. 275-283.
*Search America, Inc. v. TransUnion Intelligence LLC*, Declaration of Kenneth Zeger in re: U.S. Pat. No. 7,333,937, Signed Jul. 24, 2013, pp. 9.
*Search America, Inc. v. TransUnion Intelligence LLC*, Decision, Case No. CBM2013-00038, U.S. Pat. No. 7,333,937, Feb. 7, 2014, pp. 24.
*Search America, Inc. v. TransUnion Intelligence LLC*, Declaration of Kenneth Zeger in re: U.S. Pat. No. 8,185,408, Signed Jul. 29, 2013, pp. 9.
*Search America, Inc. v. TransUnion Intelligence LLC*, Patent Owner Transunion Intelligence, LLC's Preliminary Response, Case No. CBM2013-00037, U.S. Pat. No. 7,333,937, Nov. 11, 2013, pp. 28.
*Search America, Inc. v. TransUnion Intelligence LLC*, Patent Owner Transunion Intelligence, LLC's Preliminary Response, Case No. CBM2013-00038, U.S. Pat. No. 8,185,408, Nov. 11, 2013, pp. 26.
*Search America, Inc. v. TransUnion Intelligence LLC*, Decision, Case No. CBM2013-00038, U.S. Pat. No. 8,185,408, Feb. 7, 2014, pp. 22.
*Search America, Inc. v. TransUnion Intelligence LLC*, Petition for Covered Business Method Patent Review Under 35 U.S.C. §§ 321 and Section 18 of the Leahy-Smith America Invents Act, U.S. Pat. No. 8,185,408, Jul. 29, 2013, pp. 84.
*Search America, Inc. v. TransUnion Intelligence LLC*, Petition for Covered Business Method Patent Review Under 35 U.S.C. §§ 321 and Section 18 of the Leahy-Smith America Invents Act, Case No. U.S. Pat. No. 7,333,937, Jul. 29, 2013, pp. 88.
*Search America, Inc. v. TransUnion Intelligence LLC*, Scheduling Order, Case No. CBM2013-00037, U.S. Pat. No. 7,333,937, Feb. 7, 2014, pp. 7.
*Search America, Inc. v. TransUnion Intelligence LLC*, Scheduling Order, Case No. CBM2013-00038, U.S. Pat. No. 8,185,408, Feb. 7, 2014, pp. 6.
Selz, Michael, "Lenders Find Niche in Cosmetic Surgery That Isn't Insured—But Since You Can't Repossess a Nose Job, Risks Aren't Restricted to the Patients," Wall Street Journal, New York, N.Y., Jan. 1997, p. A.1, 3 pgs.
ServiceObjects, "DOTS Web Services—Product Directory", http://www.serviceobjects.com/products/directory_of_web_services.asp printed Aug. 17, 2006 in 4 pages.
ShoeBoxed, https://www.shoeboxed.com/sbx-home/ printed Oct. 16, 2012 in 4 pages.
Shvachko et al., "The Hadoop Distributed File System", 2010 IEEE 26th Symposium on Mass Storage Systems and Technologies (MSST), May 3, 2010, pp. 1-10.
Singletary, Michelle, "Score One for Open Credit Ratings", The Washington Post, Washington DC, Jun. 18, 2000, 3 pages.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
"STAGG Variables Sum Up Credit Attributes for Automated Decisions", PRWeb, May 11, 2011, pp. 2. http://www.prweb.com/releases/2011/5/prweb8404324.htm.
Stanton, T.H., "Credit Scoring and Loan Scoring as Tools for Improved Management of Federal Credit Programs", Financier, Philadelphia, Summer 1999, vol. 6, 36 pages.
"StarNet Financial, Inc. Acquires Proprietary Rights to Sub-Prime Underwriting System Through Strategic Alliance With TRAkkER Corporation", PR Newswire, Dallas, TX, Sep. 13, 1999.
Stein, Benchmarking Default Prediction Models: Pitfalls and Remedies in Model Validation, Moody's KMV, Revised Jun. 13, 2002, Technical Report #020305; New York.
Stone, "Linear Expenditure Systems and Demand Analysis: An Application to the Pattern of British Demand", The Economic Journal: The Journal of the Royal Economic Society, Sep. 1954, pp. 511-527, vol. LXIV, Macmillan & Co., London.
Storage Made Easy(SME), http://storagemadeeasy.com printed Feb. 6, 2013 in 1 page.
Sumner, Anthony, "Tackling the Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
Sweat, Jeff; "Know Your Customers," Information Week, Nov. 30, 1998, pp. 20.
Tao, Lixin, "Shifting Paradigms with the Application Service Provider Model"; Concordia University, IEEE, Oct. 2001, Canada.
Technical Architecture Framework, TIERS, May 8, 2000, pp. 67.
Tennant, Don, "How a Health Insurance Provider Uses Big Data to Predict Patient Needs," http://www.itbusinessedge.com/blogs/from-under-the-rug/how-a-health-insurance-provider-uses-big-data-to-predict-patient-needs.html, printed Mar. 6, 2014 in 2 pages.
Texas Comptroller of Public Accounts, Texas Performance Review, "Against the Grain: vol. 2," 1993, as printed Dec. 14, 2012 in 7 pages, from http://www.window.texas.gov/tpr/atg/atg/atgtoc.html.
Texas Comptroller of Public Accounts, Texas Performance Review, "Gaining Ground: vol. 2," 1994, as printed Dec. 14, 2012 in 4 pages, from http://www.window.texas.gov/tpr/tprgg/v2home.html.

(56) References Cited

OTHER PUBLICATIONS

Texas Department of Human Services, Revision Notice, Revision 99-1, Effective: Jan. 1, 1999, dated Dec. 11, 1998, pp. 11.
Texas Department of Human Services, Revision Notice, Revision 99-3, Effective: Jul. 1, 1999, dated May 28, 1999, pp. 11.
Texas Department of Human Services, Revision Notice, Revision 99-6, Effective: Oct. 1, 1999, dated Sep. 3, 1999, pp. 20.
Texas Department of Human Services, Revision Notice, Revision 00-3, Effective: Apr. 1, 2000, dated Mar. 3, 2000, pp. 17.
Texas Department of Human Services, OIG, 3000—Case Development, Jan. 1999, pp. 3.
Texas Department of Human Services, System Specifications, Section 3.2, Current System Architecture and Functional Specifications, NOA Assembled, pp. 21, as last modified Jul. 4, 2000.
Texas Department of Human Services, System Specifications, Section 3.3, Current System Architecture and Functional Specifications, GWS Assembled, pp. 752, as last modified Jul. 4, 2000.
Texas Department of Human Services, System Specifications, Section 3.3, Current System Architecture and Functional Specifications, GWS Assembled, pp. 754, as last modified Jul. 4, 2000.
Texas Department of Human Services, System Specifications, Section 3.3.1, TESS System, pp. 47, as last modified Jul. 4, 2000.
Texas Department of Human Services, System Specifications, Section 3.4, Current System Architecture and Functional Specifications, LTCMED Assembled, pp. 372, as last modified Jul. 4, 2000.
Texas Department of Human Services, System Specifications, Section 3.5, Current System Architecture and Functional Specifications, SAVERR FS Assembled, pp. 141, as last modified Jul. 4, 2000.
Texas Department of Human Services, System Specifications, Section 3.6, SAVERR TANF Assembled, pp. 219., as last modified Jul. 4, 2000.
Texas Department of Human Services, System Specifications, Section 3.7, Current System Architecture and Functional Specifications, SAVERR INTER/MED, pp. 838, as last modified Jul. 5, 2000.
Texas Department of Human Services, System Specifications, Section 3.8, Current System Architecture and Functional Specifications, pp. 172, as last modified Jul. 4, 2000.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
"The Best of the Best," Mortgage Technology, Nov. 1, 2003, vol. 10, No. 8, pp. 34-53.
"Third Party Assistance Software System (T-PASS)", Compliance Data Systems, Inc. website, T-PASS Information Page, Oct. 1, 1998, available at http://web.archive.org/web/20010308232545/http://compliancedata.com/tpass.html#Profile.
Thoemmes, Felix, "Propensity Score Matching in SPSS", Center for Educational Science and Psychology, University of Tübingen, Jan. 2012.
Thomas, David, "Report on Networks and Electronic Communications Newcourt Credit Turns to Extranet Services / A PC Connects to 1,200 Users at Once", The Globe and Mail (Canada), Section: Report on Business Special Report, Nov. 12, 1996, pp. 2.
"TIERS Procurement Information," Texas Department of Human Services, as captured May 26, 2000 http://web.archive.org/web/20000526131749/http://www.dhs.state.tx.us/programs/TIERS/procurement.html in 3 pages.
TRAkkER Corporation website, trakkercorp.com, TRAkkER Software Description, May 26, 2000, available at http://web.archive.org/web/20000526234204/http://trakkercorp.com/page4.html.
TransUnion Intelligence LLC v. Search America, Inc., Videotape Deposition of James Sunyar, Nov. 12, 2012, Case No. 0:11-CV-01075-EJS-FLN, pp. 128.
TransUnion Intelligence LLC v. Search America, Inc., Oral and Videotape Deposition of Bobby Keith Graves, Oct. 26, 2012, Case No. 0:11-CV-01075-PJS-FLN, pp. 181.
TransUnion Intelligence LLC v. Search America, Inc., Oral and Videotape Deposition of Kerby Spruiell, May 13, 2013, Case No. 0:11-CV-01075, pp. 257.
TransUnion Intelligence LLC v. Search America, Inc., Videotape Deposition of Jodi Halpine, Oct. 16, 2012, Case No. 0:11-CV-01075-EJS-FLN, pp. 176.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
United States of America v. Patricia Lahaie Mahaney, Government's Response to the Standing Discovery Order, Case:0:03-cr-60022-JIC, Entered into docket Jun. 17, 2003, pp. 16.
Van Collie, Shimon, "The Road to Better Credit-Card Marketing," Bank Technology News, Sep. 1995, pp. 4.
"WashingtonPost.com and Cars.com Launch Comprehensive Automotive Web Site for the Washington Area", PR Newswire, Oct. 22, 1998. pp. 2.
Washington State Office of Public Defense, "Criteria and Standards for Determining and Verifying Indigency," dated Feb. 9, 2001.
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webber, Richard, "The Relative Power of Geodemographics vis a vis Person and Household Level Demographic Variables as Discriminators of Consumer Behavior," CASA:Working Paper Series, http://www.casa.ucl.ac.uk/working_papers/paper84.pdf, Oct. 2004, pp. 17.
Webpage printed from http://www.magnum.net/pdfs/RapUpBrochure.pdf as printed Mar. 3, 2008.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
"Web Site Fuels Elective Surgery Trend; The Complete Resource to Paying for Cosmetic Surgery, Laser Vision Correction and Cosmetic Dentistry," Business Wire, Apr. 7, 1999, pp. 2.
White, Ron, "How Computers Work", Millennium Edition, Que Corporation, Indianapolis, IN, Sep. 1999, pp. 284.
Wiedmann, et al., "Report No. 2: The use of input-output analysis in REAP to allocate Ecological Footprints and material flows to final consumption categories", Resources and Energy Analysis Programme, Stockholm Environment Institute—York, Feb. 2005, York, UK, pp. 33.
Wilson, Andrea, "Escaping the Alcatraz of Collections and Charge-Offs", http://www.transactionworld.net/articles/2003/october/riskMgmt1.asp, Oct. 2003.
Wisconsin Department of Workforce Development, BadgerCare Medicaid Application Credit Report Authorization Form, dated Jun. 21, 2001, effective date, Jul. 1, 2001.
Wisconsin Department of Workforce Development, BadgerCare Medicaid Notification of Eligibility, dated Jul. 25, 2000, effective date, Jul. 1, 2000.
Working, Holbrook, "Statistical Laws of Family Expenditure", Journal of the American Statistical Association, pp. 43-56, vol. 38, American Statistical Association, Washington, D.C., Mar. 1943.
Wyatt, Craig, "Usage Models just for Merchants," Credit Card Management, Sep. 1995, vol. 8, No. 6, pp. 4.
Yuan et al., "Time-Aware Point-of-Interest Recommendation", SIGIR'13, Jul. 28-Aug. 1, 2013, Dublin, Ireland, pp. 363-372.
Zapier, "Integrate Your Web Services," http://www.Zapier.com printed Feb. 18, 2013 in 3 pages.
Zoot—Decision Engine, www.zootweb.com/decision_engine.html, as printed on Mar. 3, 2008.
Zoot—Instant Rules GUI, www.zootweb.com/instant_rules_GUI.html as printed Mar. 3, 2008.
Zoot—Pre-Built Standard Attributes, www.zootweb.com/credit_attributes.html as printed Mar. 3, 2008.
Zoot—Rules Management GUI, www.zootweb.com/business_rules_GUI.html as printed Mar. 3, 2008.

(56) References Cited

OTHER PUBLICATIONS

Declaration of Paul Clark, DSc. For Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al. v. Experian Marketing Solutions. Inc.*, No. 2:12-cv-00513-JRG (E.D. Tex.)) Filed Jan. 14, 2014 in 9 pages.
First Amended Complaint in Civil Action No. 2:12-cv-511-JRG (*Rpost Holdings, Inc. and Rpost Communications Limited v. Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited v. Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited v. Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc., v. Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.

* cited by examiner

```
200
┌─────────────────────────────────────────────────────────────────────────────────────────┐
│ FIRM NAME           MEMBER NUMBER                ─────TRADE─────                        │
│ OPEN     RPTD       DLA                CS                     HICR      BAL    ECOA     │
│ NARRATIVE CODE                                                PASTDUE   TERM PHR1 PHR2 PHR3│
│                                                               MAX DEL          24 MONTH HISTORY│
│                                                                                         │
│ NORTHEAST CREDIT UNION 170FCXXXX                 MR (30-60-90+)  11      1912           │
│ 06/1998   12/2002    12/2002                                     2015    38   4(011) 3(010) 5(012)│
│ FE:CREDIT CARD                                                   03-03-04     *********4355432322*****│
└─────────────────────────────────────────────────────────────────────────────────────────┘

202
┌─────────────────────────────────────────────────────────────────────────────────────────┐
│ SUB NAME            INDCODE    OPENED    ─────TRADE─────  TERMS     MAXDELQ   PAYPAT 1-12   │
│ REMARK CODE                    VERIFED   HIGHCD           PASTDUE   AMT-MOP   PAYPAT 13-24  MOP│
│ ECOA    LOAN  TYPE             CLSD/PD   CREDLIM                              MO 30/60/90   │
│                                          BALANCE                                        │
│                                                                                         │
│ NORTHEAST CREDIT UNION Q       06/1998   2015    MIN 0000    05    111111111153    R01  │
│                                12/2002   2000       0              554323211XX          │
│   1     CC:CREDIT CARD                   1912                      03/03/04             │
└─────────────────────────────────────────────────────────────────────────────────────────┘

204
┌─────────────────────────────────────────────────────────────────────────────────────────┐
│ SUBSCRIBER                              OPEN        ─────TRADE─────                     │
│ SUB#    KOB TYPE TRM ECOA               BALDATE     AMT-TYP1      AMT-TYP2     PYMT STATUS│
│ ACCOUNT#    SPCMT                       LAST PAY    BALANCE       PYMT LEVEL   PYMT HISTORY│
│                                                     MONTH PAY     PAST DUE     BY MONTH │
│                                                                                         │
│ NORTHEAST CREDIT UNION                  06/1998     2015(L)       2245(H)    40 – CUR WAS 150│
│ 1700XXX  FC  18  REV  1                 11/2002     1912          02/2002    BCCCCCCGC325│
│                                         10/2002     38                       432121lCCCCC│
└─────────────────────────────────────────────────────────────────────────────────────────┘
```

| | |
|---|---|
| F | Finance |
| FA | Auto financing co. |
| FB | Mortgage brokers |
| FC | Credit unions |
| FF | Sales financing co. |
| FI | Investment firms |
| FL | S & L mortgage |
| FM | Mortgage co. |
| FP | Personal loan co. |
| FR | Mortgage reporters |
| FS | S & L companies |
| FZ | Misc. finance co. |
| E | Education |
| EB | Business ed. |
| EC | Colleges |
| EL | Student loans |
| ET | Technical ed. |
| EU | Universities |
| EV | Vocational & trade schools |

302

| | |
|---|---|
| F | Finance |
| FA | Auto financing co. |
| FB | Mortgage brokers |
| FC | Credit unions |
| FF | Sales financing co. |
| FI | Investment firms |
| FL | S & L mortgage |
| FM | Mortgage co. |
| FP | Personal loan co. |
| FR | Mortgage reporters |
| FS | S & L companies |
| FZ | Misc. finance co. |

304

| | |
|---|---|
| F | Personal Finance |
| Q | Finance other than personal |

FIG. 3

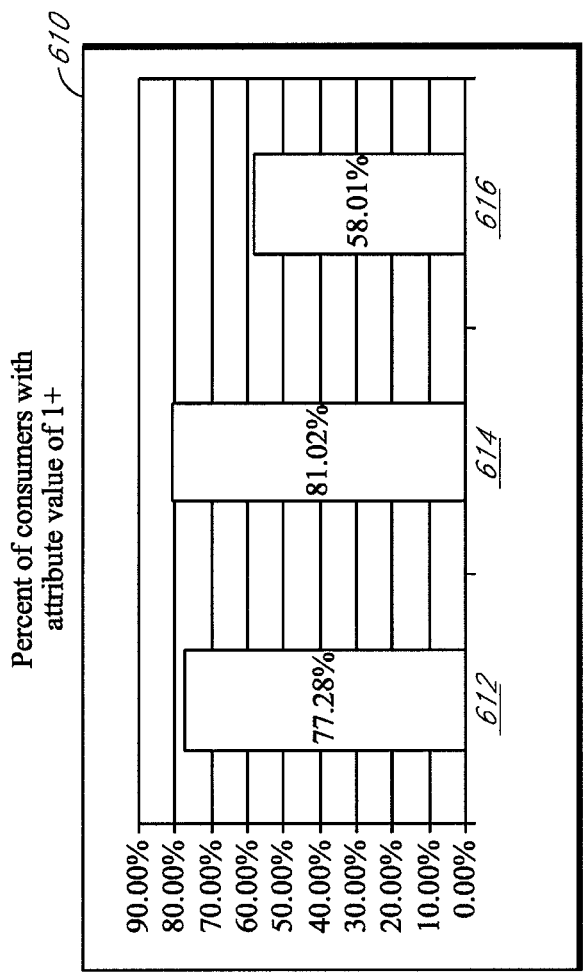
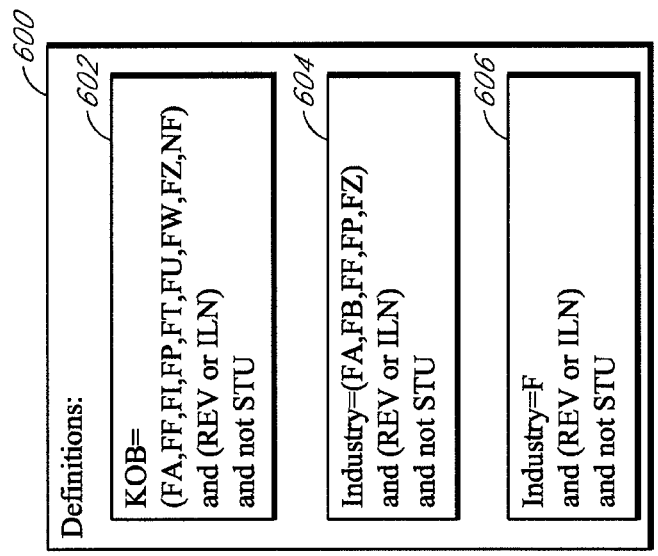
FIG. 6

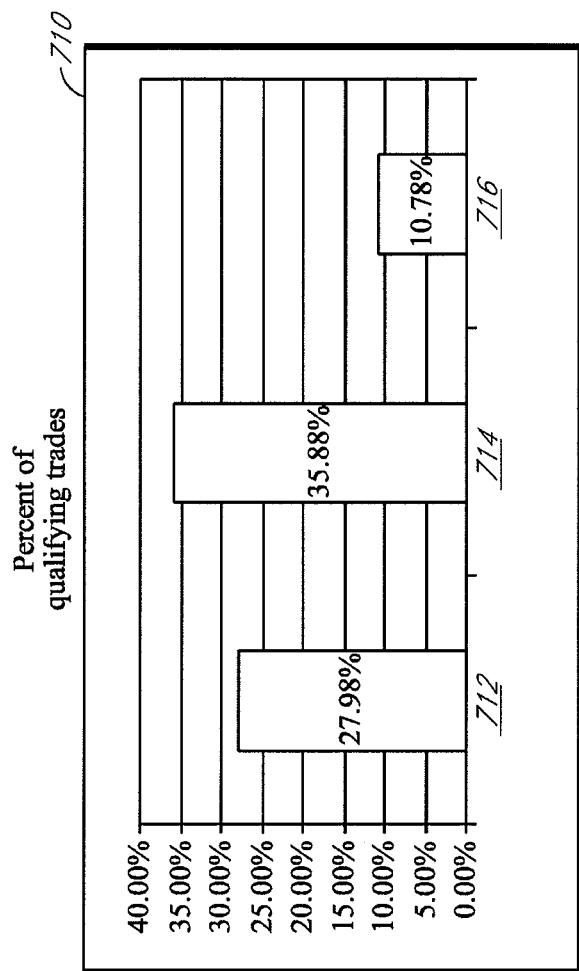
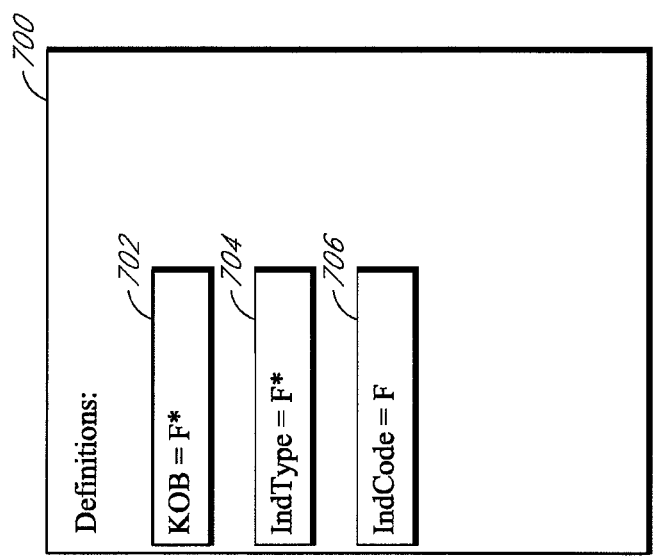
FIG. 7

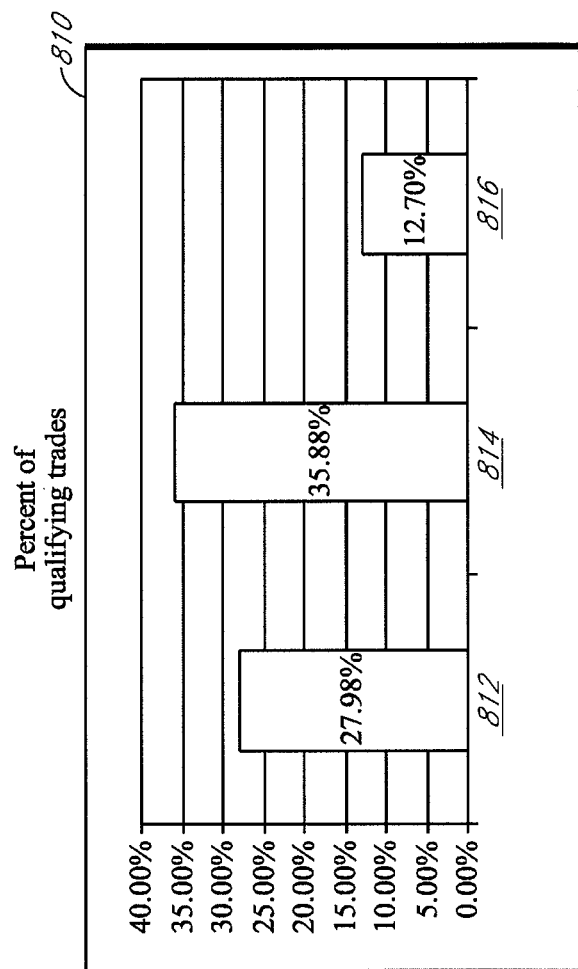
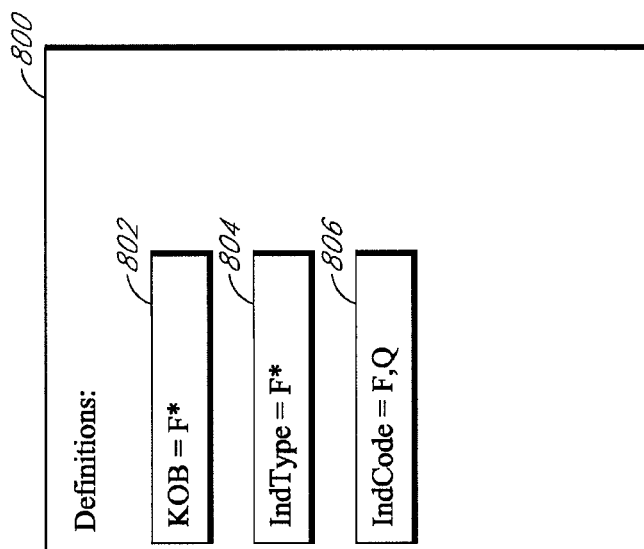
FIG. 8

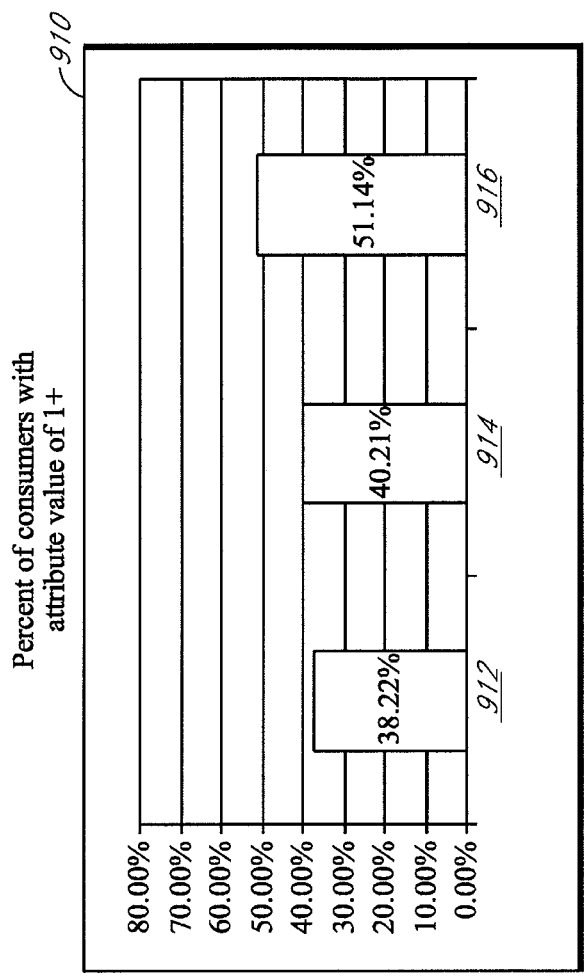
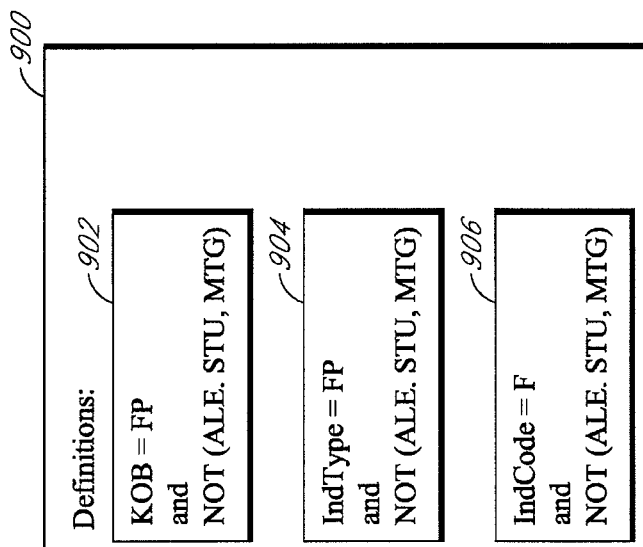
FIG. 9

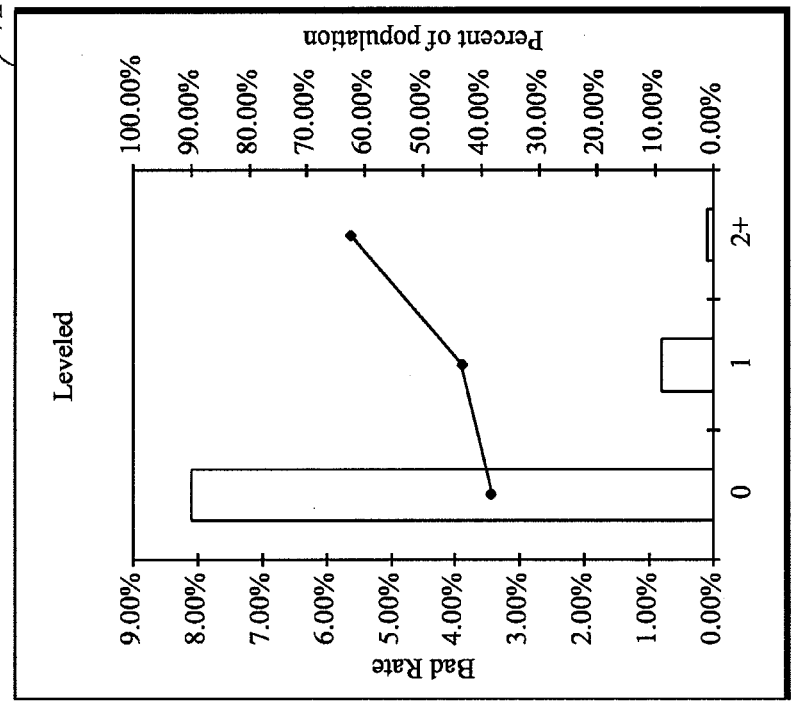
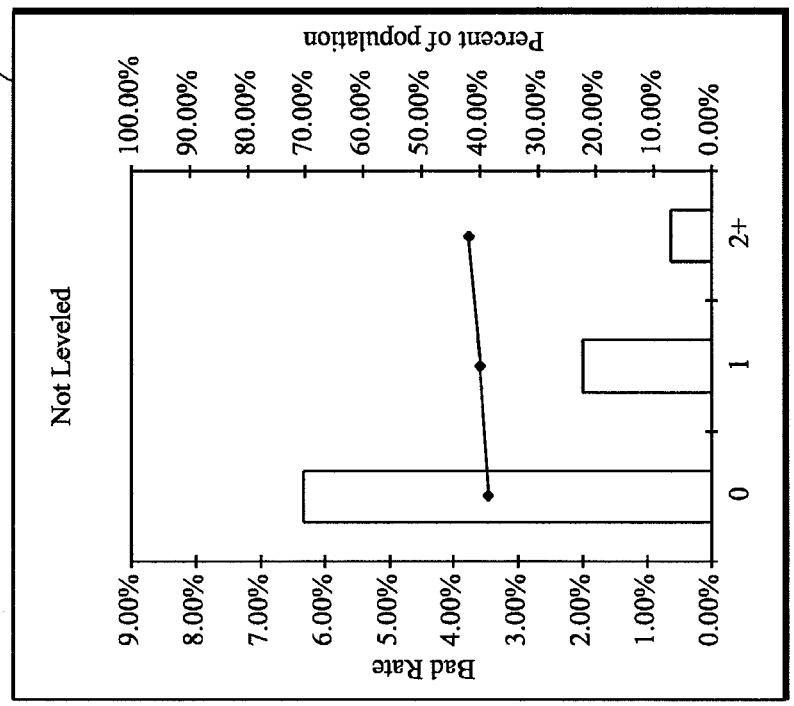
FIG. 12A

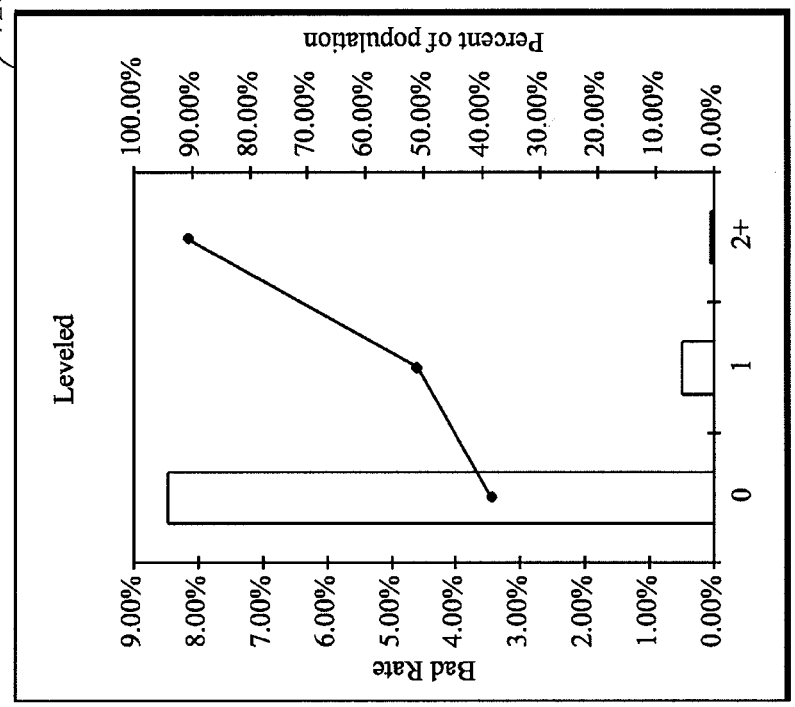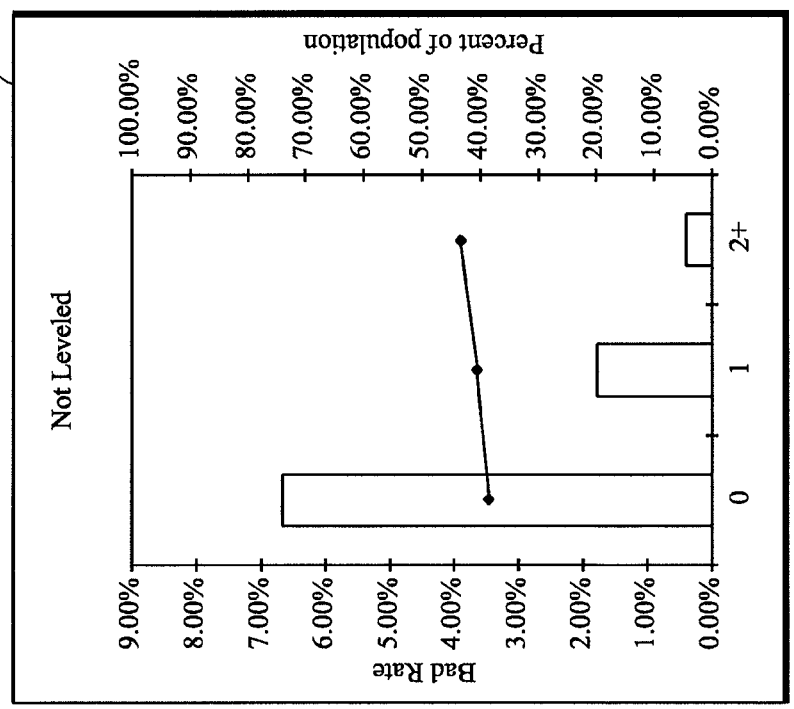
FIG. 12C

SYSTEM AND METHOD FOR GENERATING A FINANCE ATTRIBUTE FROM TRADELINE DATA

CROSS-REFERENCE TO RELATED APPLICATIONS

This application is a continuation of U.S. application Ser. No. 15/389,160, filed Dec. 22, 2016, which is a continuation of U.S. application Ser. No. 14/091,232, filed Nov. 26, 2013, which is a continuation of U.S. application Ser. No. 13/620,095, filed Sep. 14, 2012, which is a continuation of U.S. application Ser. No. 13/253,776, filed Oct. 5, 2011, issued as U.S. Pat. No. 8,315,943, which is a continuation of U.S. application Ser. No. 11/973,300, filed Oct. 5, 2007, issued as U.S. Pat. No. 8,036,979, which is based upon, and claims the benefit of priority from, U.S. Provisional Application No. 60/849,542, filed on Oct. 5, 2006, the entire contents of which are all hereby incorporated herein by reference in their entireties. All publications and patent applications mentioned in this specification are herein incorporated by reference in their entireties to the same extent as if each individual publication or patent application was specifically and individually indicated to be incorporated by reference.

TECHNICAL FIELD

This disclosure generally relates to financial data processing, and more particularly to improved methods and systems for creating a financial attribute from data stored in credit databases.

DESCRIPTION OF RELATED ART

Various financial service providers provide credit accounts such as mortgages, automobile loans, credit card accounts, and the like, to consumers and businesses. In determining whether to extend credit to an applicant and under what terms, the financial service providers may rely upon financial data related to the credit activities, current assets, and current liabilities of the applicant. This information may be provided in the form of a credit score or with a credit report. A credit report may present the financial history of the credit applicant.

SUMMARY OF DISCLOSURE

In some embodiments, a system is described to provide additional relevant information to a financial service provider or other entity to allow that provider to make more informed decisions. One statistical risk tool used by financial service providers to predict payment behavior is a scorecard, and many scorecards rely on attributes generated from financial tradeline data from multiple credit data sources, for example, multiple credit bureaus. The attributes and/or scorecards provide more accessible and aggregated representations of the tradeline data and enable financial service providers to quickly determine the credit-worthiness of a credit applicant.

In certain cases, each credit bureau or other entity stores and reports financial tradeline data in a different format. Accordingly, attribute aggregation instructions can be developed for each bureau. The different data formats create significant challenges to the creation of attributes across the multiple bureaus.

According to one embodiment, the system generates a finance attribute from tradeline data obtained from multiple credit data sources. In one embodiment, the generated attribute can be used as a stand alone attribute to evaluate the financial behavior the credit applicant. In another embodiment, the attribute is used as part of a larger scorecard analysis to determine the payment default risk of a credit applicant.

Accordingly, embodiments of a system and method are described for generating a finance attribute from raw financial tradeline data reported by multiple credit data sources. In one embodiment, a computer implemented method for generating a finance attribute from raw tradeline data from a plurality of credit bureaus is provided. The method may comprise retrieving raw tradeline data from each of the plurality of credit bureaus; retrieving industry code data related to each of the plurality of credit bureaus; determining one or more tradeline leveling characteristics that meet at least one predetermined threshold; and generating a finance attribute using the selected leveling characteristics.

In another embodiment, determining one or more tradeline leveling characteristics that meet at least one predetermined thresholds comprises designating a plurality of lowest common denominators from the industry code data related to each of the plurality of credit bureaus as the selected leveling characteristics; leveling the raw tradeline data from each of the plurality of credit bureaus to generate leveled tradeline data using the selected leveling characteristics; excluding extraneous tradeline data from the leveled tradeline data; measuring a correlation among the leveled tradeline data and the raw tradeline data; determining whether the correlation meets the at least one pre-defined threshold; adjusting the selected leveling characteristics if the correlation fails to meet the at least one pre-defined threshold comprising at least one of narrowing the selected leveling characteristics for at least one of the credit bureaus to a different subset of industry code data or including additional industry code data for at least one of the credit bureaus not included in the lowest common denominators in the selected leveling characteristics; and repeating said leveling, excluding, measuring, determining, and adjusting until the selected leveling characteristics generate a correlation that meets the at least one pre-defined threshold.

In another embodiment, determining one or more tradeline leveling characteristics that meet one or more predetermined thresholds comprises designating a plurality of lowest common denominators from the industry code data related to each of the plurality of credit bureaus as the selected leveling characteristics; leveling the raw tradeline data from each of the plurality of credit bureaus to generate leveled tradeline data using the selected leveling characteristics; measuring a correlation among the leveled tradeline data and the raw tradeline data; determining whether the correlation meets the at least one pre-defined threshold; adjusting the selected leveling characteristics if the correlation fails to meet the at least one pre-defined threshold comprising at least one of narrowing the selected leveling characteristics for at least one of the credit bureaus to a different subset of industry code data or including additional industry code data for at least one of the credit bureaus not included in the lowest common denominators in the selected leveling characteristics; and repeating said leveling, measuring, determining, and adjusting until the selected leveling characteristics generate a correlation that meets the at least one pre-defined threshold.

In another embodiment, a computing system is provided. The computing system may comprise a communications module configured to receive raw tradeline data related to a plurality of credit bureaus and to receive industry code data related to each of the plurality of credit bureaus; a finance attribute generation module configured to receive raw tradeline data from each of the plurality of credit bureaus via the communications module, receive industry code data related to each of the plurality of credit bureaus; determine one or more tradeline leveling characteristics that meet at least one pre-determined threshold, and generate a finance attribute using the selected leveling characteristics; and a processor module configured to execute the finance attribute generation module.

In a further embodiment, the finance attribute generation module of the computing system is further configured to determine one or more tradeline leveling characteristics that meet at least one pre-determined thresholds by designating a plurality of lowest common denominators from the industry code data related to each of the plurality of credit bureaus as the selected leveling characteristics; leveling the raw tradeline data from each of the plurality of credit bureaus to generate leveled tradeline data using the selected leveling characteristics; excluding extraneous tradeline data from the leveled tradeline data; measuring a correlation among the leveled tradeline data and the raw tradeline data; determining whether the correlation meets the at least one pre-defined threshold; adjusting the selected leveling characteristics if the correlation fails to meet the at least one pre-defined threshold comprising at least one of narrowing the selected leveling characteristics for at least one of the credit bureaus to a different subset of industry code data or including additional industry code data for at least one of the credit bureaus not included in the lowest common denominators in the selected leveling characteristics; and repeating said leveling, excluding, measuring, determining, and adjusting until the selected leveling characteristics generate a correlation that meets the at least one pre-defined threshold.

In a further embodiment, the finance attribute generation module of the computing system is further configured to determine one or more tradeline leveling characteristics that meet at least one pre-determined thresholds by designating a plurality of lowest common denominators from the industry code data related to each of the plurality of credit bureaus as the selected leveling characteristics; leveling the raw tradeline data from each of the plurality of credit bureaus to generate leveled tradeline data using the selected leveling characteristics; measuring a correlation among the leveled tradeline data and the raw tradeline data; determining whether the correlation meets the at least one pre-defined threshold; adjusting the selected leveling characteristics if the correlation fails to meet the at least one pre-defined threshold comprising at least one of narrowing the selected leveling characteristics for at least one of the credit bureaus to a different subset of industry code data or including additional industry code data for at least one of the credit bureaus not included in the lowest common denominators in the selected leveling characteristics; and repeating said leveling, measuring, determining, and adjusting until the selected leveling characteristics generate a correlation that meets the at least one pre-defined threshold.

For purposes of summarizing the invention, certain aspects, advantages and novel features of the invention have been described herein. Of course, it is to be understood that not necessarily all such aspects, advantages or features will be embodied in any particular embodiment of the invention.

BRIEF DESCRIPTION OF THE DRAWINGS

FIG. 2 shows example tradeline data as reported by different bureaus according to one embodiment;

FIG. 3 shows example data structures used by different credit data sources according to one embodiment;

FIG. 6 shows a set of characteristics for leveling and the accompanying results on a sample data set according to one embodiment;

FIG. 7 shows another set of characteristics for leveling and the accompanying results on a sample data set according to one embodiment;

FIG. 8 shows yet another set of characteristics for leveling and the accompanying results on a sample data set according to one embodiment;

FIG. 9 shows a set of characteristics for leveling and the accompanying results on a sample data set according to one embodiment;

FIGS. 12A-C provide comparison between the results of using two different sets of characteristics for leveling for three credit data sources according to one embodiment.

DETAILED DESCRIPTION OF PREFERRED EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
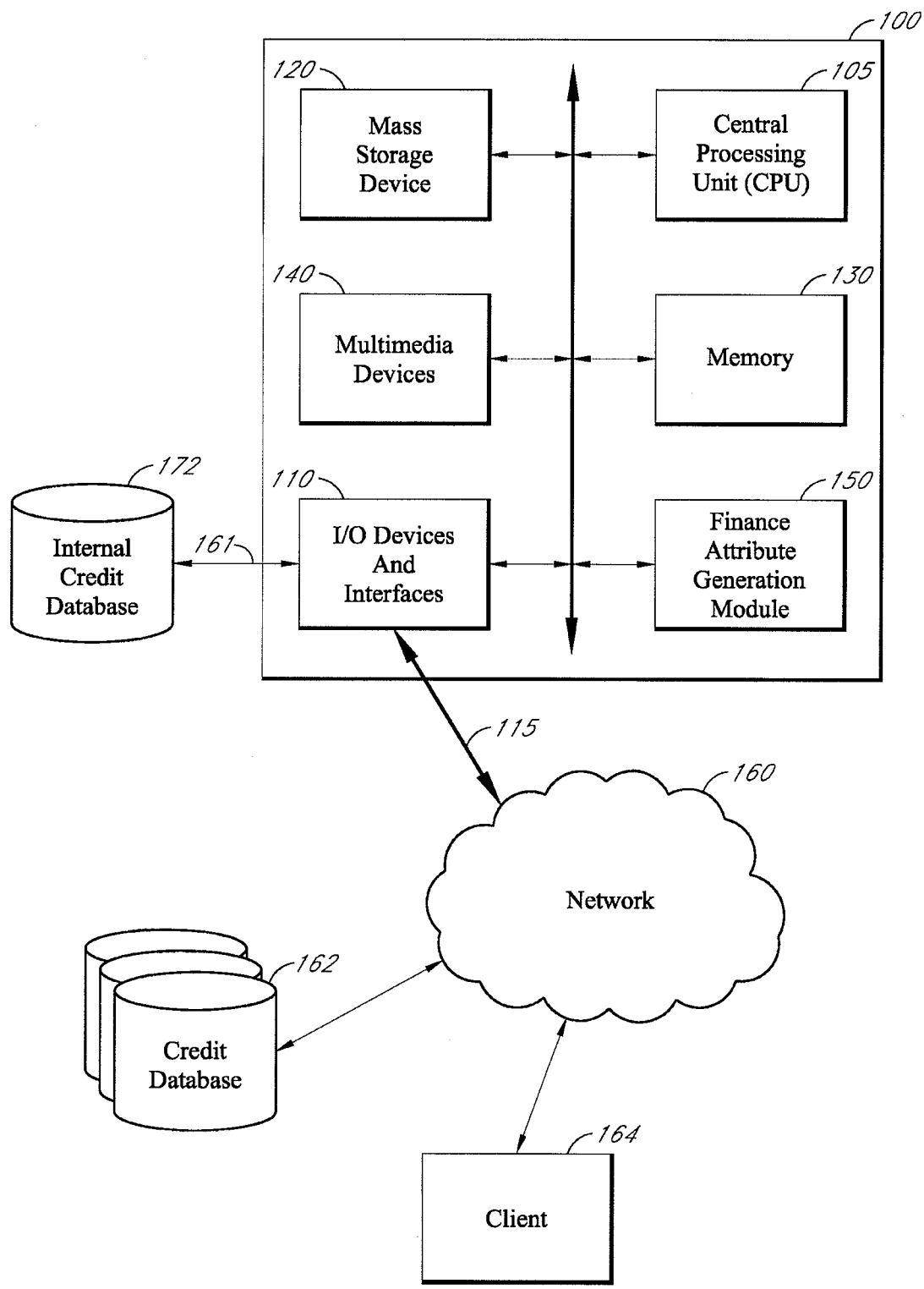
FIG. 1 is a block diagram of a system for generating a finance attribute according to one embodiment.

FIG. 1 is one embodiment of a block diagram of a computing system 100 that is in communication with a network 160 and various systems that are also in communication with the network 160. The computing system 100 may be used to implement certain systems and methods described herein. For example, the computing system 100 may be configured to receive financial and demographic information regarding individuals and generate reports and/or alerts for one or more clients. Although the description provided herein refers to individuals, consumers, or customers, the terms "individual," "consumer," and "customer" should be interpreted to include applicants, or groups of individuals or customers or applicants, such as, for example, married couples or domestic partners, organizations, groups, and business entities.

The computing system 100 includes, for example, a personal computer that is IBM, Macintosh, or Linux/Unix compatible. In one embodiment, the computing system 100 comprises a server, a laptop computer, a cell phone, a personal digital assistant, a kiosk, or an audio player, for example. In one embodiment, the exemplary computing system 100 includes a central processing unit ("CPU") 105, which may include a conventional microprocessor. The computing system 100 further includes a memory 130, such as random access memory ("RAM") for temporary storage of information and a read only memory ("ROM") for permanent storage of information, and a mass storage device 120, such as a hard drive, diskette, or optical media storage device. Typically, the modules of the computing system 100 are connected to the computer using a standards based bus system. In different embodiments, the standards based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows 95, Windows 98, Windows NT, Windows 2000, Windows XP, Windows Vista, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 is electronically coupled to a network 160, which comprises one or more of a LAN, WAN, or the Internet, for example, via a wired, wireless, or combination of wired and wireless, communication link 115. The network 160 communicates with various computing devices and/or other electronic devices via wired or wireless communication links.

According to FIG. 1, information is provided to computing system 100 over the network 160 from one or more data sources including, for example, credit databases 162. The information supplied by the various data sources may include credit data, demographic data, application information, product terms, accounts receivable data, and financial statements, for example. In addition to the devices that are illustrated in FIG. 1, the network 160 may communicate with other data sources or other computing devices. In addition, the data sources may include one or more internal and/or external data sources. In some embodiments, one or more of the databases or data sources may be implemented using a relational database, such as Sybase, Oracle, Code-Base and Microsoft® SQL Server as well as other types of databases such as, for example, a flat file database, an entity-relationship database, and object-oriented database, and/or a record-based database.

In addition to supplying data, client 164 may further request information from the computing system 100. For example, the client 164 may request data related to a consumer or a group of consumers. Such a request may include consumer information identifying the consumer(s) for which information is desired.

The I/O devices and interfaces 110 further provide a communication interface to an internal credit database 172. In the embodiment of FIG. 1, the computing system 100 is coupled to a secured network 161, such as a secured LAN, for example. The secured network 161 communicates with the internal credit database 172. In some embodiments, the internal credit database 172 is configured to communicate with additional computing devices over the network 160 or some other network, such as a LAN, WAN, or the Internet via a wired, wireless, or combination of wired and wireless, communication link. In certain embodiments, the client 164 may have access to the internal credit database 172 through the network 160, and/or the secured network 161.

In the embodiment of FIG. 1, the computing system 100 also includes a finance attribute generation module 150 that may be executed by the CPU 105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In the embodiment shown in FIG. 1, the computing system 100 is configured to execute the finance attribute generation module 150, among others, in order to generate and/or calculate the value for a finance attribute. Finance attribute generation module 150 is further configured to access internal credit database 172, credit databases 162, along with additional sources of information. In some embodiments, finance attribute generation module 150 may be configured to obtain tradeline data from internal credit database 172, from credit databases 162 or from a combination of internal credit database 172 and credit databases 162. These records are accessed by the finance attribute generation module 150 to generate a finance attribute aggregated from raw tradeline data returned by the various credit databases, as will be described in more detail below.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

FIG. 2 shows examples of finance tradeline data as reported by three different credit data sources. In the example, the credit data sources are credit bureaus, though in other embodiments, the credit data sources are other sources in addition or instead of one or more of the credit bureaus. Tradeline data 200, 202, and 204 are from various credit data sources, for example, from credit bureau 1, credit bureau 2, and credit bureau 3, respectively. These could be, for example, Experian, Equifax, and TransUnion. Although all three examples refer to the same tradeline of the individual consumer profiled, a "NORTHEAST CREDIT UNION" account, each bureau reports that tradeline data differently. The differences arise from the mechanism(s) by which credit data are collected and stored. For example, in the United States, even though creditors report data to the credit data sources in standard Metro formats, each data source interprets the information differently and has its own unique format for returning the data.

In some embodiments, the tradeline data may comprise different or additional data fields than as shown. A skilled artisan will understand that the processes described herein may be modified to accommodate different forms of financial data.

FIG. 3 shows a particular example of how the data and/or data structures may vary across the credit data sources. In this example, although both credit data sources 300 and 302 use two-letter codes to denote the tradeline category, they differ in their internal coding. For example, credit data source 300 has additional codes to denote tradeline related to education loans (those beginning with "E"). On the other hand, some credit data sources such as credit data source 304 may use a one-letter code to denote the tradeline category (for example using "F" to denote all tradelines related to personal finance).

Aside from the differences in data and/or data structures, there are also variations in data representation. As a result, the same loan by the same consumer may be represented differently across different credit data sources. For example, credit data source 300 may classify an auto loan tradeline with the code "FA" (for Auto financing co.) while credit data source 302 may classify the same loan as "FP" (for Personal loan co.). Credit data source 304 may simply classify the same loan with an "F" code (generic Personal Finance). Thus, a creditor who relies on such data to determine whether to extend credit needs to account for these differences. In many instances, these differences make this a difficult endeavor for the average creditor. The finance attributes generated by embodiments of the disclosure take these differences into account and enable such a creditor to easily and quickly assess consumer behavior.

Figure 4:
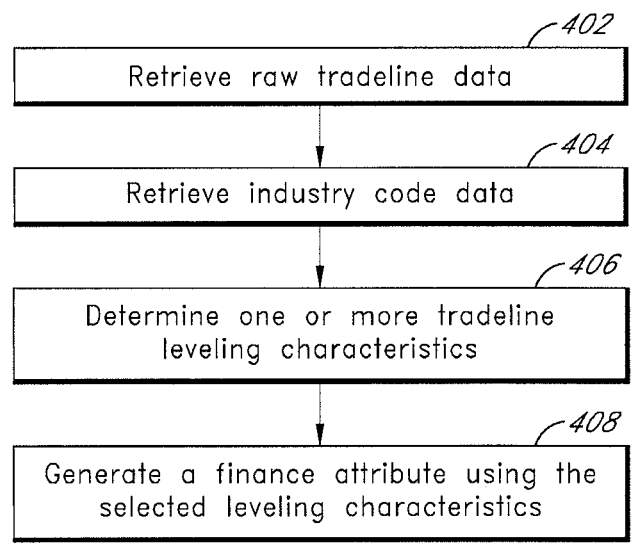
FIG. 4 is a flow chart showing the process of generating a finance attribute according to one embodiment.

FIG. 4 is a system flowchart showing the operation of embodiments of the disclosure that may be executed on computing system 100. The operation begins at state 402, where raw tradeline data is first retrieved and/or received. Industry code data from the various credit data sources, such as those illustrated in FIG. 3, is then retrieved and/or received in state 404. Next, at state 406 tradeline characteristics, such as those shown in FIG. 6, are determined. Then at state 408, a finance attribute is generated using the selected characteristics. It is recognized that other embodiments of FIG. 4 may also be used, such as, for example, embodiments where the raw tradeline data is retrieved and/or received after or at the same time as the industry code data, and embodiments where raw tradeline data is retrieved and/or received and industry code data is not retrieved and/or received. While this example focuses on filtering finance tradeline data, those skilled in the art will appreciate that the same leveling methods can be applied to various types of credit or financial data.

The process of leveling involves determining a proper set of characteristics that will yield leveled, for example, consistent tradeline data from the various credit data sources. As can be seen in FIG. 6 below, once the KOB or Industry code data are known, the goal becomes incorporating the proper codes into the set of characteristics. Embodiments of the present disclosure use an iterative process to select characteristics and measure the resulting data against certain thresholds, with each successive iteration producing more refined characteristics that produces more leveled data.

Figure 5:
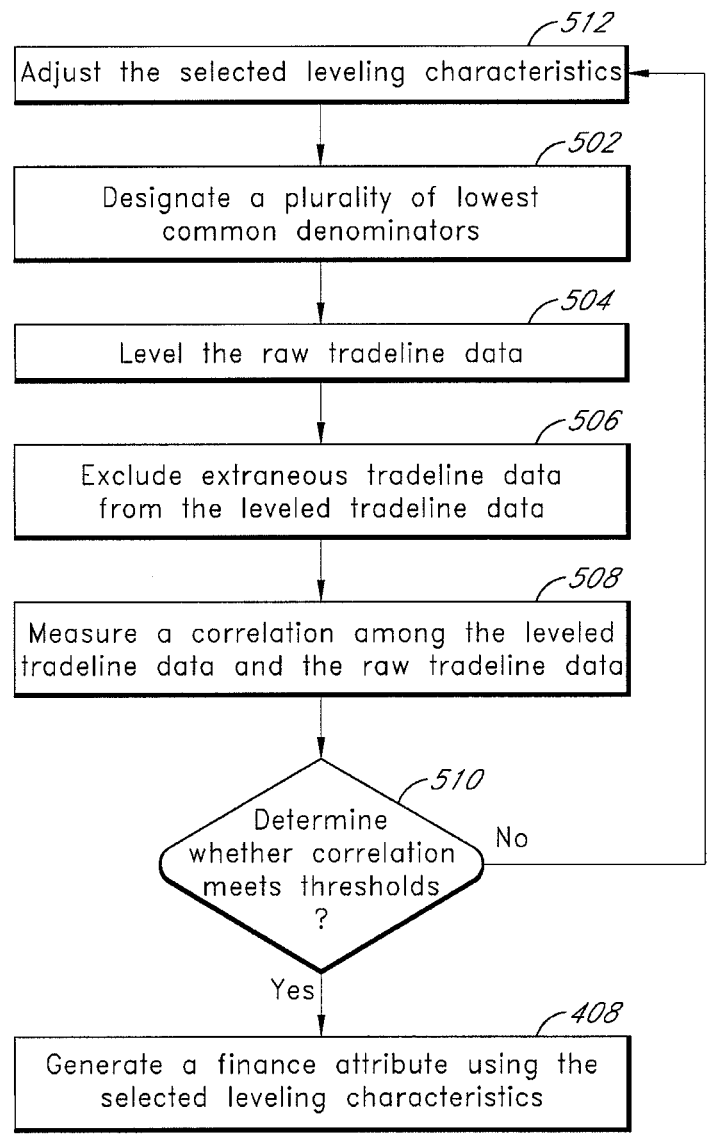
FIG. 5 is a flow chart showing a process for determining characteristics for leveling according to one embodiment.

FIG. 5 illustrates one embodiment of the process undertaken in state 406 of FIG. 4 according to one embodiment. The process begins in state 502, where a plurality of lowest common denominators is designated as the selected characteristics to be used in the leveling. In one embodiment, the lowest common denominators selected are the minimum set of overlapping tradeline category codes. Then in state 504, the raw tradeline data are leveled using the selected characteristics. Next, in state 506, extraneous tradeline data are excluded from the leveled tradeline data. In another embodiment, the process moves to state 508 without excluding the extraneous tradeline data. In state 508, the process measures a correlation among the leveled tradeline data and the raw tradeline data. At decision state 510, if the correlation measured in 508 meets one or more pre-defined thresholds, the process is complete, exits this process, and proceeds, for example, to state 408 of FIG. 4, where a finance attribute is generated. Otherwise, if the correlation does not meet the thresholds, the process proceeds to state 512, where the selected characteristics for leveling are adjusted and the process begins again.

In one embodiment, the thresholds differ based on the desired attribute and/or are pre-defined. For example, an embodiment of the invention may have a range of acceptable percentages as the thresholds. In that embodiment, if the differences among leveled tradeline data (such as the ones shown in graph 810 as discussed below) are within those ranges, then the thresholds are considered met. In other embodiments, such thresholds are defined so that the system will undertake a fewer number of iterations as to produce quicker results. Those skilled in the art can appreciate that the thresholds can be tailored to a variety of potentially competing objectives such as speed and accuracy, so that a number of trade-offs may be considered before such thresholds are input into the system.

FIG. 6 provides an example of different finance attributes from multiple credit data sources according to an embodiment of the invention. Characteristics 600 comprise various finance characteristics. Characteristics 602 are directed to tradeline data from credit data source 1. Because credit data source 1 uses a two-letter Kind of Business (KOB) code to categorize its tradeline data, characteristics 602 use a set of two-letter finance-related codes to select finance tradeline data. Similarly, characteristics 604 are directed to tradeline data from credit data source 2. Much like characteristics 602, characteristics 604 also use a set of finance-related codes. Finally, characteristics 606 are directed to tradeline data from credit data source 3, which uses a one-letter Industry code. The term "REV" means revolving tradelines and the term "ILN" means installment tradelines. In this example, both types of tradelines are selected. The term "STU" means student tradelines and these tradelines are excluded in this example.

In FIG. 6, graph 610 shows the results of applying characteristics 600 to a sample data set from the three credit data sources. The attribute value "1+" means one or more tradelines. The graph 610 shows that 77.28% of consumers have at least one finance tradeline in credit data source 1, 81.02% of consumers have at least one finance tradeline in credit data source 2, and 58.01% of consumers have at least one finance tradeline in credit data source 3. While there is substantial overlap, the differences reflect the different data structures and representations used by the credit data sources. In this example, the differences among the results do not meet a predetermined preferred threshold. Therefore, in one embodiment, the characteristics are further refined to level the data.

FIG. 7 shows the use of revised characteristics along with the results. Characteristics 700 utilize the lowest common denominators across the credit data sources. This example embodiment of the invention recognizes that all three credit data sources use "F" in whole or in part in their categorization of finance tradeline data. Using this lowest common denominator approach, characteristics 702 select any tradeline data within credit data source 1 that has a KOB code that begins with "F," as shown by the pseudo-code "F*." Similarly, characteristics 704 select any tradeline data within credit data source 2 that has an Industry code that begins with "F," as shown by the pseudo-code "F*." Finally, characteristics 706 select any tradeline data with an Industry code "F" within credit data source 3.

Graph 710 shows the results of applying characteristics 700 to the same sample data set as in FIG. 6. The graph 710 shows that characteristics 700 results in a 27.98% match from credit data source 1, a 35.88% match from credit data source 2, and a 10.78% match from credit data source 3. In this example, the differences among the results do not meet a predetermined preferred threshold. Accordingly, another leveling attempt is applied.

FIG. 8 shows the use of revised characteristics along with the results. Here, characteristics 800 use a more refined set of characteristics than those shown in FIG. 7. This embodiment also recognizes that all three credit data sources use "F" in whole or in part in their categorization of finance tradeline data. Therefore, characteristics 802 and 804 select with "F*." In addition, characteristics 806 also select for code "Q" within credit data source 3 to capture those tradeline data categorized as "Q—other finance."

Graph 810 shows the results of applying characteristics 800 to the same sample data set as in FIGS. 6 and 7. Characteristics 800 results in a 27.98% match from credit data source 1, a 35.88% match from credit data source 2, and a 12.70% match from credit data source 3, an increase of about two percent over bar 716 from graph 710. In this example, the differences among the results do not meet a predetermined preferred threshold. Accordingly, another leveling attempt is applied. By way of this iterative process of refining the characteristics, embodiments of the present disclosure improve the quality of the resulting finance attributes. In other embodiments, the thresholds can be defined so that the results shown in FIG. 6, 7, or 8 would satisfy the thresholds, thereby enabling those embodiments to undertake fewer revisions to the characteristics and generate the finance attribute with greater speed.

FIG. 9 shows the use of revised characteristics as well as a cleanup to eliminate extraneous tradelines. Characteristics 900 use a more refined set of characteristics than those shown in FIG. 8. This embodiment also recognizes that focus on the "FP" codes Therefore, characteristics 902 select FP, characteristics 904 select FP, and characteristics 906 select F. In addition, a clean up is applied to the characteristics 900 to remove extraneous tradeline data. For example, in this embodiment characteristics 902, 904, and 906 remove ALE, STU, and MTG (auto lease trades, student trades, mortgage loan trades, etc.).

Graph 910 shows the results of applying characteristic set 900 to the same sample data set as in FIGS. 6, 7, and 8. The graph 910 shows that characteristics 900 result in a 38.22% match from credit data source 1, a 40.21% match from credit data source 2, and a 51.14% match from credit data source 3. In this example, the differences among the results do meet the pre-determined preferred threshold so the iterative process can end and the finance attribute can be generated.

One embodiment of a method of measuring correlation is further illustrated below in conjunction with FIGS. 10A-10E. FIGS. 10A-10E show the correlation among the results of applying different characteristics for leveling on a sample data set according to one embodiment of the present disclosure.

Figure 10A:
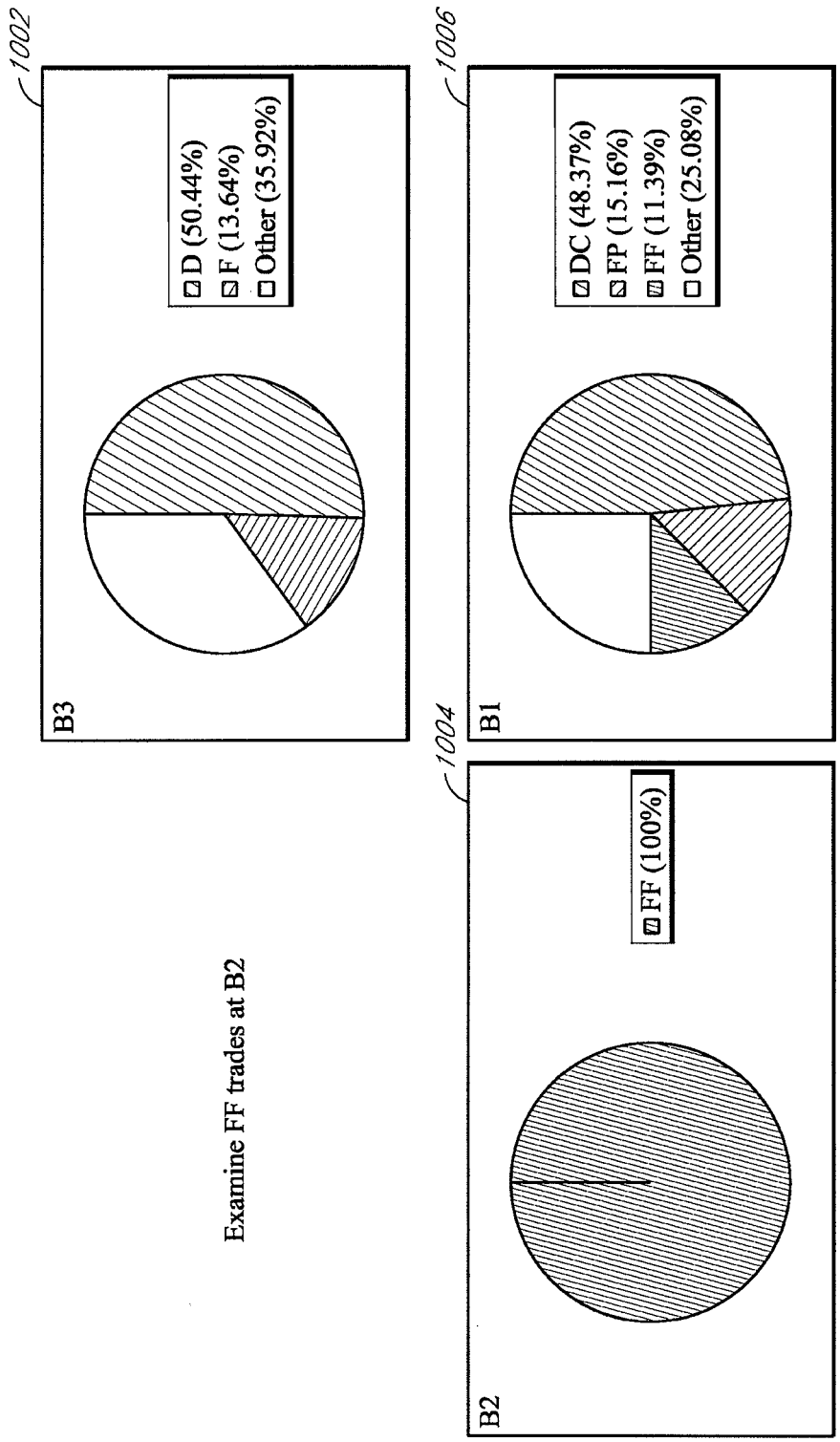
FIGS. 10A-10E show the results of applying various characteristics for leveling on a sample data set according to one embodiment.

FIG. 10A shows the results of applying a set of characteristics that focuses on the KOB or Industry code "FF" (sales financing) at B2, or credit bureau 2. Graph 1004 shows a 100% match at B2 since the characteristics include the same Industry code used by B2. Graph 1002 shows the type of data returned by B3, or credit bureau 3, using the same characteristics. It indicates that 50.44% of the data returned are in the "D" category, 13.64% of the data returned are in the "F" category, and 35.92% of the data returned are in the "Other" category. The "D" category stands for department store accounts. Graph 1006 shows the type of data returned by B1, or credit bureau 1, using the same characteristics. It indicates that 48.37% of the data returned are in the "DC" category (also stands for department stores), 15.16% of the data returned are in the "FP" category, 11.39% of the data returned are in the "FF" category, and 25.08% of the data returned are in the "Other" category.

Figure 10B:
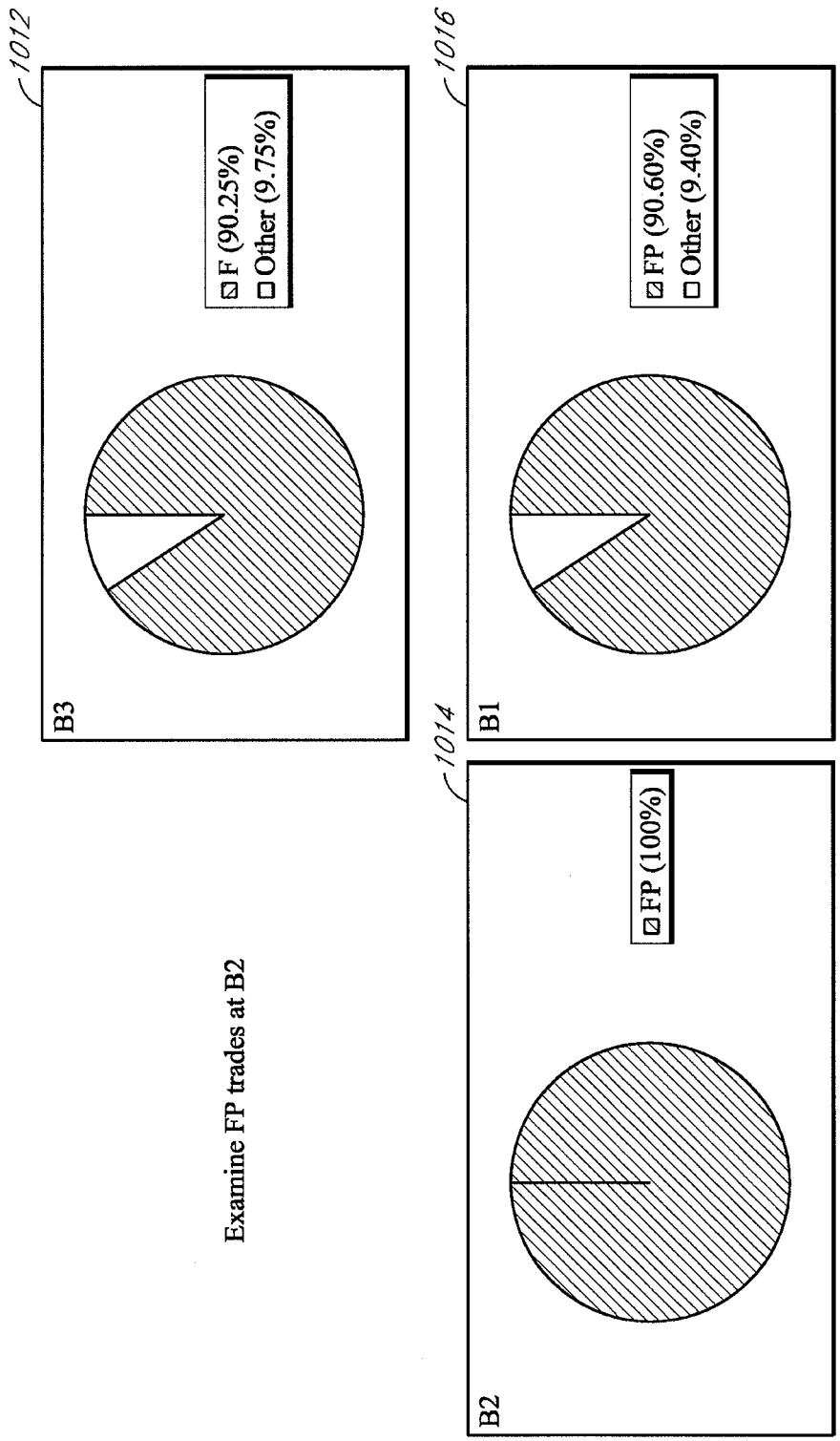

FIG. 10B shows the results of applying a set of characteristics that focuses on the KOB or Industry code "FP" (personal finance) at B2. Graph 1014 shows a 100% match at B2 since the characteristics include the same Industry code used by B2. Graph 1012 shows the type of data returned by B3 using the same characteristics. It indicates that 90.25% of the data returned are in the "F" (personal finance) category and 9.75% of the data returned are in the "Other" category. There is a high degree of correlation between the results from B2 and B3. A similar high correlation is found between the results from B1 and B2. Graph 1016 indicates that 90.60% of the data returned are in the "FP" category, with 9.40% of the data returned are in the "Other" category.

Figure 10C:
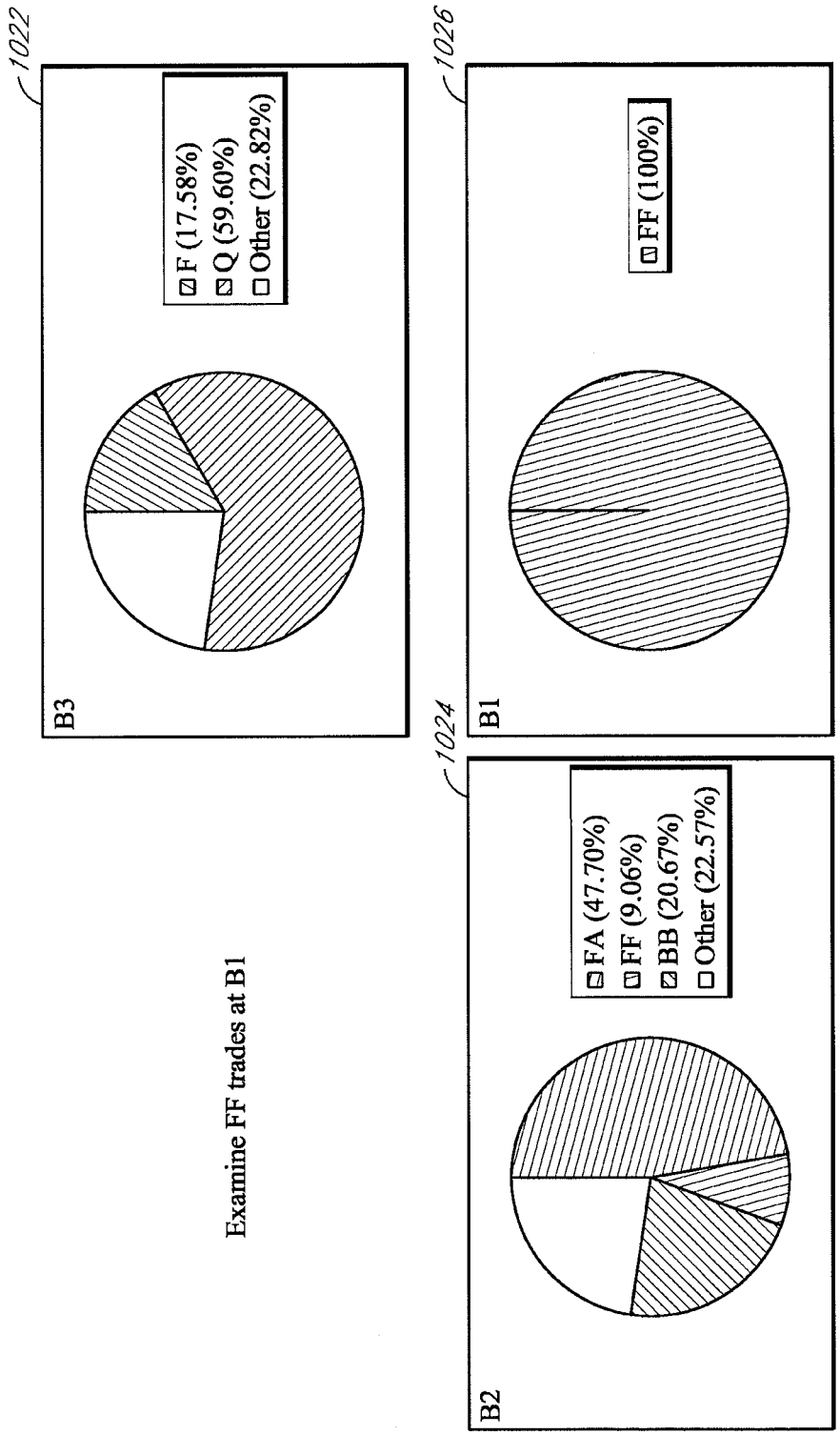

FIG. 10C shows the results of applying a set of characteristics that focuses on the KOB or Industry code "FF" at B1. Graph 1026 shows a 100% match at B1 since the characteristics include the same Industry code used by B 1. Graph 1022 shows the type of data returned by B3 using the same characteristics. It indicates that 17.58% of the data returned are in the "F" category, 59.60% of the data returned are in the "Q" category, and 22.82% of the data returned are in the "Other" category. Graph 1024 shows the type of data returned by B2. It indicates that 47.70% of the data returned are in the "FA" (auto financing) category, 9.06% of the data returned are in the "FF" category, 20.67% of the data returned are in the "BB" (banks) category, and 22.57% of the data returned are in the "Other" category.

Figure 10D:
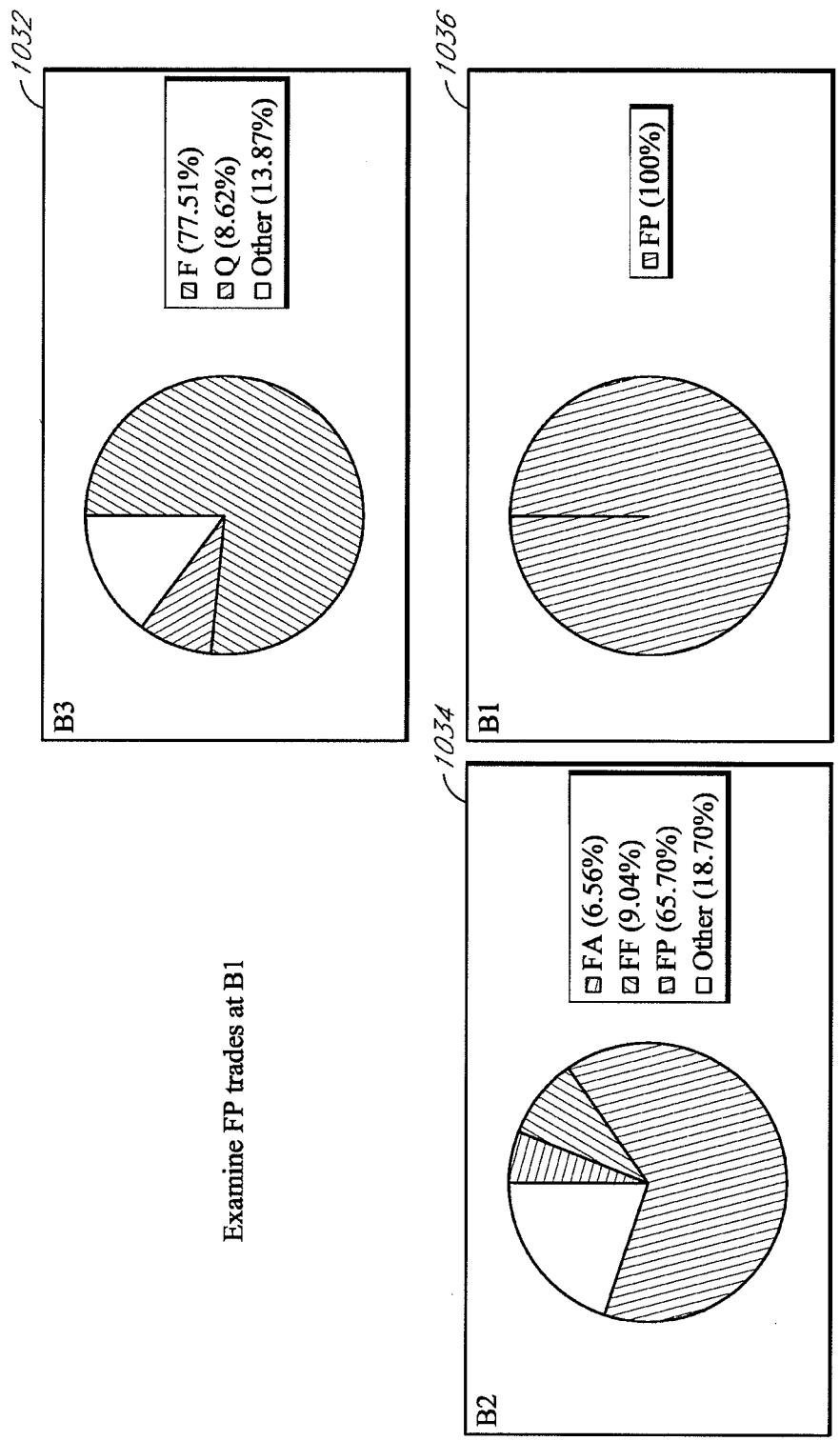

FIG. 10D shows the results of applying a set of characteristics that focuses on the KOB or Industry code "FP" at B1. Graph 1036 shows a 100% match at B1 since the characteristics include the same Industry code used by B 1. Graph 1032 shows the type of data returned by B3 and indicates that 77.51% of the data returned are in the "F" category, 8.62% of the data returned are in the "Q" category, and 13.87% of the data returned are in the "Other" category. The amounts to a high correlation between the data from B3 and B1 because "F" and "Q" data from B3 are both finance tradelines and they combine to make up over 86% of the result. Similarly, there is a high correlation between the data from B1 and B2. Graph 1034 shows the type of data returned by B2. It indicates that 6.56% of the data returned are in the "FA" category, 9.04% of the data returned are in the "FF" category, 65.70% of the data returned are in the "FP" category, and 18.70% of the data returned are in the "Other" category. The categories that begin with "F" from B2 total again over 80%, which means that 80% of the data returned by B2 using the same characteristics are finance tradelines as well.

Figure 10E:
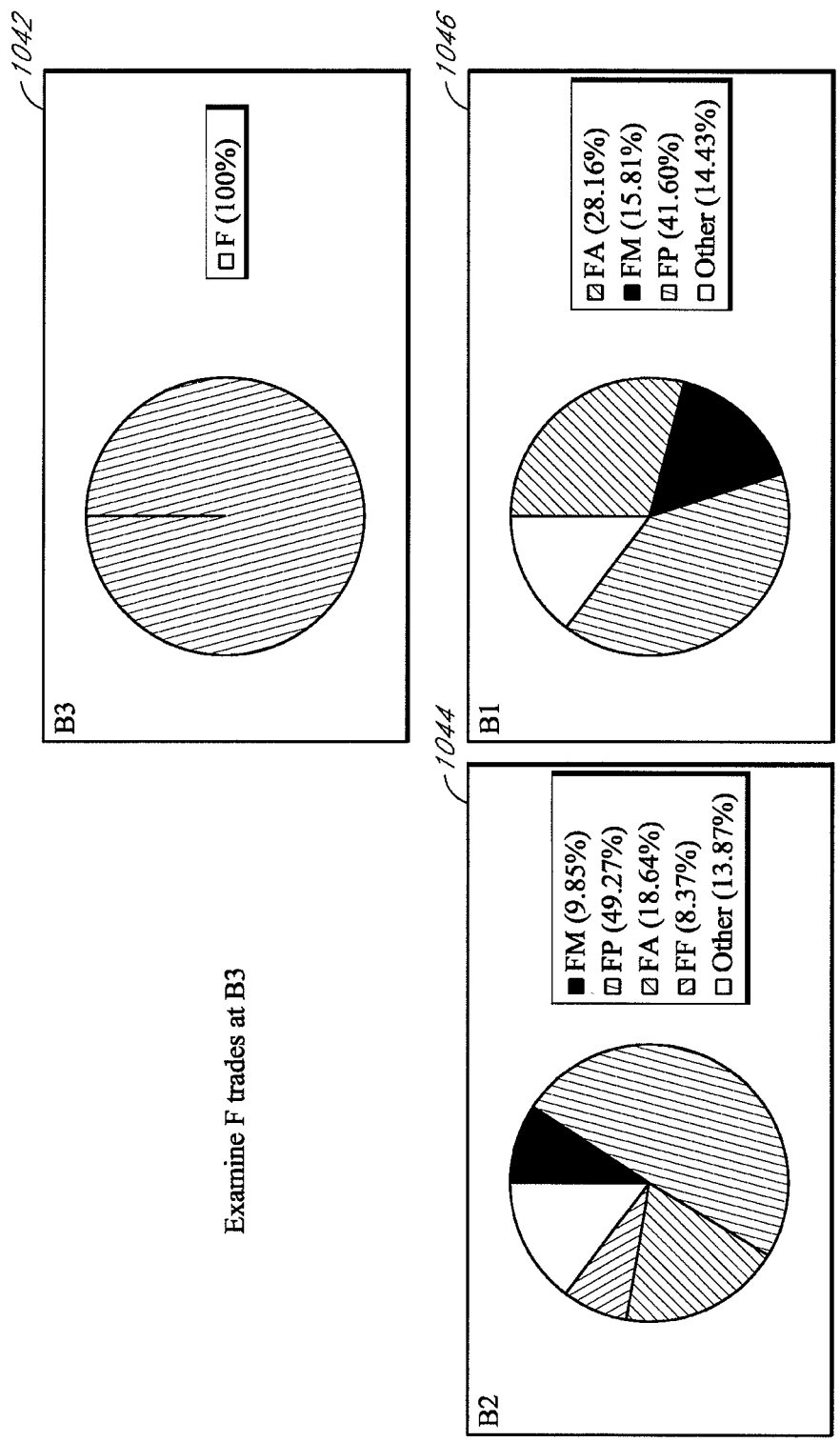

Finally, FIG. 10E shows the results of applying a set of characteristics that focuses on the Industry code "F" at B3, or credit bureau 3. Graph 1042 shows a 100% match at B3 since the characteristics include the same Industry code used by B3. Graph 1044 shows the type of data returned by B2. It indicates that 9.85% of the data returned are in the "FM" category, 49.27% of the data returned are in the "FP" category, 18.64% of the data returned are in the "FA" category, 8.37% of the data returned are in the "FF" category, and 13.87% of the data returned are in the "Other" category. Graph 1046 shows the type of data returned by B1. It indicates that 28.16% of the data returned are in the "FA" category, 15.81% of the data returned are in the "FM" category, 41.60% of the data returned are in the "FP" category, and 14.43% of the data returned are in the "Other" category. Because of the high degree of correlation among the results in FIG. 10B, in one embodiment those characteristics shown in FIG. 10B are used to level tradeline data. Other embodiments use the characteristics shown in FIG. 10A, 10C-10E. Another embodiment evaluates the results of applying these characteristics in an iterative process and selects the ones with the best correlation as part of state 406 in FIG. 4.

Figure 11:
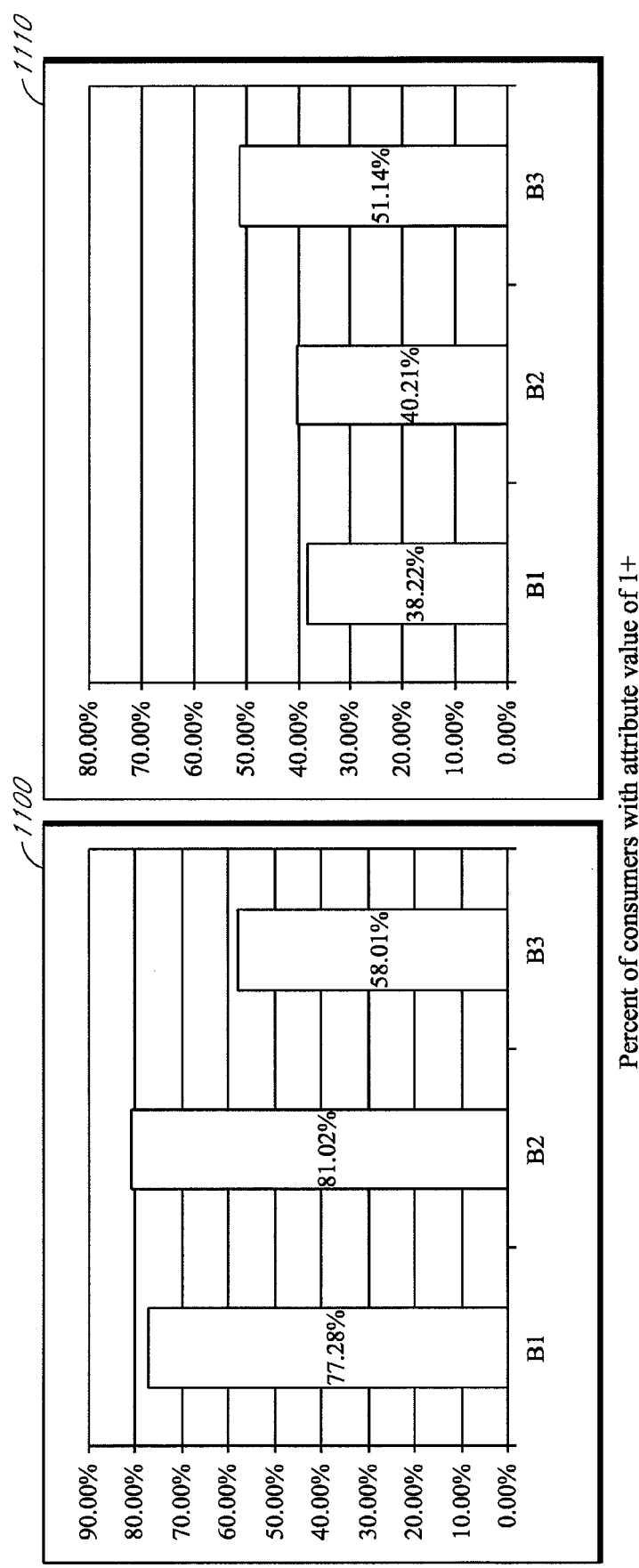
FIG. 11 provides a comparison between the results of using two different sets of characteristics for leveling according to one embodiment.

FIG. 11 illustrates embodiments of a side-by-side comparison of the results shown in FIGS. 6 and 9. Graph 1100 shows the resulting tradeline data from applying the characteristics shown in FIG. 6, while graph 1110 shows the resulting tradeline data from applying the characteristics shown in FIG. 9. As can be seen, the results from applying the characteristics in FIG. 9 have a higher correlation and are more leveled. One embodiment of the invention may begin by selecting characteristics that produce results similar to those shown in FIG. 6, and through the iterative process described above in conjunction with FIGS. 6-9, and/or 10A-E, arrive at characteristics that produce results similar to those shown in FIG. 9.

Figure 12B:
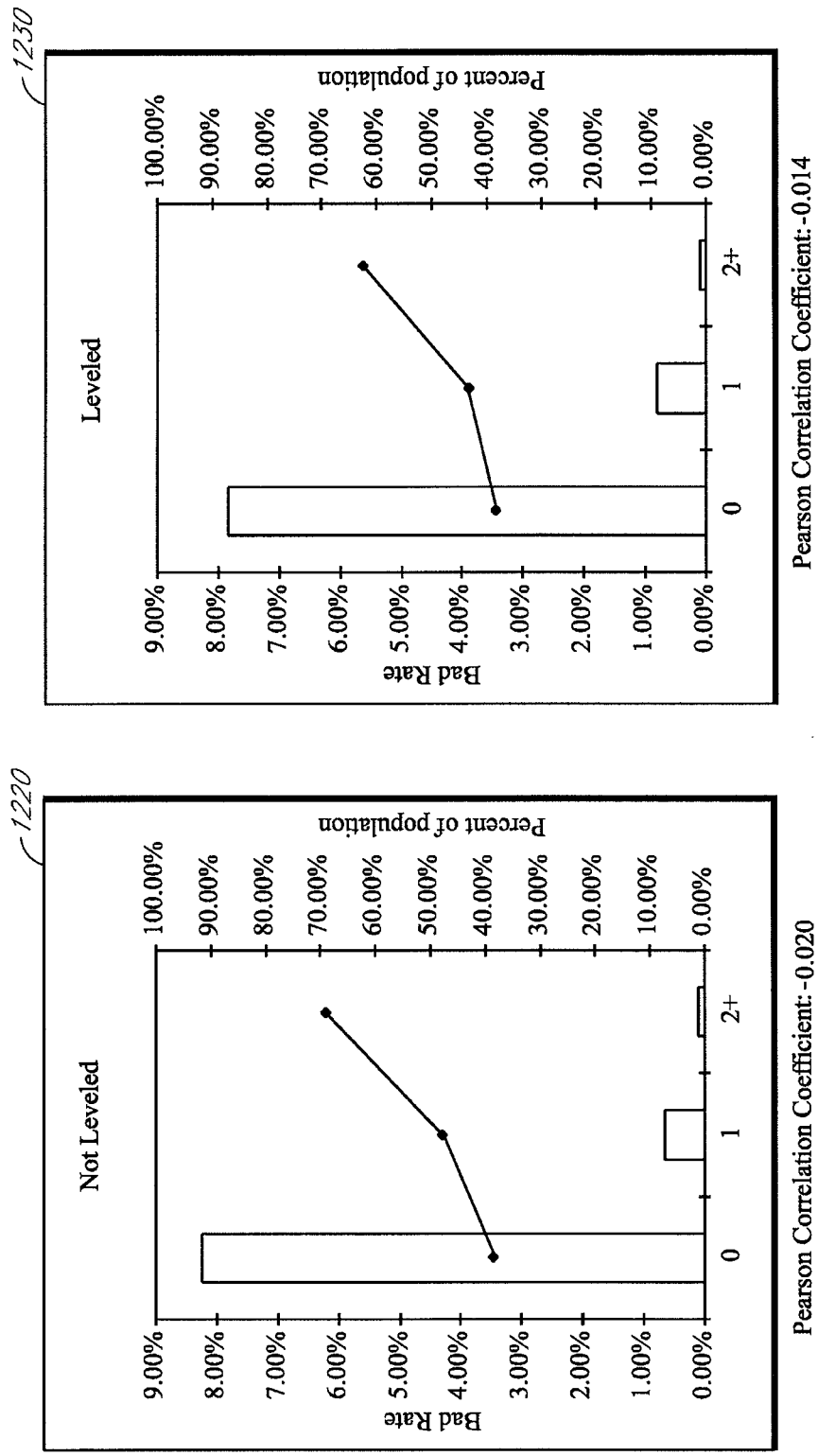

FIGS. 12A-12C illustrate embodiments of graphs that show the use of unleveled attributes and leveled attributes as predictors of payment defaults for each of the credit bureaus. In FIG. 12A, Graph 1200 shows an example finance attribute generated by an embodiment of the present disclosure. The left Y-axis shows the bad-rate, for example, the rate of defaults, as indicated by the line graph. The right Y-axis shows the percent of population that had a finance trade in the past 12 months in the sample data set, as indicated by the bar graph. The bar graph represents the finance attribute. Thus, graph 1200 shows that approximately 70% of the population had obtained 0 finance trades (a finance attribute of 0) in the last 12 month, and of those 70%, just over 3% had a default "bad rate." The "bad rate" rises slightly for those with 1 finance trade in the last 12 months (a finance attribute of 1) and those with 2 or more trades (a finance attribute of 2+). The Pearson correlation coefficient for graph 1210 is −0.006. Pearson correlation coefficients are used to indicate the strength of a linear relationship between two variables, which in this example are the bad rate and the total number of personal finance trades.

Graph 1210 shows a leveled finance attribute generated by another embodiment of the present disclosure. This finance attribute is generated by using characteristics that focus on the "FP" code. The "bad rate" rises more dramatically for those in the population that have one or two or more trades. The Pearson correlation coefficient for graph 1210 is −0.014, thereby showing a higher correlation between the number of personal finance trade and the bad rate in the graph 1210 than in the graph 1200. Therefore, the leveled finance attribute shown in graph 1210 demonstrates a greater correlation to credit risk than the non-leveled finance attribute shown in graph 1200.

FIG. 12B focuses on data obtained from another credit data source, credit bureau 2. Graph 1220 shows that approximately 90% of the population had obtained 0 finance trades (a finance attribute of 0) in the last 12 months, and of those 90%, just over 3% had a default "bad rate." The "bad rate" rises higher for those with 1 finance trade in the last 12 months (a finance attribute of 1) and even more for those with 2 or more trades (a finance attribute of 2+). The Pearson correlation coefficient for graph 1220 is −0.020.

Graph 1230 shows a leveled finance attribute where the "bad rate" rises less dramatically for those in the population that have one or two or more trades. The Pearson correlation coefficient for graph 1230 is −0.014, thereby showing a lower correlation between the number of personal finance trade and the bad rate in the graph 1230 than in the graph 1220. Therefore, the non-leveled finance attribute shown in graph 1220 demonstrates a greater correlation to credit risk than the leveled finance attribute shown in graph 1230.

FIG. 12C focuses on data obtained from another credit data source, credit bureau 3. Graph 1240 shows that approximately 76% of the population had obtained 0 finance trades (a finance attribute of 0) in the last 12 months, and of those 76%, just over 3% had a default "bad rate." The "bad rate" rises slightly higher for those with 1 finance trade in the last 12 months (a finance attribute of 1) and slightly more for those with 2 or more trades (a finance attribute of 2+). The Pearson correlation coefficient for graph 1220 is −0.006.

Graph 1250 shows a leveled finance attribute where the "bad rate" rises dramatically for those in the population that have one or two or more trades. The Pearson correlation coefficient for graph 1250 is −0.024, thereby showing a higher correlation between the number of personal finance trade and the bad rate in the graph 1250 than in the graph 1240. Therefore, the leveled finance attribute shown in graph 1250 demonstrates a greater correlation to credit risk than the unleveled finance attribute shown in graph 1240.

Figure 13:
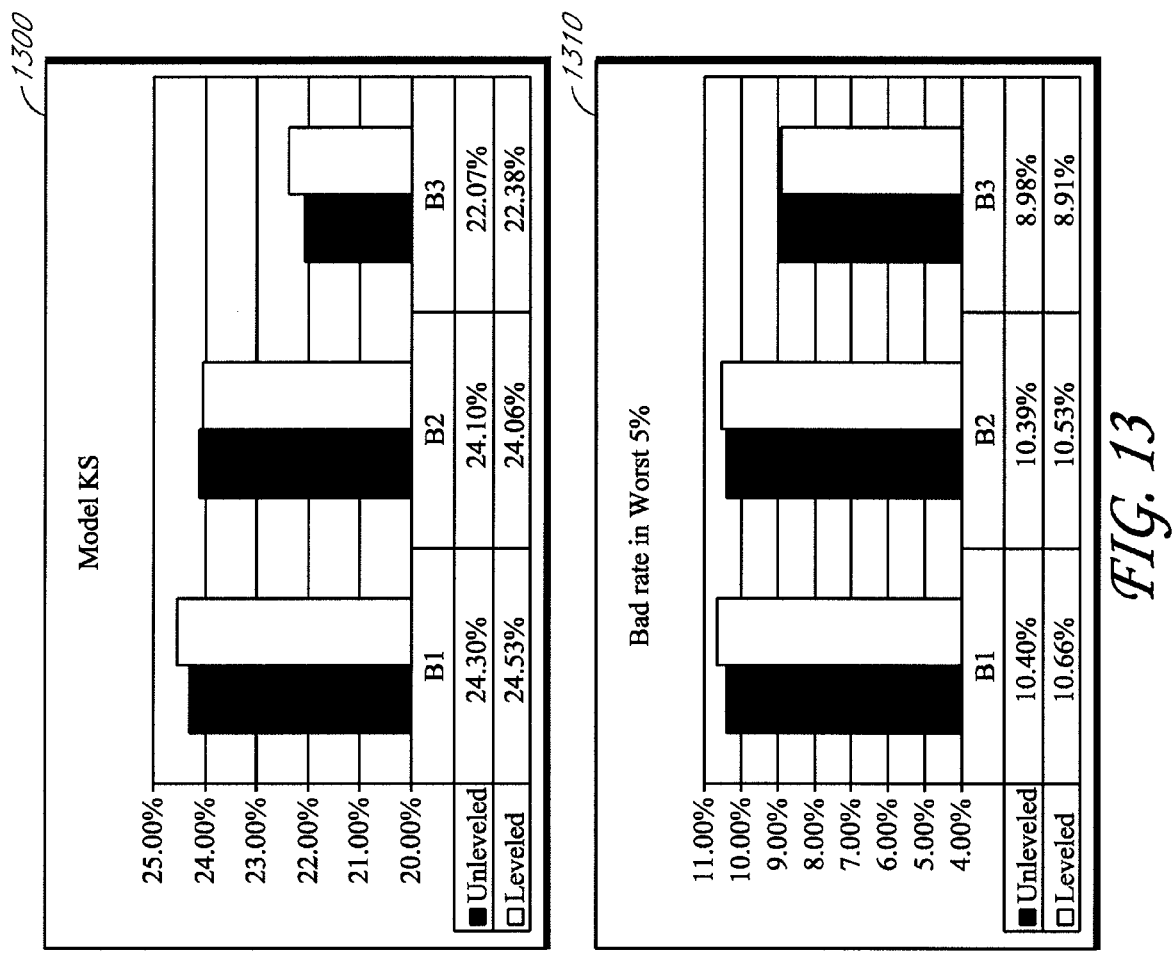
FIG. 13 shows the results of two financial models that use finance attributes generated by a set of characteristics for leveling according to one embodiment.

As set forth above the leveled attribute may be used in one or more models wherein the model is applied to a set of data relating to one or more customers. In some embodiments, the models use a plurality of attributes to predict a characteristic, such as, for example, the risk level for one or more customers or the likelihood of bankruptcy for the one or more customers. FIG. 13 illustrates sample embodiments of a model that can be used to test an attribute. In FIG. 13, one version of the model used the unleveled finance attribute and another version of the model used the leveled finance attribute. Graph 1300 illustrates the testing of the finance attribute on Model KS (in one embodiment, modeled after Kolmogorov-Smirnov). KS is the maximum point difference between the cumulative distribution of "goods" and the cumulative distribution of "bads." In one embodiment, the "goods" represent data sample with low default risk/good repayment history while "bads" represent data sample with high default risk/poor repayment history. In one embodiment, the difference scale is shown along the Y-axis of graph 1300. In some embodiments, a high KS is desirable because it indicates a large separation between the good rate and the bad rate. Graph 1300 shows how the first Model KS graph measures alternative characteristics and check how the Model KS changes as the characteristics change.

The graph 1300 show that for B1 and B3, the model was better for the leveled attribute and slightly worse for B2. Graph 1310 illustrates another testing of the finance attribute using a model that predicts the bad rate in the worst 5% of a population. The numbers in FIGS. 12A-C reflect the sample population while the model shown in graph 1310 takes the worst 5% of the score range. By having a higher bad rate with the leveled definitions across the spectrum, this indicates that the model is pushing more bad to the bottom, which is an indication of a better performing model. As shown in the graph 1310, for B1 and B2, the model was better using the leveled attribute and just slightly worse for using B3. In one embodiment, an attribute can be further leveled until the difference between the non-leveled attribute and the leveled attribute exceeds a predetermined threshold for one or more of the data sources.

Although the foregoing invention has been described in terms of certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein.

What is claimed is:

1. A computer-implemented method for generating an attribute from raw tradeline data stored in different formats by a plurality of credit sources, the method comprising:
    electronically obtaining raw tradeline data from each of a plurality of credit data sources over a network that is communicating with the plurality of credit data sources;
    retrieving code data related to the raw tradeline, wherein the code data comprises a plurality of codes, each individual code of the plurality of codes indicating a category or classification of respective tradeline data, wherein at least a first subset of codes used in association with a first credit data source of the plurality of credit data sources is not used in association with a second credit data source of the plurality of credit data sources and wherein different formats comprise one or more differences between the raw tradeline data of the plurality of credit data sources;
    designating a first set of tradeline characteristics associated with a subset of the code data to determine whether the first set of tradeline characteristics will yield substantially consistent tradeline data across the plurality of credit data sources by iteratively:
        accessing raw tradeline data associated with the subset of code data from each of the plurality of credit data sources;
        measuring a correlation between the accessed tradeline data and the raw tradeline data for each of the plurality of credit data sources; and
        updating the subset of the code data until the measurement for each of the plurality of credit data sources meets at least one predefined threshold;
    based on a determination that the measurement meets the at least one predefined threshold, identifying the tradeline characteristics associated with the updated subset of the code data; and
    generating a leveled attribute using the identified tradeline characteristics.

2. The computer-implemented method of claim 1, wherein the plurality of credit data sources are each a different credit bureau.

3. The computer-implemented method of claim 1, wherein at least one of the plurality of codes is a two-letter code denoting a tradeline category.

4. The computer-implemented method of claim 1, wherein designating the first set of tradeline characteristics comprises:
    designating a plurality of lowest common denominators from the code data, wherein the lowest common denominators comprise a minimum set of overlapping codes associated with the plurality of credit data sources;
    using the raw tradeline data from each of the plurality of credit data sources to generate test tradeline data using selected characteristics;
    adjusting the selected characteristics based on a determination that at least one difference between tradeline data associated with the selected characteristics across each of the two or more of the plurality of credit data sources does not meet the at least one predefined threshold; and
    repeating said using and adjusting until the selected characteristics generate a difference that meets the at least one predefined threshold.

5. The computer-implemented method of claim 4, wherein adjusting the selected characteristics comprises at least one of: (a) narrowing the selected characteristics for at least one of the credit data sources to a different subset of code data or (b) including additional code data for at least one of the credit data sources not included in the lowest common denominators in the selected characteristics.

6. A computing system for generating an attribute from raw tradeline data stored in different formats by a plurality of credit sources, the computer system comprising:
    a memory; and
    a processor in communication with the memory and configured with processor-executable instructions to perform operations comprising:
        electronically obtaining raw tradeline data from each of a plurality of credit data sources over a network that is communicating with the plurality of credit data sources;
        retrieving code data related to the raw tradeline, wherein the code data comprises a plurality of codes, each individual code of the plurality of codes indicating a category or classification of respective tradeline data, wherein at least a first subset of codes used in association with a first credit data source of the plurality of credit data sources is not used in association with a second credit data source of the plurality of credit data sources and wherein different formats comprise one or more differences between the raw tradeline data of the plurality of credit data sources;

designating a first set of tradeline characteristics associated with a subset of the code data to determine whether the first set of tradeline characteristics will yield substantially consistent tradeline data across the plurality of credit data sources by iteratively:

accessing raw tradeline data associated with the subset of code data from each of the plurality of credit data sources;

determining correlation between the accessed tradeline data and the raw tradeline data for each of the plurality of credit data sources; and updating the subset of the code data until the measurement for each of the plurality of credit data sources meets at least one predefined threshold;

based on a determination that the measurement meets the at least one predefined threshold, identifying the tradeline characteristics associated with the updated subset of the code data; and generating a leveled attribute using the first set of identified tradeline characteristics.

7. The computing system of claim 6, wherein the plurality of credit data sources are each a different credit bureau.

8. The computing system of claim 6, wherein at least one of the plurality of codes denotes a tradeline category.

9. The computing system of claim 6, wherein designating the first set of tradeline characteristics comprises:

designating a plurality of lowest common denominators from the code data, wherein the lowest common denominators comprise a minimum set of overlapping codes associated with the plurality of credit data sources;

using the raw tradeline data from each of the plurality of credit data sources to generate test tradeline data using selected characteristics;

adjusting the selected characteristics based on a determination that at least one difference between tradeline data associated with the selected characteristics across each of the two or more of the plurality of credit data sources does not meet the at least one predefined threshold; and repeating said using and adjusting until the selected characteristics generate a difference that meets the at least one predefined threshold.

10. The computing system of claim 9, wherein adjusting the selected characteristics comprises at least one of: (a) narrowing the selected characteristics for at least one of the credit data sources to a different subset of code data or (b) including additional code data for at least one of the credit data sources not included in the lowest common denominators in the selected characteristics.

11. A non-transitory computer readable medium storing computer-executable instructions that, when executed by one or more computer systems, configure the one or more computer systems to perform operations comprising:

electronically obtaining raw tradeline data from each of a plurality of credit data sources over a network that is communicating with the plurality of credit data sources;

retrieving code data related to the raw tradeline, wherein the code data comprises a plurality of codes, each individual code of the plurality of codes indicating a category or classification of respective tradeline data, wherein at least a first subset of codes used in association with a first credit data source of the plurality of credit data sources is not used in association with a second credit data source of the plurality of credit data sources and wherein different formats comprise one or more differences between the raw tradeline data of the plurality of credit data sources;

designating a first set of tradeline characteristics associated with a subset of the code data to determine whether the first set of tradeline characteristics will yield substantially consistent tradeline data across the plurality of credit data sources by iteratively:

accessing raw tradeline data associated with the subset of code data from each of the plurality of credit data sources;

measuring a correlation between the accessed tradeline data and the raw tradeline data for each of the plurality of credit data sources; and updating the subset of the code data until the measurement for each of the plurality of credit data sources meets at least one predefined threshold;

based on a determination that the measurement meets the at least one predefined threshold, identifying the tradeline characteristics associated with the updated subset of the code data; and generating a leveled attribute using the identified tradeline characteristics.

12. The non-transitory computer readable medium of claim 11, wherein the plurality of credit data sources are each a different credit bureau.

13. The non-transitory computer readable medium of claim 11, wherein at least one of the plurality of codes denotes a tradeline category.

14. The non-transitory computer readable medium of claim 11, wherein designating the first set of tradeline characteristics comprises:

designating a plurality of lowest common denominators from the code data, wherein the lowest common denominators comprise a minimum set of overlapping codes associated with the plurality of credit data sources;

using the raw tradeline data from each of the plurality of credit data sources to generate test tradeline data using selected characteristics;

adjusting the selected characteristics based on a determination that at least one difference between tradeline data associated with the selected characteristics across each of the two or more of the plurality of credit data sources does not meet the at least one predefined threshold; and repeating said using and adjusting until the selected characteristics generate a difference that meets the at least one predefined threshold.

15. The non-transitory computer readable medium of claim 14, wherein adjusting the selected characteristics comprises at least one of: (a) narrowing the selected characteristics for at least one of the credit data sources to a different subset of code data or (b) including additional code data for at least one of the credit data sources not included in the lowest common denominators in the selected characteristics.

* * * * *